United States Patent
Liu et al.

(10) Patent No.: US 10,745,297 B2
(45) Date of Patent: Aug. 18, 2020

(54) WATER SOFTENER

(71) Applicants: FOSHAN MIDEA CHUNGHO WATER PURIFICATION EQUIPMENT CO., LTD., Foshan (CN); FOSHAN SHUNDE MIDEA WATER DISPENSER MANUFACTURING CO., LTD., Foshan (CN); MIDEA GROUP CO., LTD., Foshan (CN)

(72) Inventors: Guohua Liu, Foshan (CN); Zhifeng He, Foshan (CN)

(73) Assignees: FOSHAN MIDEA CHUNGHO WATER PURIFICATION EQUIPMENT CO., LTD., Foshan (CN); FOSHAN SHUNDE MIDEA WATER DISPENSER MFG. CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/181,136

(22) Filed: Nov. 5, 2018

(65) Prior Publication Data
US 2019/0071326 A1 Mar. 7, 2019

(30) Foreign Application Priority Data

Apr. 28, 2018 (CN) .......................... 2018 1 0409438
Apr. 28, 2018 (CN) .................... 2018 2 0641787 U
(Continued)

(51) Int. Cl.
*C02F 1/42* (2006.01)
*B01D 15/36* (2006.01)
(Continued)

(52) U.S. Cl.
CPC .............. *C02F 1/42* (2013.01); *B01D 15/361* (2013.01); *B01J 49/75* (2017.01);
(Continued)

(58) Field of Classification Search
CPC .......... B01D 15/361; B01J 49/75; C02F 1/42; C02F 2201/005; C02F 2303/16; C02F 5/00; F16K 11/0716
See application file for complete search history.

(56) References Cited

U.S. PATENT DOCUMENTS

| | | | |
|---|---|---|---|
| 4,290,451 A | 9/1981 | Fleckenstein et al. | |
| 6,402,944 B1 * | 6/2002 | Vaughan | C02F 1/42 |
| | | | 137/597 |

(Continued)

FOREIGN PATENT DOCUMENTS

| | | |
|---|---|---|
| CN | 1541312 A | 10/2004 |
| CN | 203309136 U | 11/2013 |

(Continued)

OTHER PUBLICATIONS

Machine Translation of CN 107237902 A from the European Patent Office website. (Year: 2017).*

(Continued)

*Primary Examiner* — Terry K Cecil
(74) *Attorney, Agent, or Firm* — Morgan, Lewis & Bockius LLP

(57) ABSTRACT

Disclosed is a water softener that includes a water softener valve and an ion exchange tank. The water softener valve includes a valve body and valve core assembly. The valve body includes a valve chamber, and a water inlet passage and a water outlet passage in communication with the valve chamber. The valve chamber, the water inlet passage, and the water outlet passage all extend in a first orientation, and the water inlet passage and the water outlet passage are both located at a periphery of the valve chamber and are disposed on opposite sides of the valve chamber in a second orientation. The water inlet passage and the water outlet passage respectively define a water inlet and a water outlet at a same (Continued)

end of the valve body along the first orientation. The second orientation and the first orientation are perpendicular to each other.

19 Claims, 49 Drawing Sheets

(30) Foreign Application Priority Data

| Apr. 28, 2018 | (CN) | 2018 2 0641934 U |
|---|---|---|
| Apr. 28, 2018 | (CN) | 2018 2 0646113 U |
| Jun. 19, 2018 | (CN) | 2018 2 0948358 U |
| Jun. 19, 2018 | (CN) | 2018 2 0948380 U |
| Jun. 19, 2018 | (CN) | 2018 2 0948403 U |
| Jun. 19, 2018 | (CN) | 2018 2 0954893 U |

(51) Int. Cl.
*B01J 49/75* (2017.01)
*F16K 11/07* (2006.01)
*C02F 5/00* (2006.01)

(52) U.S. Cl.
CPC ............ *F16K 11/0716* (2013.01); *C02F 5/00* (2013.01); *C02F 2201/005* (2013.01); *C02F 2303/16* (2013.01)

(56) References Cited

U.S. PATENT DOCUMENTS

| 6,444,127 B1 | 9/2002 | Vaughan et al. |
|---|---|---|
| 6,596,159 B1 | 7/2003 | Maruyama et al. |

FOREIGN PATENT DOCUMENTS

| CN | 203360125 U | | 12/2013 | |
|---|---|---|---|---|
| CN | 103925392 A | | 7/2014 | |
| CN | 205978620 U | | 2/2017 | |
| CN | 107237902 A | * | 10/2017 | |
| CN | 208107225 U | | 11/2018 | |
| CN | 208123563 U | | 11/2018 | |
| EP | 3173748 A1 | * | 5/2017 | .............. G01F 1/115 |
| JP | 2002028646 A | | 1/2002 | |
| KR | 20110023545 A | | 3/2011 | |

OTHER PUBLICATIONS

International Search Report and Written Opinion, PCT/CN2018/111164, dated Jan. 30, 2019, 13 pgs.
International Search Report and Written Opinion, PCT/CN2018/111215, dated Jan. 30, 2019, 9 pgs.
International Search Report and Written Opinion, PCT/CN2018/111216, dated Jan. 23, 2019, 10 pgs.

* cited by examiner

A-A

WATER SOFTENER

PRIORITY CLAIM AND RELATED APPLICATION

This application claims priority to Chinese Patent Application No. 201820948358.0, filed with the State Intellectual Property Office of P. R. China on Jun. 19, 2018; Chinese Patent Application No. 201820948403.2, filed with the State Intellectual Property Office of P. R. China on Jun. 19, 2018; Chinese Patent Application No. 201820948380.5, filed with the State Intellectual Property Office of P. R. China on Jun. 19, 2018; Chinese Patent Application No. 201820954893.7, filed with the State Intellectual Property Office of P. R. China on Jun. 19, 2018; Chinese Patent Application No. 201810409438.3, filed with the State Intellectual Property Office of P. R. China on Apr. 28, 2018; Chinese Patent Application No. 201820641934.7, filed with the State Intellectual Property Office of P. R. China on Apr. 28, 2018; Chinese Patent Application No. 201820641787.3, filed with the State Intellectual Property Office of P. R. China on Apr. 28, 2018; and Chinese Patent Application No. 201820646113.2, filed with the State Intellectual Property Office of P. R. China on Apr. 28, 2018, all of which are incorporated herein by reference.

TECHNICAL FIELD

The present application relates to the technical field of water treatment equipment, and more particularly relates to a water softener.

BACKGROUND

A water softener can soften the water, thereby improving the user's water quality experience, saving detergent, saving water and so on. A core component of the water softener is water softener valve. Apart from an ion exchange tank and a salt tank, the overall size of the water softener is mainly limited by the water softener valve. The pipes of a current water softener valve are intricately arranged. A water inlet passage and a water outlet passage have different orientations, in particular, a water inlet and a water outlet are commonly defined at different end surfaces of the valve body. For example, the water inlet may be provided at one end in an axial direction of the valve body, while the water outlet may be provided at the top end of the valve body and protrude from the valve body at the radial direction. This makes the water path of the water softener valve complicated, and results an increased height or width of the water softener valve, which accordingly would increase the height or width of the water softener to which the water softener valve is applied, and so the whole water softener would need to take up more space.

SUMMARY

It is therefore a primary purpose of the present application to provide a water softener, which aims to solve the technical problem that the water path of the current water softener is complicated resulting in a large overall volume of the water softener valve and the water softener.

To achieve the above object, the water softener provided by the present application includes a water softener valve and an ion exchange tank. The water softener valve includes a valve body and a valve core assembly. The valve body includes a valve chamber, and a water inlet passage and water outlet passage in communication with the valve chamber. The valve chamber, the water inlet passage, and the water outlet passage all extend in a first orientation, and the water inlet passage and water outlet passage are both located at a periphery of the valve chamber and provided at two opposite ends of the valve chamber in a second orientation, respectively. The water inlet passage and the water outlet passage respectively define a water inlet and a water outlet at the same end of the valve body along the first orientation, where the second orientation and the first orientation are perpendicular to each other.

In one embodiment, the valve body has a first end surface and a second end surface disposed adjacent to the water inlet passage and the water outlet passage, respectively, in the second orientation.

The first end surface is provided with a first auxiliary hole that communicates with the water inlet passage, and an inner wall surface of the water inlet passage opposite to the first auxiliary hole is provided with a first communication hole communicating with the valve chamber.

The second end surface is provided with a second auxiliary hole that communicates with the water outlet passage, and an inner wall surface of the water outlet passage opposite to the second auxiliary hole is provided with a second communication hole communicating with the valve chamber.

In one embodiment, the valve body further includes a softening inlet passage and a softening outlet passage communicating with the valve chamber. The water inlet passage is in communication with the softening inlet passage, and the water outlet passage is in communication with the softening outlet passage. The ion exchange tank includes a tank body and a center tube disposed in the tank body. An ion exchange chamber is formed between the center tube and an inner wall of the tank body. The softening inlet passage is in communication with the ion exchange chamber, and the softening outlet passage is in communication with the center tube.

In one embodiment, the valve body further includes a mounting head disposed on one side of the valve chamber in a third orientation. The mounting head is detachably fixed to the ion exchange tank. The softening inlet passage and the softening outlet passage are defined within the mounting head. The first orientation, the second orientation, and the third orientation are perpendicular to one another.

In one embodiment, the mounting head includes a first annular cylinder and a second annular cylinder that extend along the third orientation. The first annular cylinder is disposed to surround the outside of the second annular cylinder and is detachably connected to the ion exchange tank. The softening inlet passage is formed between the first annular cylinder and the second annular cylinder, and the softening outlet passage is defined in an inner cavity of the second annular cylinder.

In one embodiment, the valve body is provided with a third auxiliary hole in an end surface where the water inlet and the water outlet are located. The third auxiliary hole extends in the first orientation to communicate with the softening outlet passage. An inner wall surface of the third auxiliary hole is provided with a third communication hole communicating with the valve chamber.

In one embodiment, the softening inlet passage extends through the valve chamber along the third orientation.

In one embodiment, the water softener valve has a softened water producing position, and the valve core assembly includes a piston and a groove defining assembly sleeved around the piston. In the softened water producing position, the piston cooperates with the groove defining assembly to define a first connecting passage that communicates the water inlet passage and the softening inlet passage, and a second connecting passage that communicates the softening outlet passage and the water outlet passage.

In one embodiment, the piston extends in the first orientation, and is reciprocally movable in the first orientation to slidably engage the groove defining assembly.

In one embodiment, the valve chamber has a third end surface and a fourth end surface disposed opposite to each other in the first orientation. A push rod of the piston passes through the third end surface in the first orientation. The fourth end surface is located at an end of the valve chamber adjacent to the water inlet.

A circumferential surface of the piston is sequentially provided with a first sealing surface, a first annular groove, a second sealing surface, a second annular groove and a third sealing surface in the direction towards the fourth end surface.

The groove defining assembly includes a first water permeable grid, a second water permeable grid, a third water permeable grid, and a fourth water permeable grid that are annular in shape and that are sequentially disposed in the direction towards the fourth end surface. The first water permeable grid, the second water permeable grid, the third water permeable grid, and the fourth water permeable grid are sealed relative to one another at a circumferential surface of the valve chamber along an axial direction of the valve core, and they are also fixedly mated with the circumferential surface of the valve chamber.

The water inlet passage communicates with the valve chamber at the third water permeable grid. The softening inlet passage communicates with the valve chamber at the second water permeable grid. The water outlet passage communicates with the valve chamber at the fourth water permeable grid.

In the softened water producing position, the first sealing surface seals the first water permeable grid, and the first annular groove communicates with the second water permeable grid and the third water permeable grid to form the first connecting passage. The second sealing surface seals and abuts against an edge of the third water permeable grid adjacent to the fourth end surface, and the second annular groove communicates with the fourth water permeable grid to form the second connecting passage.

The water softener of the present application optimizes the layout of the water inlet passage and the water outlet passage. The valve chamber, the water inlet passage and the water outlet passage all extend in a first orientation, and water inlet passage and water outlet passage are both located at a periphery of the valve chamber and provided at two opposite ends of the valve chamber in a second orientation, respectively. The water inlet passage and the water outlet passage respectively define a water inlet and a water outlet at a same end of the valve body along the first orientation. During water softening, water flows from the water inlet of the water softener valve into the ion exchange tank via the water inlet passage for softening treatment. Then the softened water flows out from the water outlet via the water outlet passage. Thereby, the inlet waterway and the outlet waterway of the entire softened water production waterway are arranged in a uniform orientation, and the water can flow in and out at the same end of the valve body, enabling the internal ducts and external ports of the valve body to be arranged more neatly and the structure of the entire water softener valve to be more compact, which in turn makes the overall size of the water softener smaller.

BRIEF DESCRIPTION OF THE ACCOMPANYING DRAWINGS

In order to better illustrate the technical solutions that are reflected in various embodiments according to this application or that are found in the prior art, the accompanying drawings intended for the description of the embodiments herein or for the prior art will now be briefly described. It is evident that the accompanying drawings listed in the following description show merely some embodiments according to this application, and that those having ordinary skill in the art will be able to obtain other drawings based on the arrangements shown in these drawings without making inventive efforts.

Figure 1:
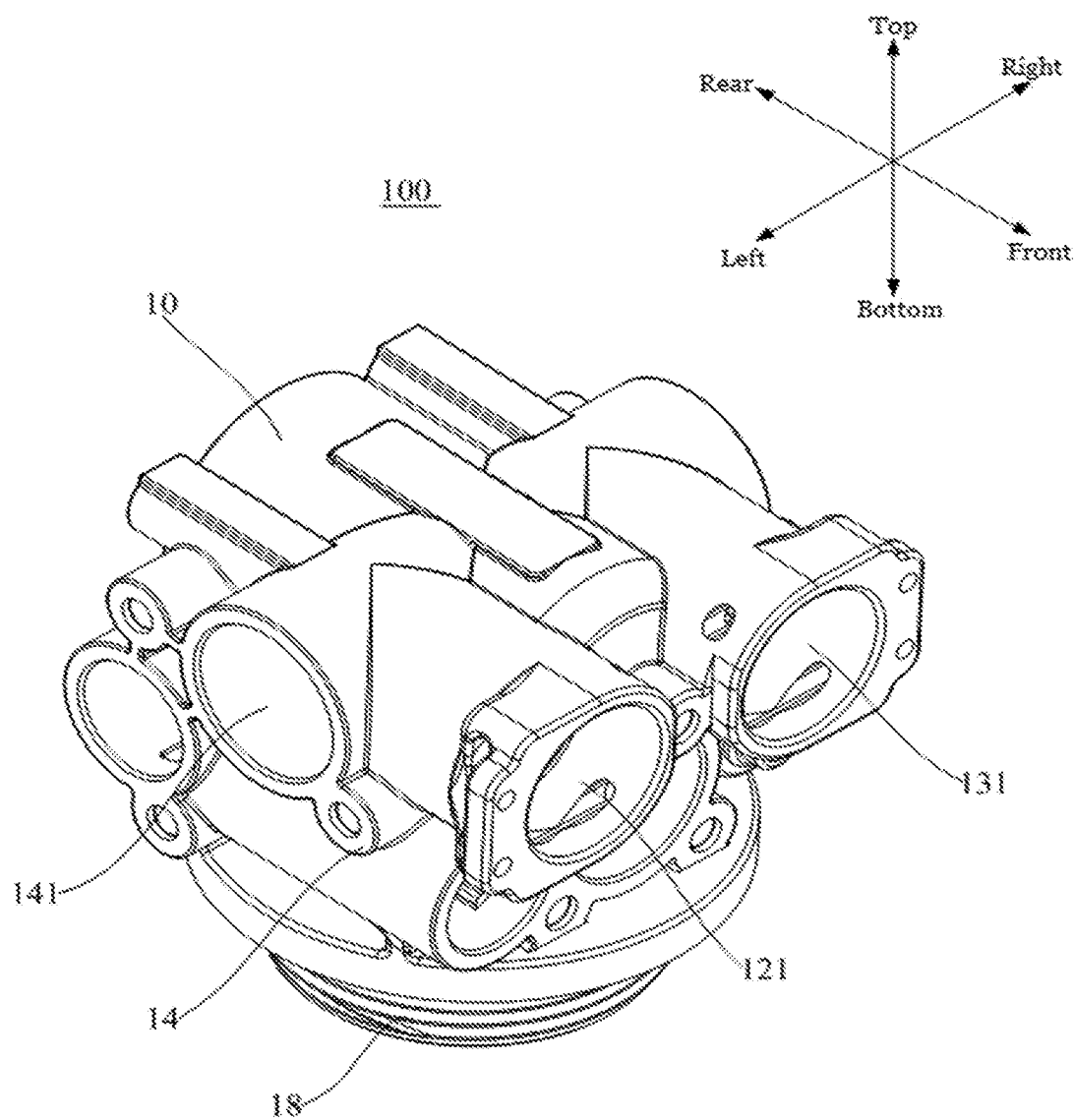
FIG. 1 is schematic view of an embodiment of a water softener valve in accordance with the present application.
Figure 2:
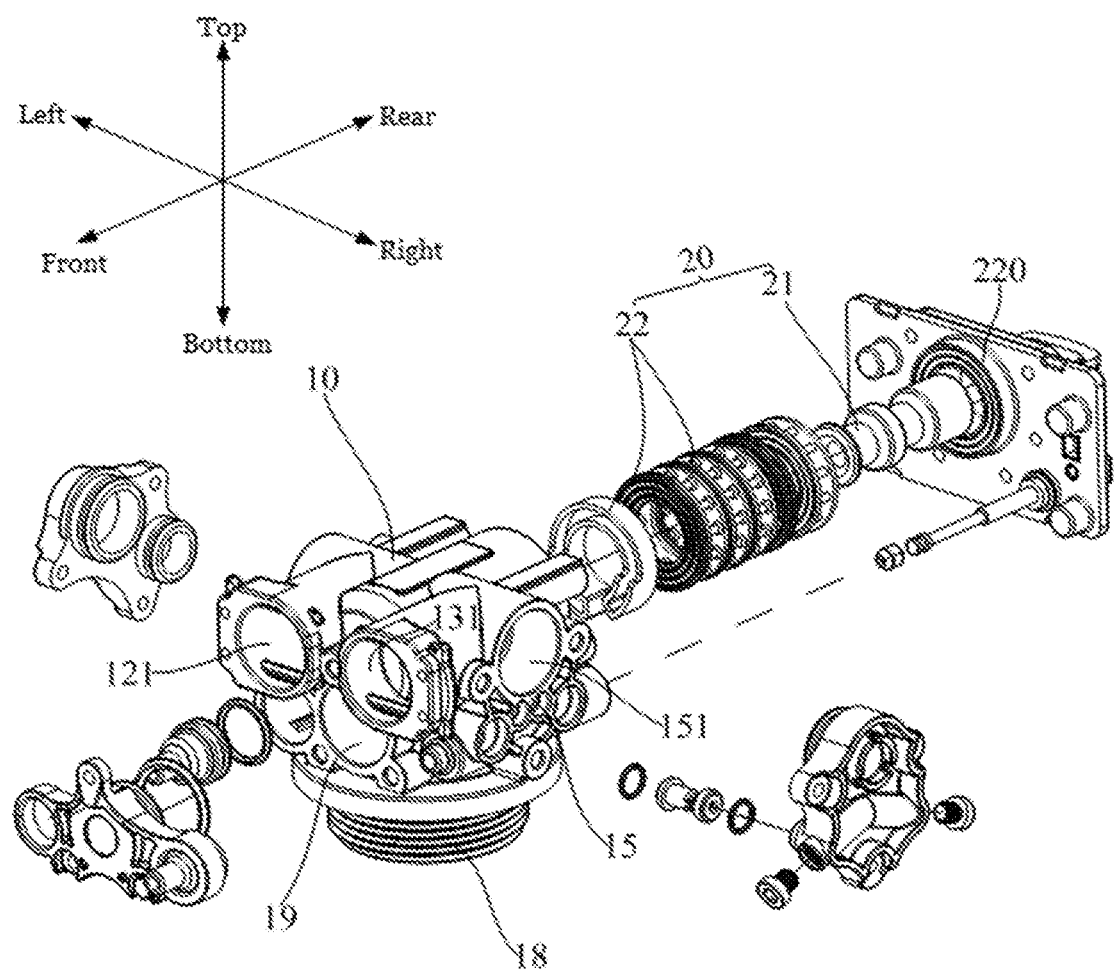
FIG. 2 is a schematic exploded view of the water softener valve of FIG. 1.
Figure 3:
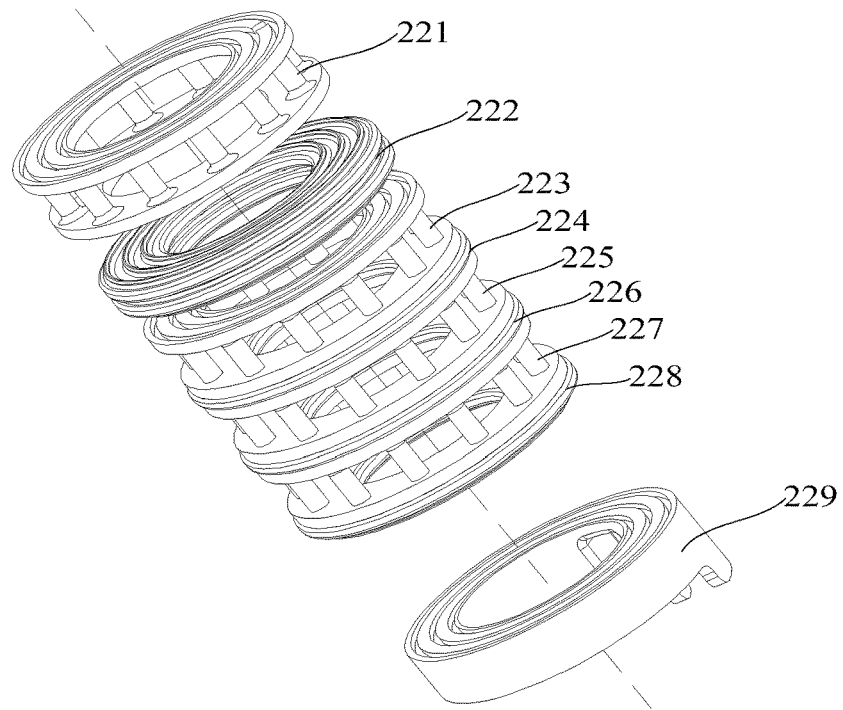
FIG. 3 is a schematic view of the groove defining assembly of FIG. 2.
Figure 4:
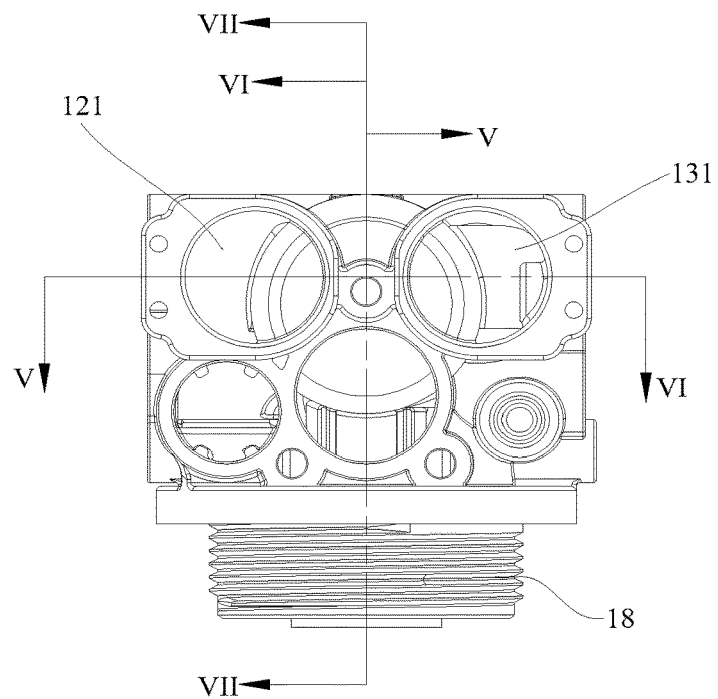
FIG. 4 is a front elevational view of the valve body of FIG. 1.
Figure 5:
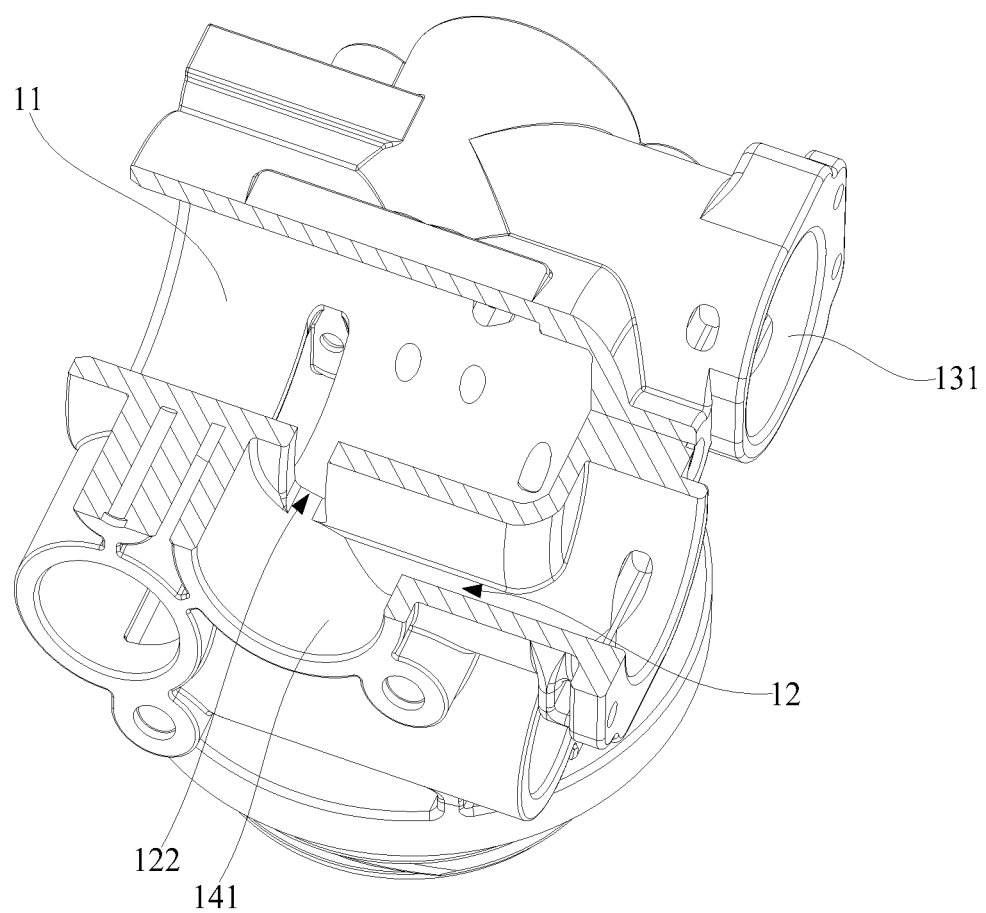
FIG. 5 is a cross-sectional view taken along line V-V of FIG. 4.

Various implementations, functional features, and advantages of this disclosure will now be described in further detail in connection with some illustrative embodiments and the accompanying drawings.

DETAILED DESCRIPTION OF ILLUSTRATIVE EMBODIMENTS

Technical solutions reflected in various embodiments according to this application will now be described in a clear and comprehensive manner in connection with the accompanying drawings intended for these embodiments of the present application. It is evident that the described embodiments are merely some rather than all of the embodiments of this application. All other embodiments obtained by persons having ordinary skill in the art based on the embodiments of this application without making inventive efforts shall all fall within the scope of protection of this application.

It should be noted that all directional indicators (such as "up" "down" "left" "right" "front" or "rear") as used in the embodiments herein are merely used to illustrate the relative positions and movements or the like of various components or parts under a specific posture (as depicted in the drawings), and that should the specific posture change, these directional indicators will change accordingly.

As used herein, terms such as "first" or "second" are intended for illustrative purposes only and are not to be construed as indicating or implying their relative importance or implicitly indicating the number of the specified technical features. Thus, a feature defined by terms such as "first" or "second" can explicitly or implicitly include at least one of such a feature. In addition, technical solutions of various embodiments may be combined with one another; but such combinations must be premised on the achievability to those having ordinary skill in the art. Where a combination of technical solutions ends up contradictory or unachievable, such a combination shall not be regarded as existent nor would it fall within the scope of protection of this application.

The application proposes a water softener.

In various embodiments of the present application, as illustrated in FIG. 1, FIG. 2, FIG. 5, FIG. 6 and FIG. 12, the water softener includes a water softener valve 100 and an ion exchange tank 200. The water softener valve 100 includes a valve body 10 and a valve core assembly 20. The valve body 10 includes a valve chamber 11 as well as a water inlet passage 12 and a water outlet passage 13 communicating with the valve chamber 11. The valve chamber 11, the water inlet passage 12, and the water outlet passage 13 all extend in a first orientation, and the water inlet passage 12 and the water outlet passage 13 are both located at the periphery of the valve chamber 11 and are disposed at opposite sides of the valve chamber 11 respectively in a second orientation. The water inlet passage 12 and the water outlet passage 13 define a water inlet 121 and a water outlet 131 respectively at a same end of the valve body 10 in the first orientation, where the second orientation is perpendicular to the first orientation.

In this embodiment, the valve body 10 may be constituted by a plurality of components that are fastened by bolts and sealed with a sealing ring or the like on the mating surface. In order to adapt to mass production, each component can be injection molded in one piece. In addition, the valve body 10 can also be constituted by a plurality of components that are connected together by ultrasonic welding, so as to create the relatively complicated valve chamber 11 and various channel structures. Furthermore, the valve body 10 can also be produced using the emerging 3D printing technology to accommodate small batch models.

The water inlet passage 12 is configured to introduce water into the valve chamber 11. The valve core assembly 20 is configured to guide the water entering the valve chamber 11 to the ion exchange tank 200 to realize operating modes such as softened water production, saline solution forward washing, and saline solution back washing and so on. The water outlet passage 13 is configured for discharging the softened water from the valve chamber 11. The ion exchange tank 200 contains an ion exchange filter material such as a softening resin. In the softening water production process, the ion exchange filter material can replace calcium ions and magnesium ions in raw water with sodium ions to produce softened water. In the regeneration process, calcium ions and magnesium ions are replaced by sodium ions to achieve recycling.

The water inlet 121 and the water outlet 131 may be disposed at any end of the valve body 10. In order to accommodate the installation of the water softener valve 100 to the ion exchange tank 200 of the water softener, in this embodiment the first orientation coincides with the front-rear orientation, the second orientation coincides with the left-right orientation, and the water inlet 121 and water outlet 131 are provided at the front end of the valve body 10.

The water softener of the present application optimizes the layout of the water inlet passage 12 and the water outlet passage 13. The valve chamber 11, the water inlet passage 12 and the water outlet passage 13 all extend in a first orientation, and the water inlet passage 12 and water outlet passage 13 are both located at a periphery of the valve chamber 11 and provided at two opposite ends of the valve chamber 11 in a second orientation, respectively. The water inlet passage 12 and the water outlet passage 13 respectively define a water inlet 121 and a water outlet 131 at a same end of the valve body 10 along the first orientation. During water softening, water flows from the water inlet 121 of the water softener valve 100 into the ion exchange tank 200 via the water inlet passage 12 for softening treatment. Then the softened water flows out from the water outlet 131 via the water outlet passage 13. Thereby, the inlet waterway and the outlet waterway of the entire softened water production waterway are arranged in a uniform orientation, and the water can flow in and out at the same end of the valve body 10, enabling the internal ducts and external ports of the valve body 10 to be arranged more neatly and the structure of the entire water softener valve 100 to be more compact, which in turn makes the overall size of the water softener smaller.

Referring to FIG. 1, FIG. 2, and FIG. 4 to FIG. 6, in an embodiment, the valve body 10 has a first end surface 14 and a second end surface 15 disposed adjacent to the water inlet passage 12 and the water outlet passage 13 respectively in the second orientation. The first end surface 14 is provided with a first auxiliary hole 141 that communicates with the water inlet passage 12, and the inner wall surface of the water inlet passage 12 opposite to the first auxiliary hole 141 is provided with a first communication hole communicating with the valve chamber 11. The second end surface 15 is provided with a second auxiliary hole 151 that communicates with the water outlet passage 13, and the inner wall surface of water outlet passage 13 opposite to the second auxiliary hole 151 is provided with a second communication hole communicating with the valve chamber 11.

In this embodiment, the water inlet passage 12 and the water outlet passage 13 are disposed on opposite sides of the valve chamber 11 in the second orientation, and are disposed adjacent to the first end surface 14 and the second end surface 15, respectively. Thus, the internal ducts of the valve body 10 are arranged more neatly and compactly. Setting the first auxiliary hole 141 can accommodate to the drafting process in injection molding thereby enabling the molding of the first communication hole 122, and setting the second auxiliary hole 151 can accommodate to the drafting process in injection molding thereby enabling the molding of the second communication hole 132. When the valve chamber 11 is cylindrical in shape, exemplarily the first communication hole 122 has a strip shape extending in the circumferential direction of the inner wall surface of the valve chamber 11, and the second communication hole 132 is also strip-shaped. The first communication hole 122 and the second communication hole 132 are staggered in the first orientation.

Figure 6:
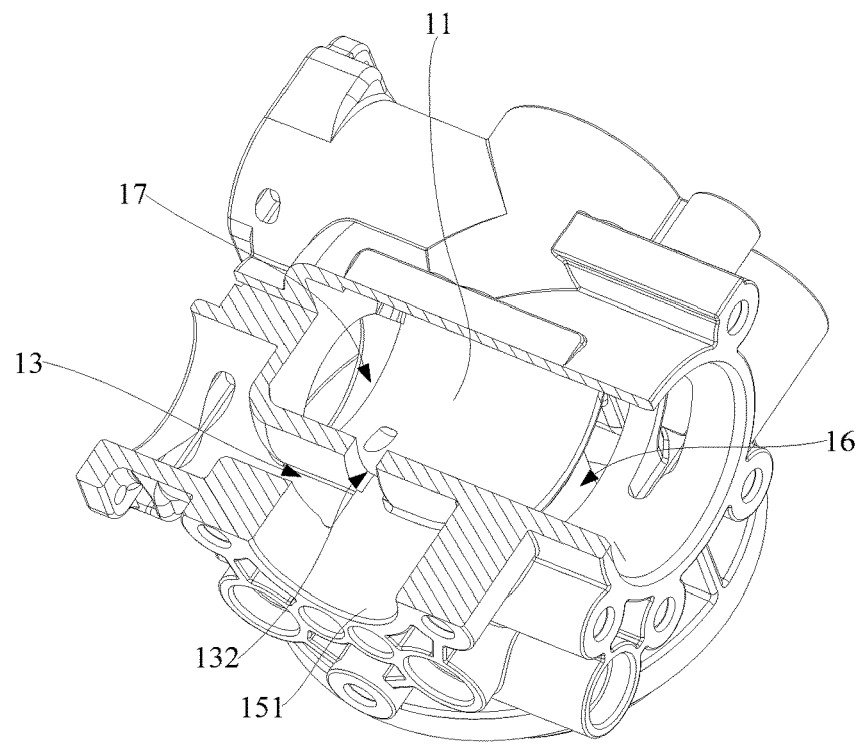
FIG. 6 is a cross-sectional view taken along line VI-VI of FIG. 4.
Figure 7:
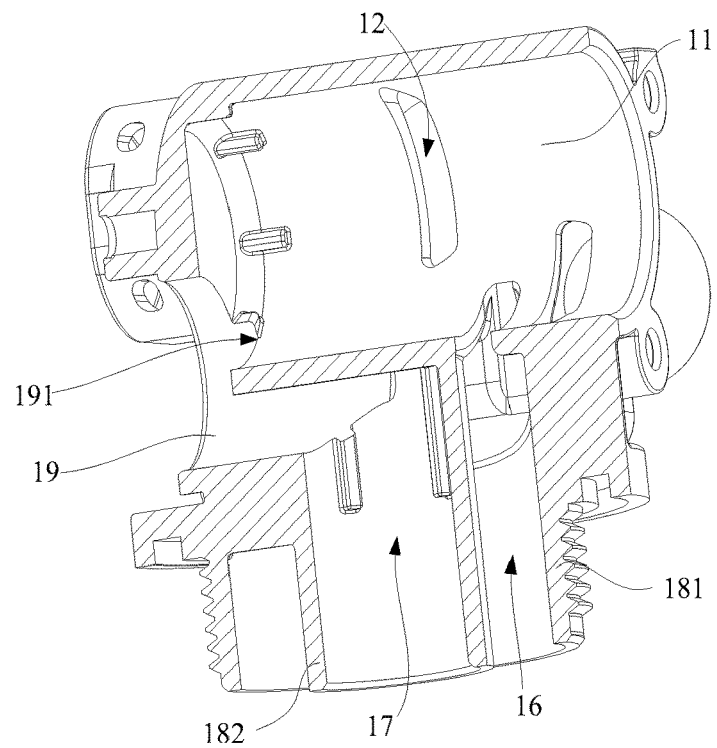
FIG. 7 is a cross-sectional view taken along line VII-VII of FIG. 4.
Figure 8:
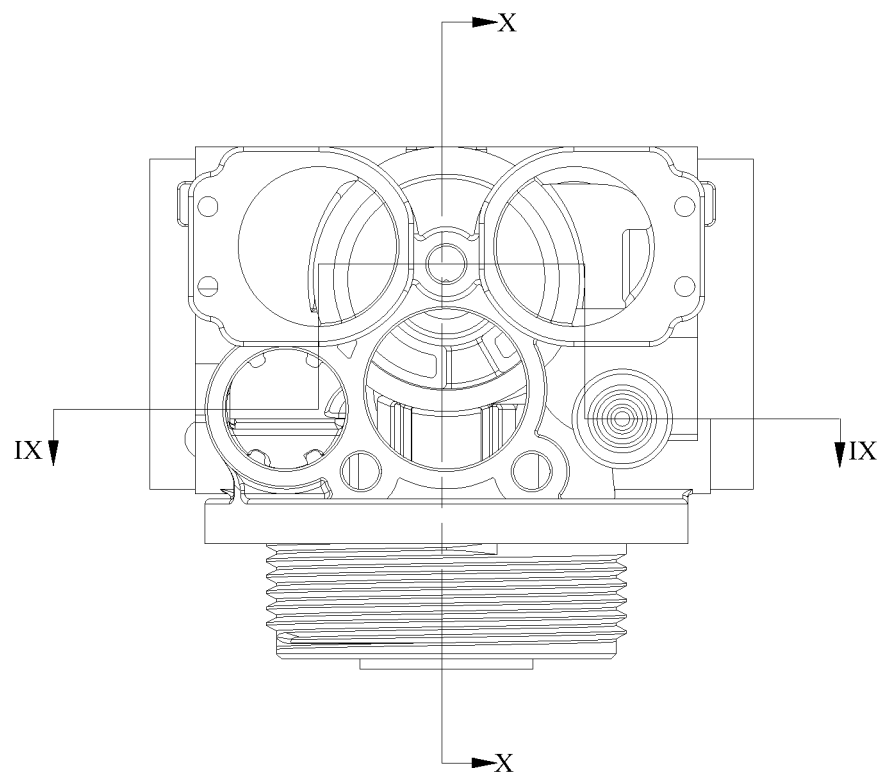
FIG. 8 is a front elevational view of the water softener valve of FIG. 1, where the water softener valve is in a softened water producing condition.
Figure 9:
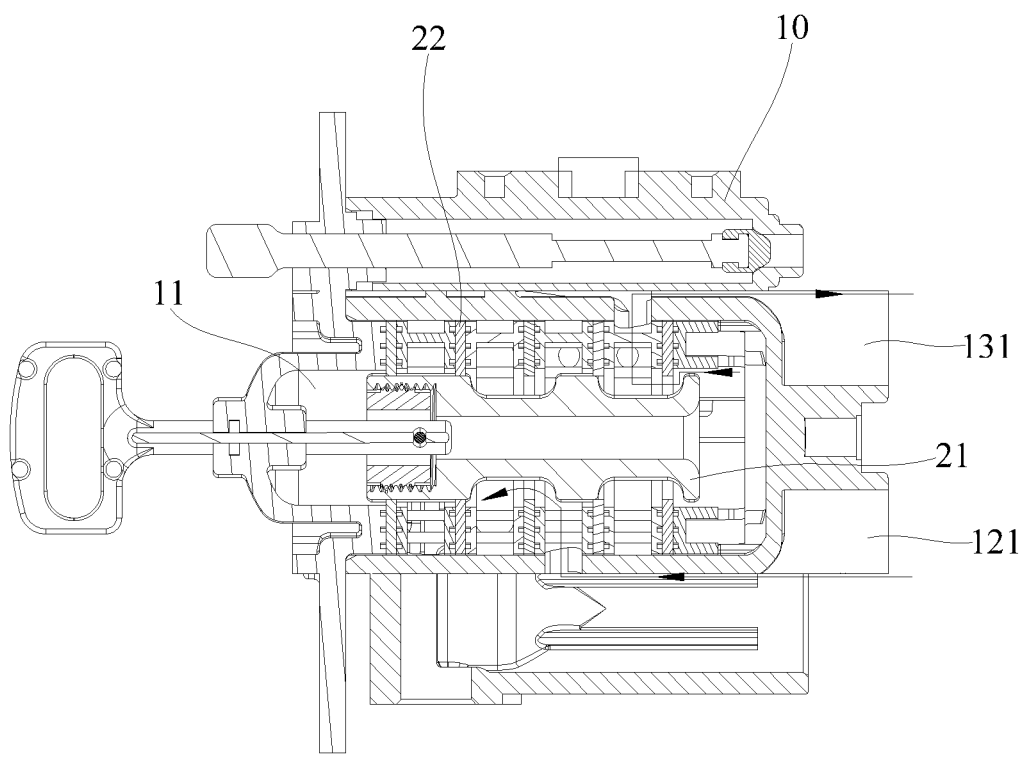
FIG. 9 is a cross-sectional view taken along line IX-IX of FIG. 8.
Figure 12:
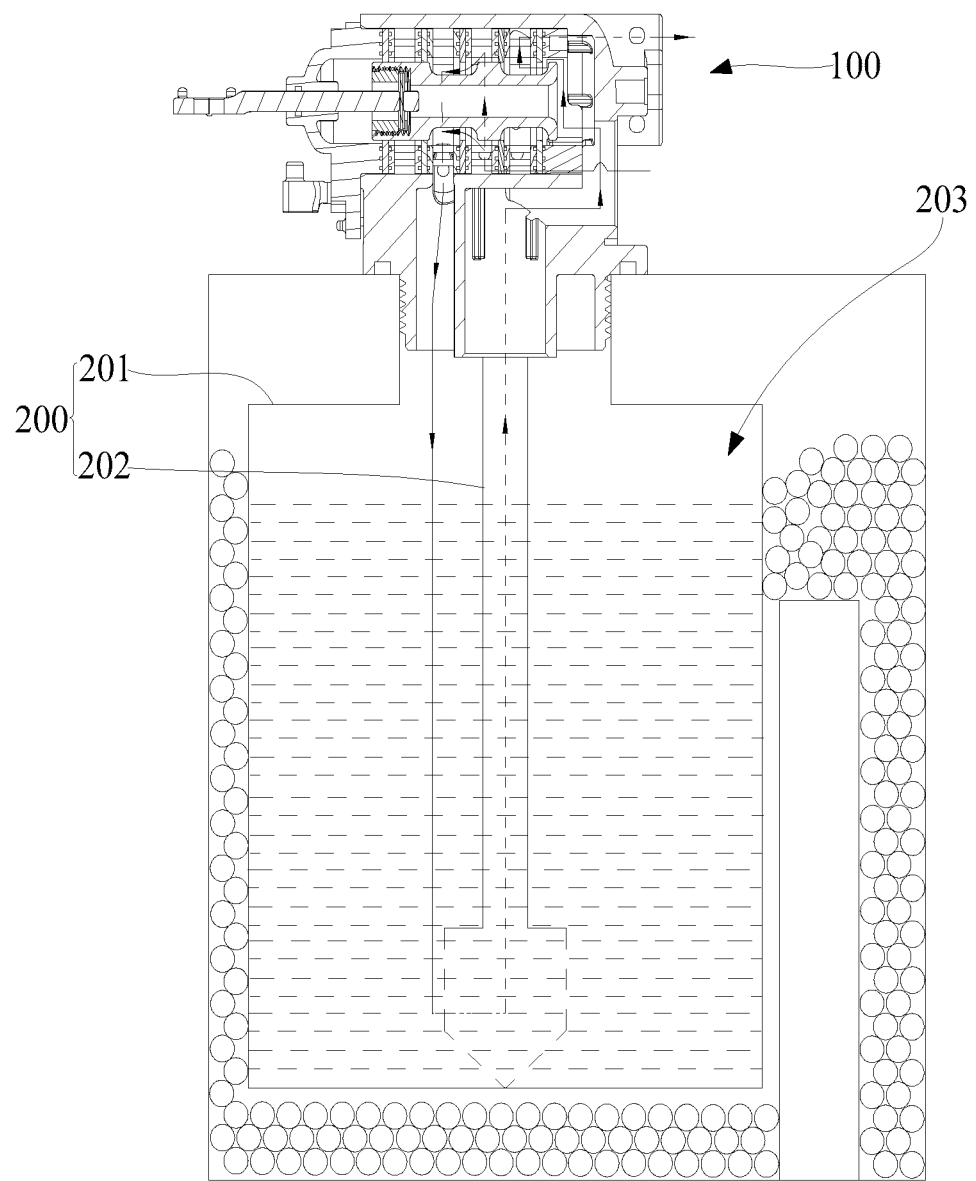
FIG. 12 is schematic view illustrating the internal structure of the water softener of the present application in a softened water producing condition.
Figure 13:
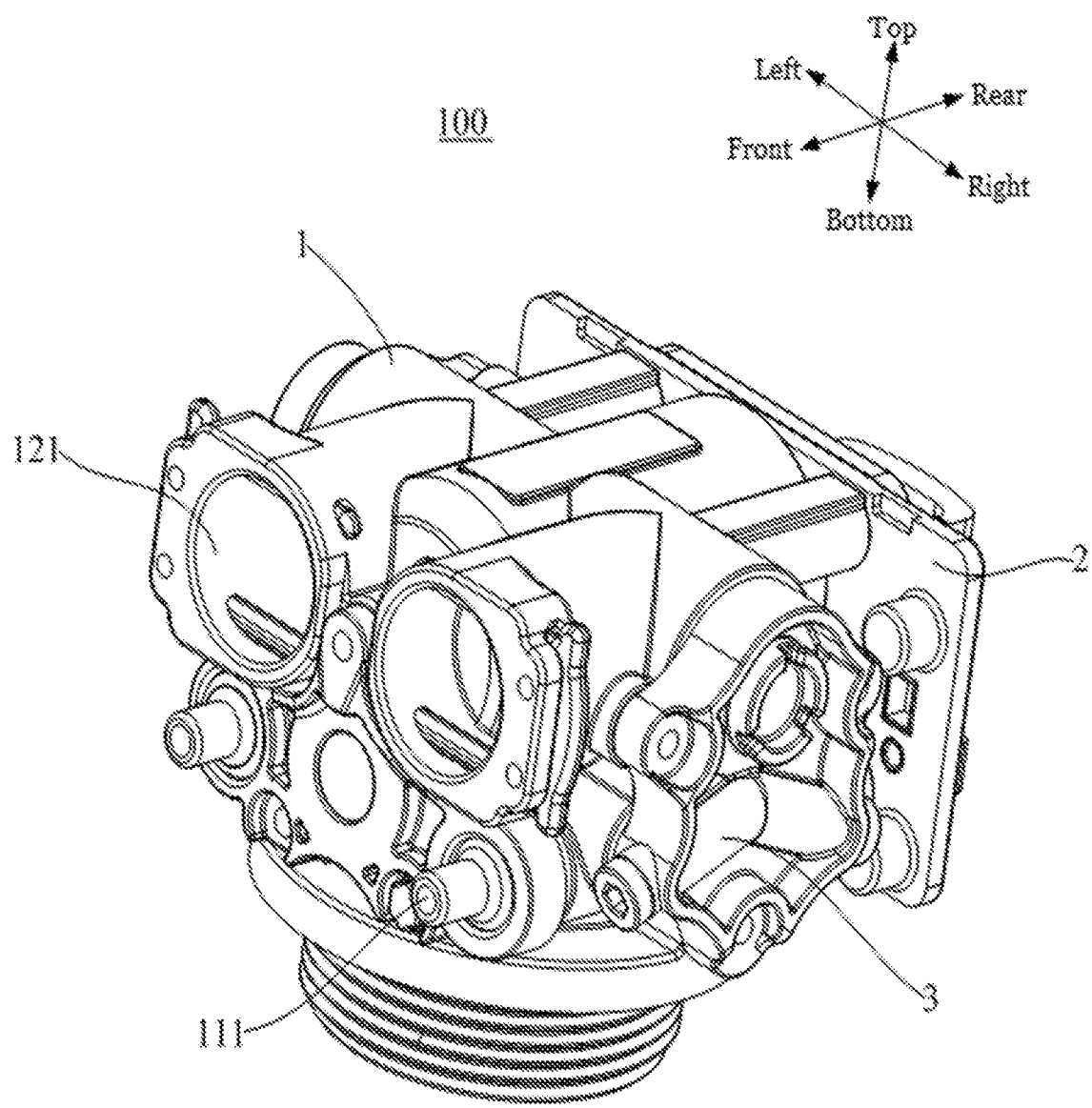
FIG. 13 is schematic view of an embodiment of a water softener valve in accordance with the present application.
Figure 14:
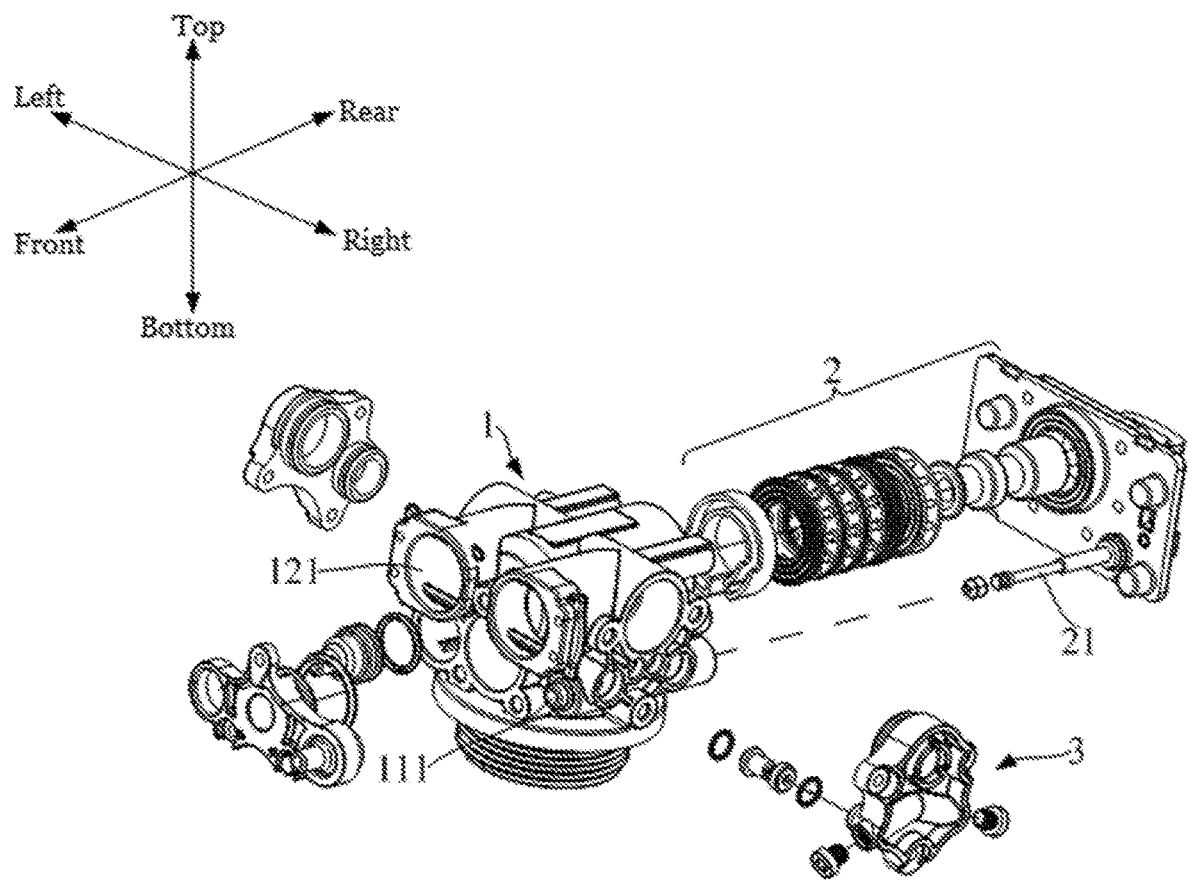
FIG. 14 is a partially exploded perspective view of the water softener valve of FIG. 13.
Figure 15:
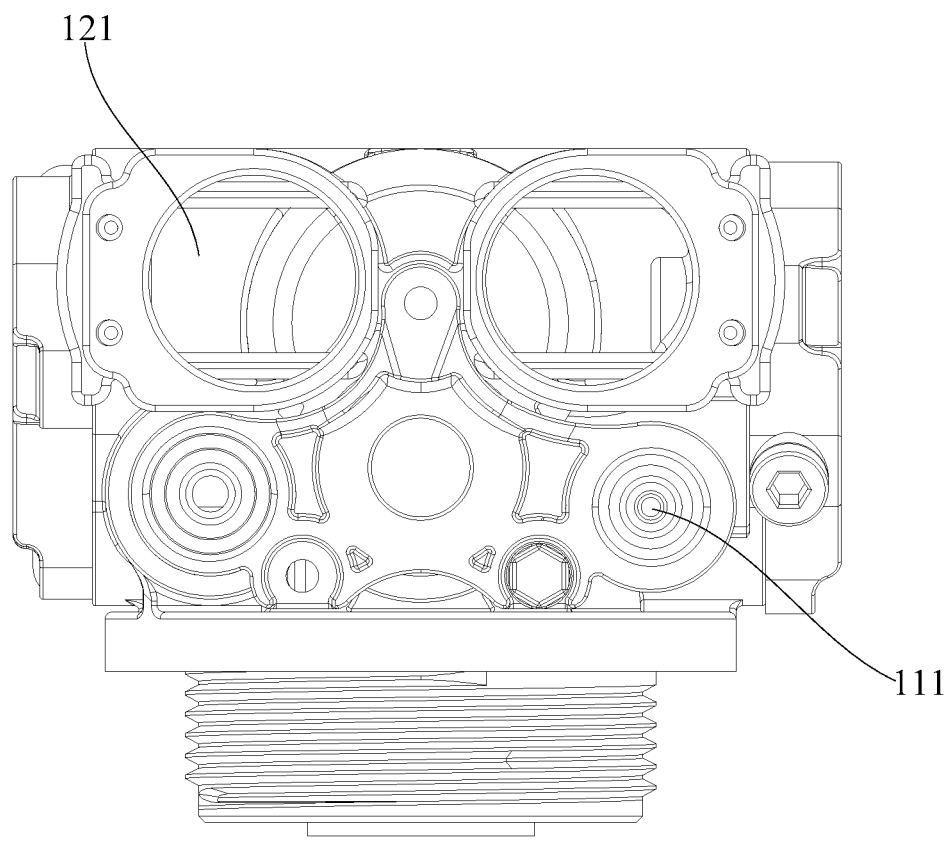
FIG. 15 is a front elevational view of the water softener valve of FIG. 13.
Figure 16:
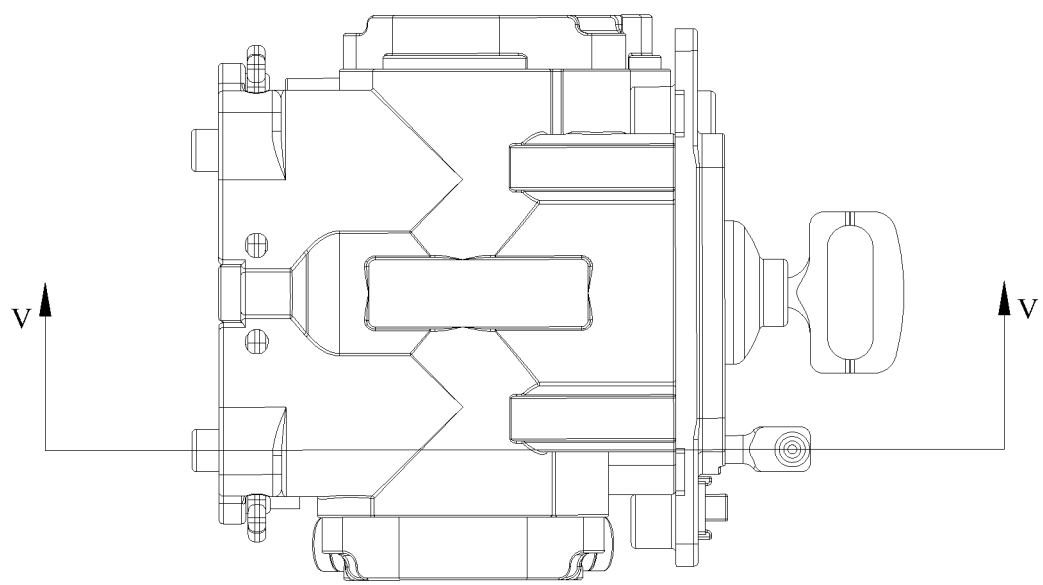
FIG. 16 is a top plan view of the water softener valve of FIG. 13.
Figure 17:
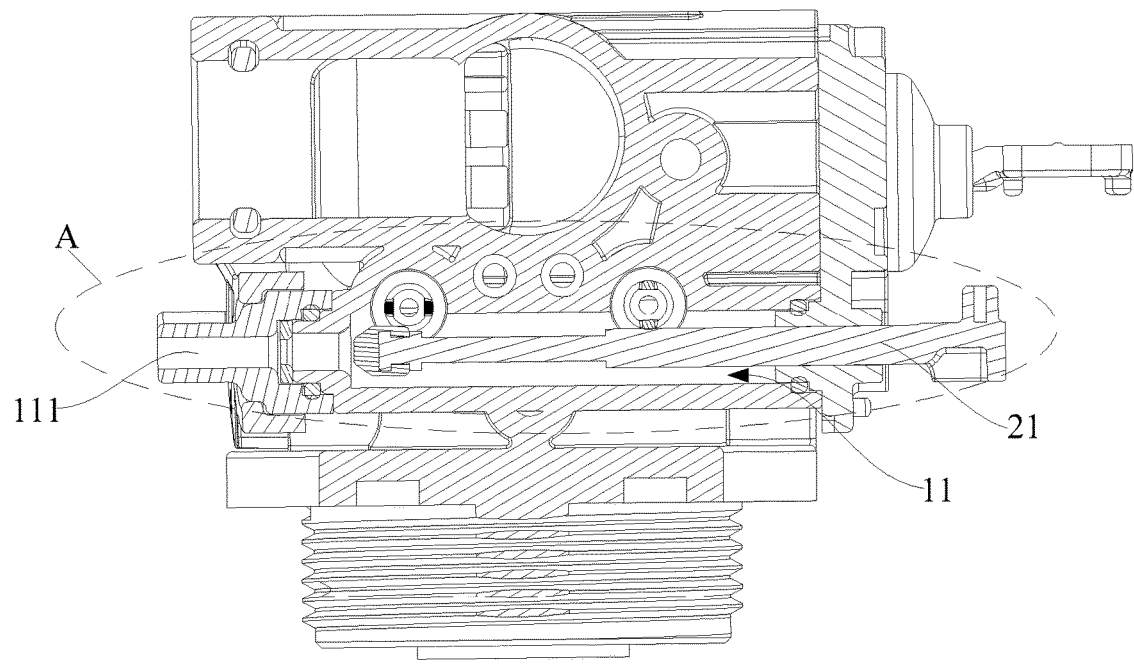
FIG. 17 is a cross-sectional view taken along line V-V of FIG. 16.
Figure 18:
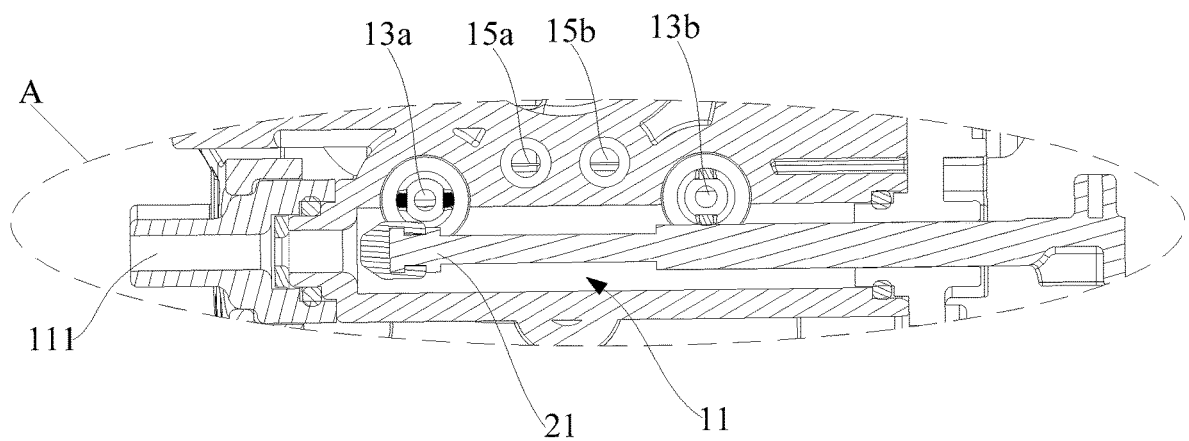
FIG. 18 is a partial enlargement view of portion A shown in FIG. 17.
Figure 19:
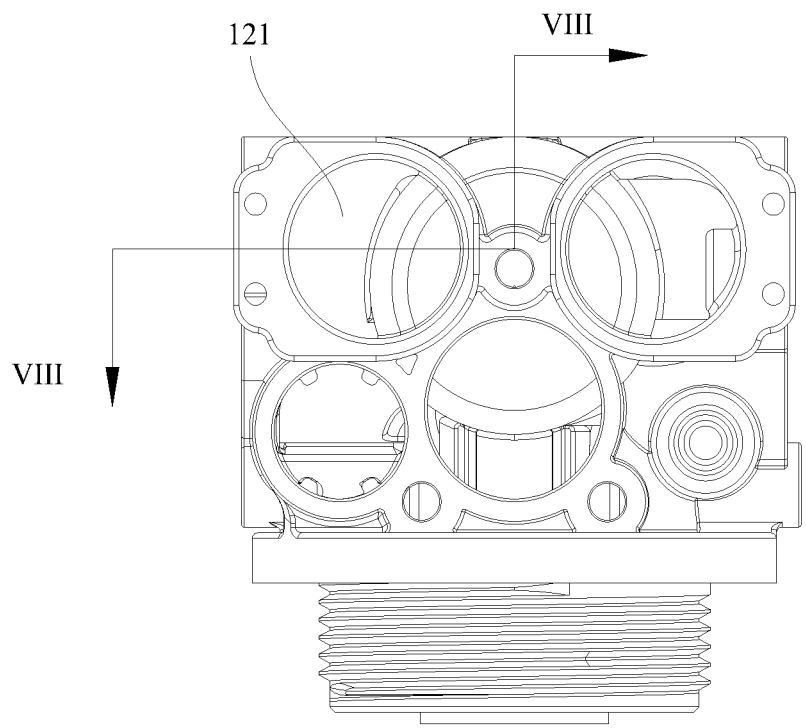
FIG. 19 is a front elevational view of the valve body of FIG. 14.
Figure 20:
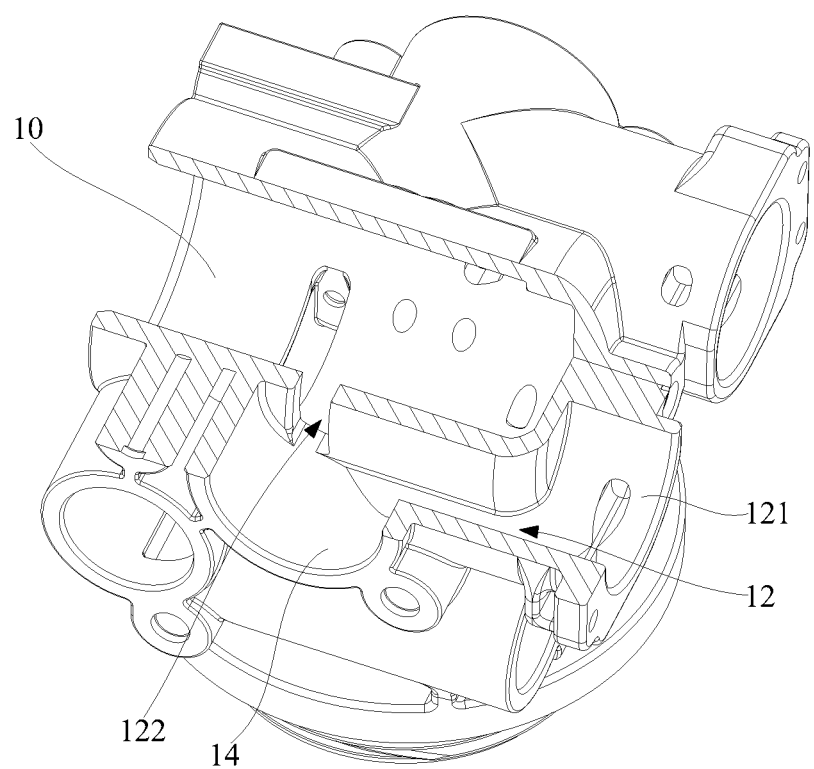
FIG. 20 is a cross-sectional view taken along line VIII-VIII of FIG. 19.
Figure 21:
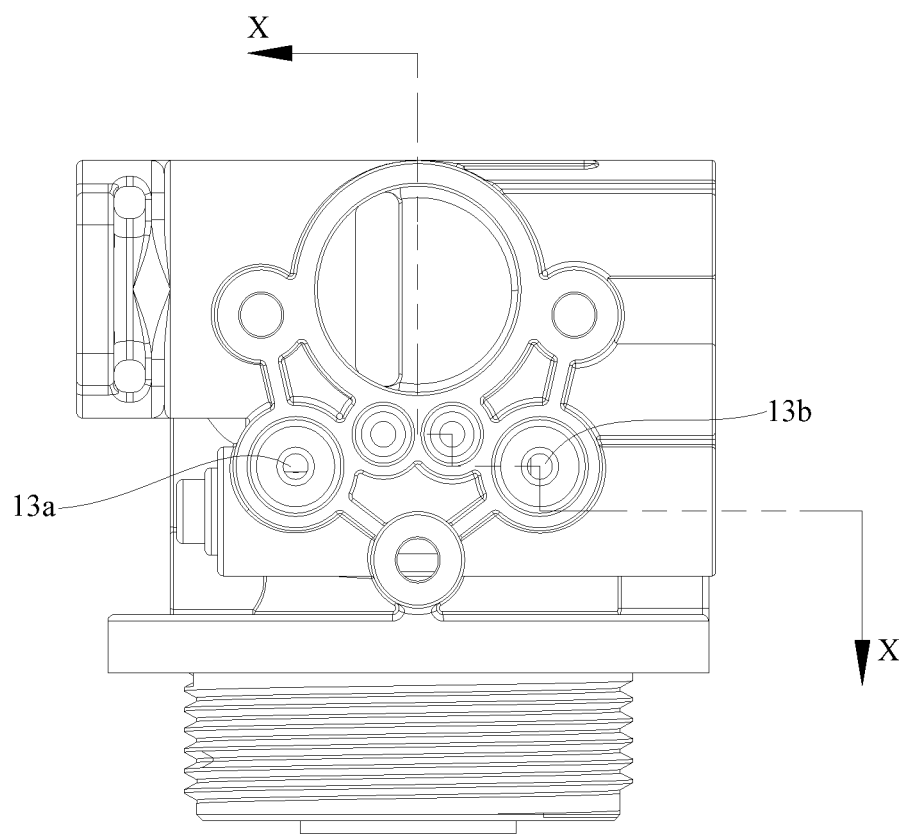
FIG. 21 is a right side view of the valve body of FIG. 14.
Figure 22:
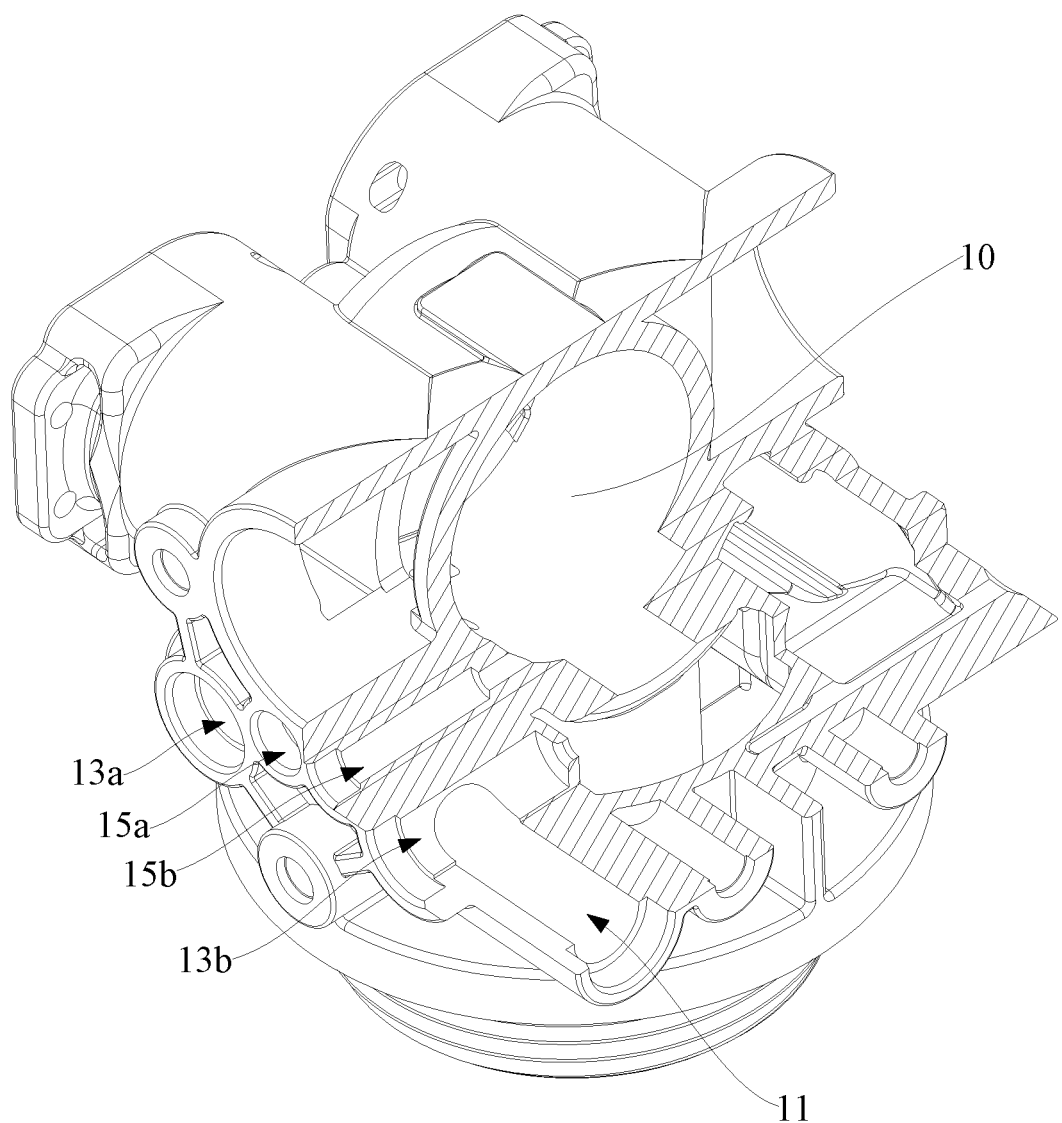
FIG. 22 is a cross-sectional view taken along line X-X of FIG. 21.
Figure 23:
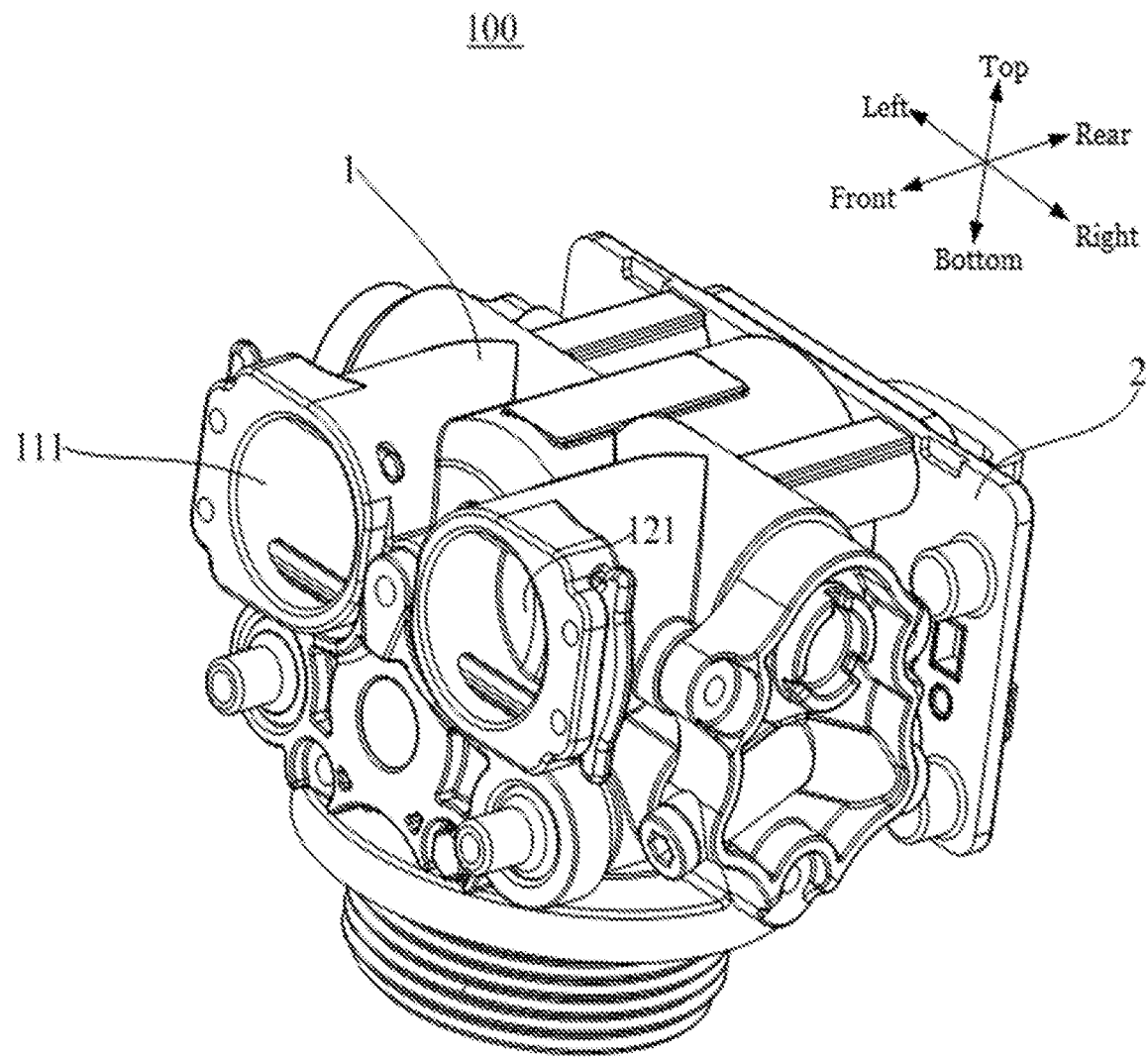
FIG. 23 is schematic view of an embodiment of a water softener valve in accordance with the present application.
Figure 24:
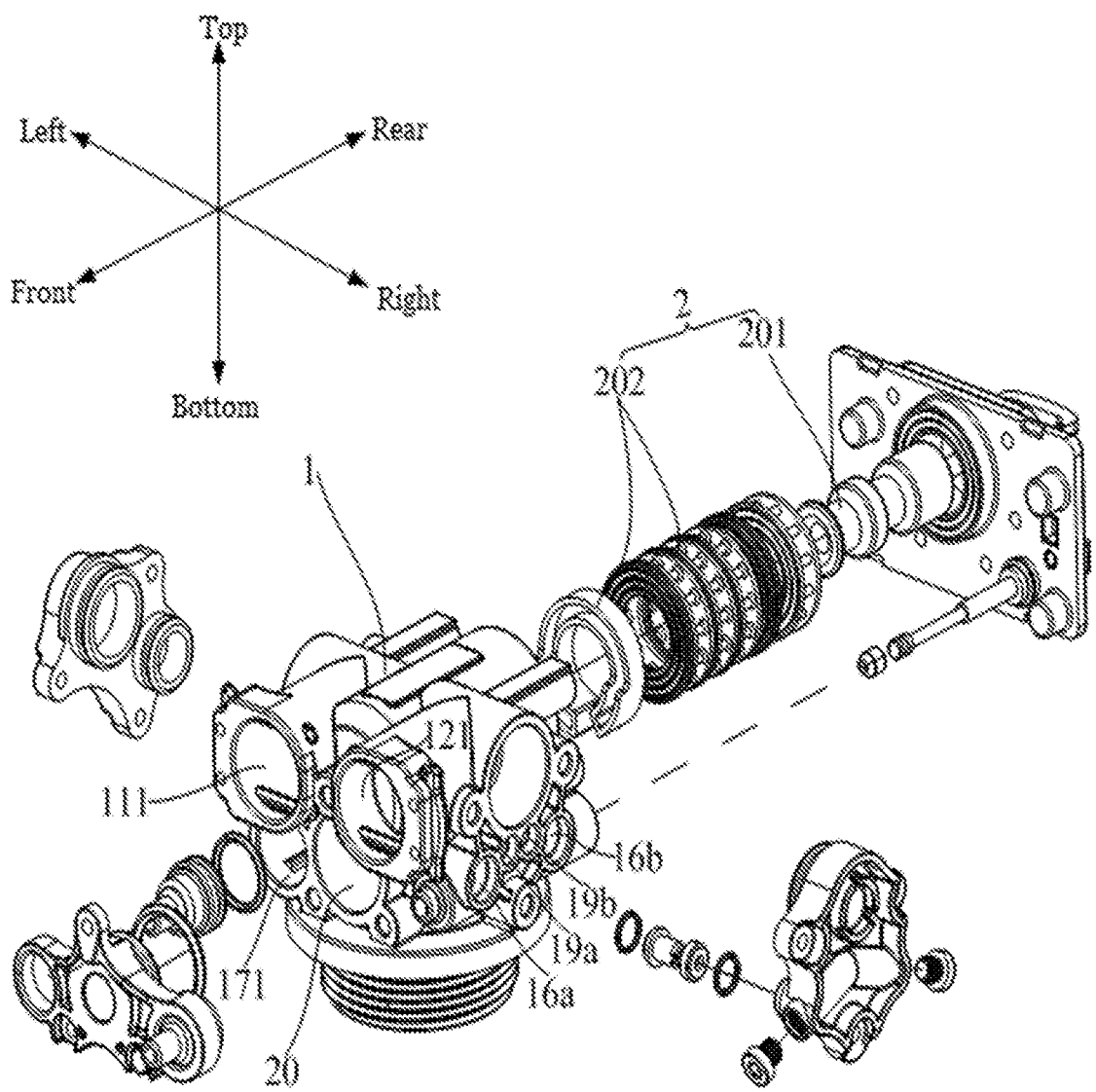
FIG. 24 is a partially exploded perspective view of the water softener valve of FIG. 23.
Figure 25:
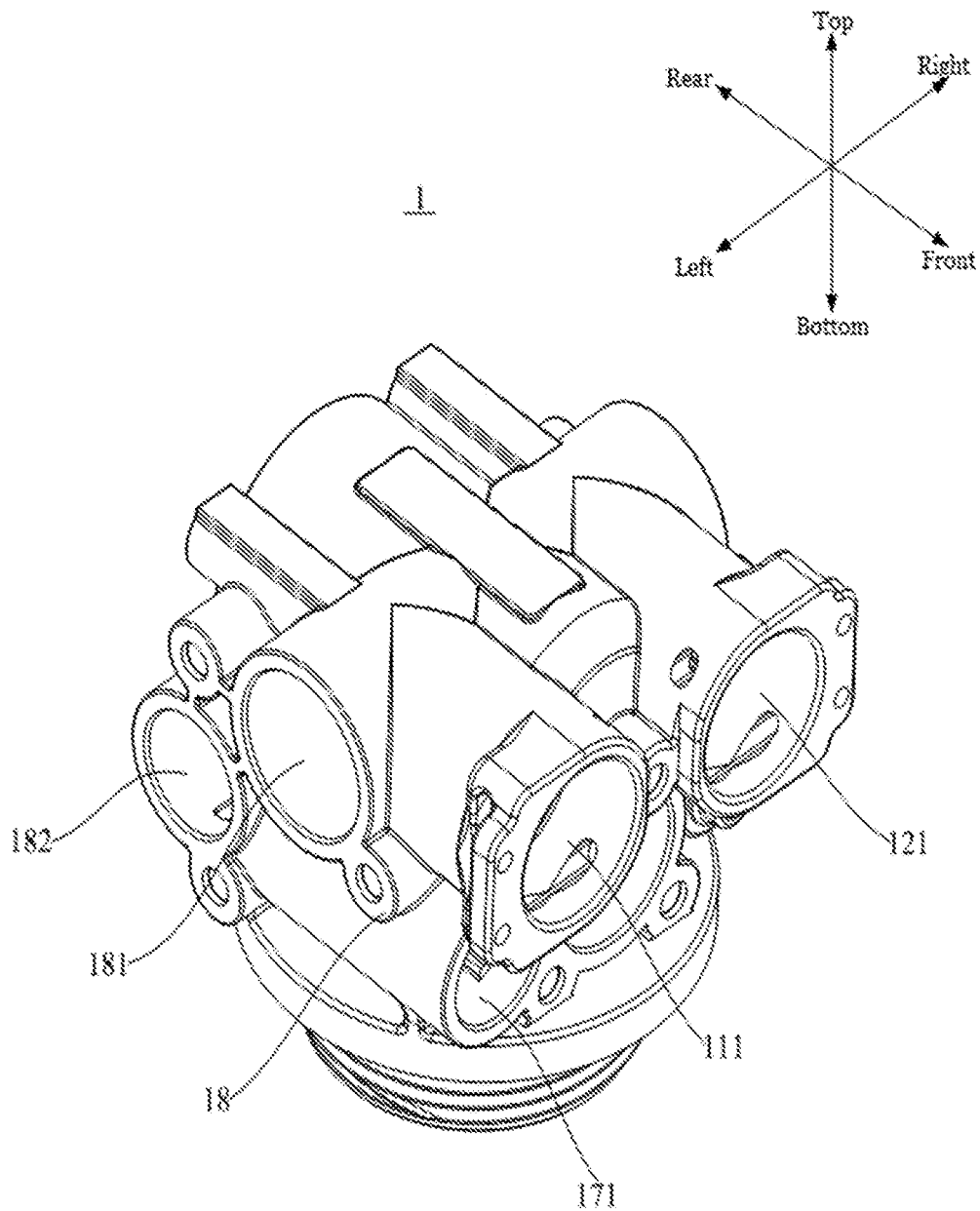
FIG. 25 is a schematic view of the valve body of FIG. 24.
Figure 26:
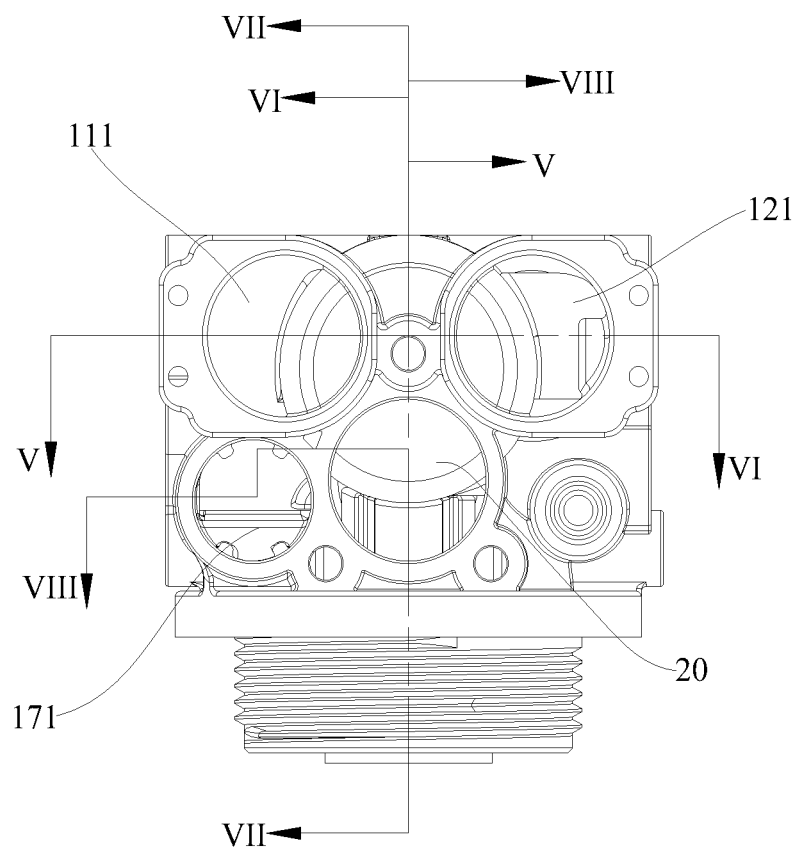
FIG. 26 is a front elevational view of the valve body of FIG. 25.
Figure 27:
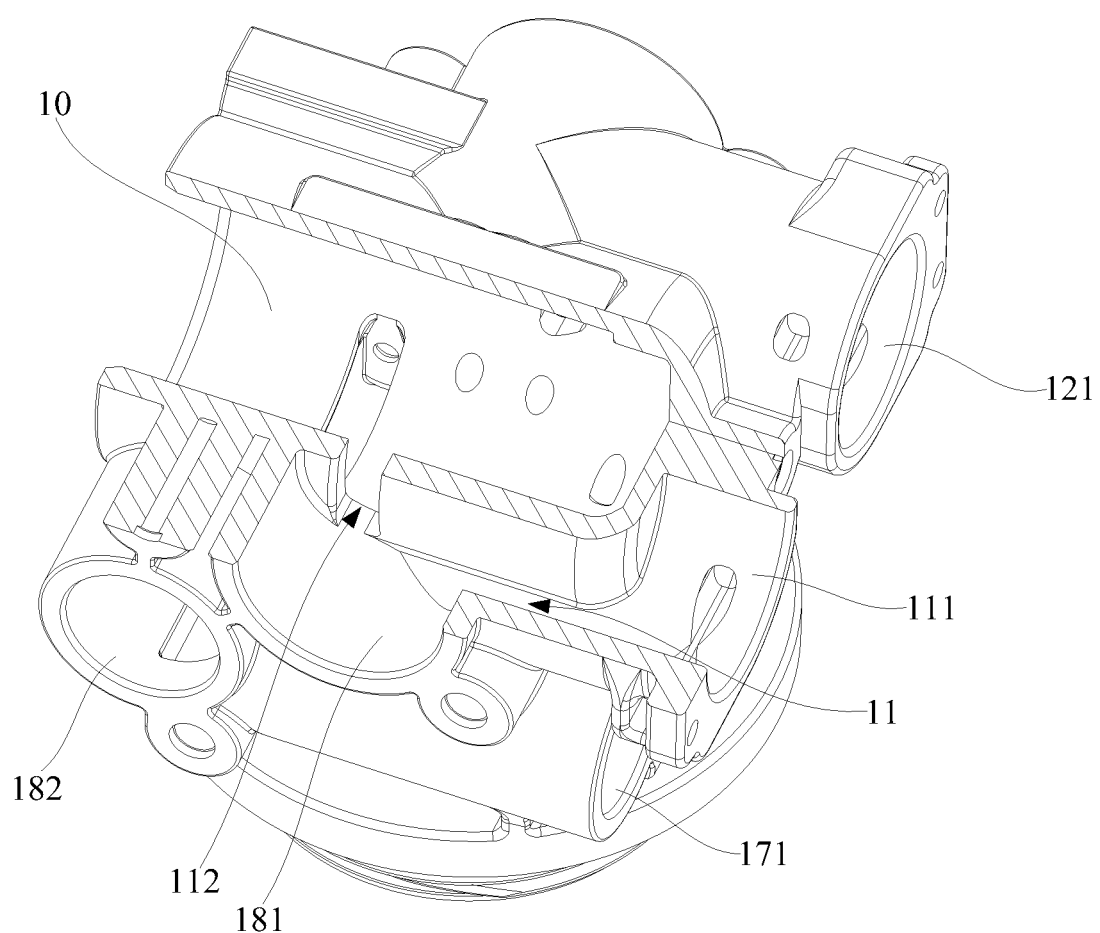
FIG. 27 is a cross-sectional view taken along line V-V of FIG. 26.
Figure 28:
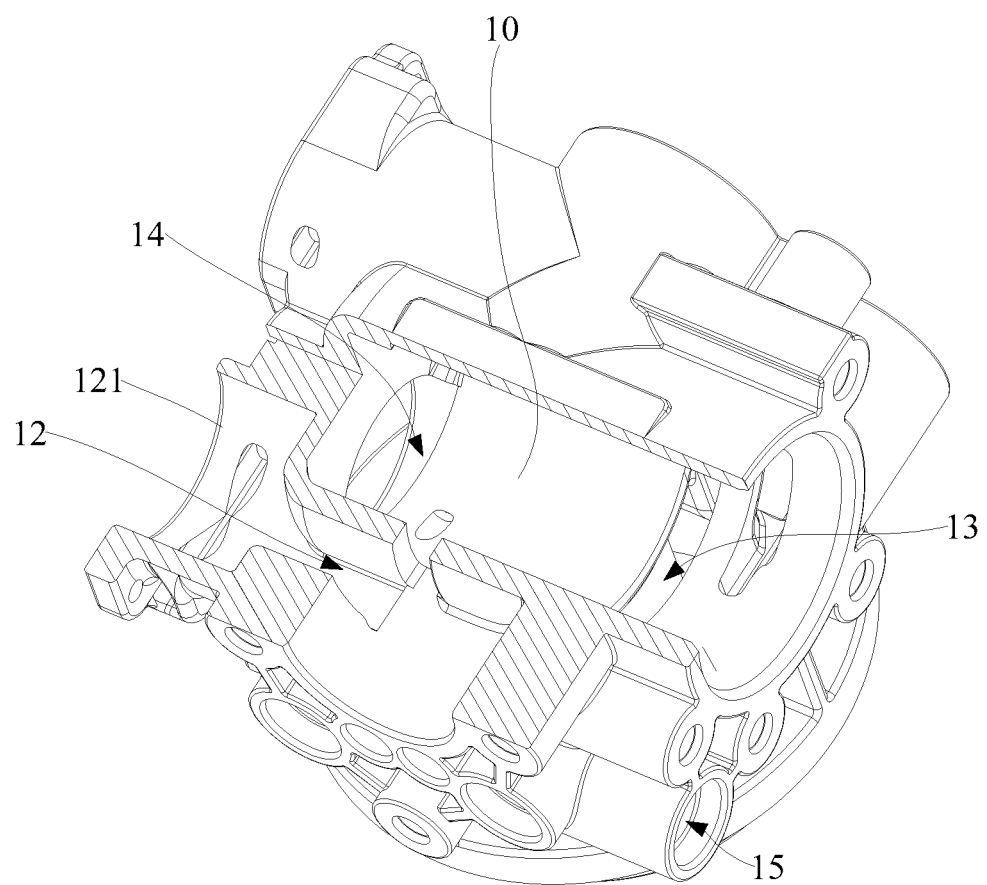
FIG. 28 is a cross-sectional view taken along line VI-VI of FIG. 26.
Figure 29:
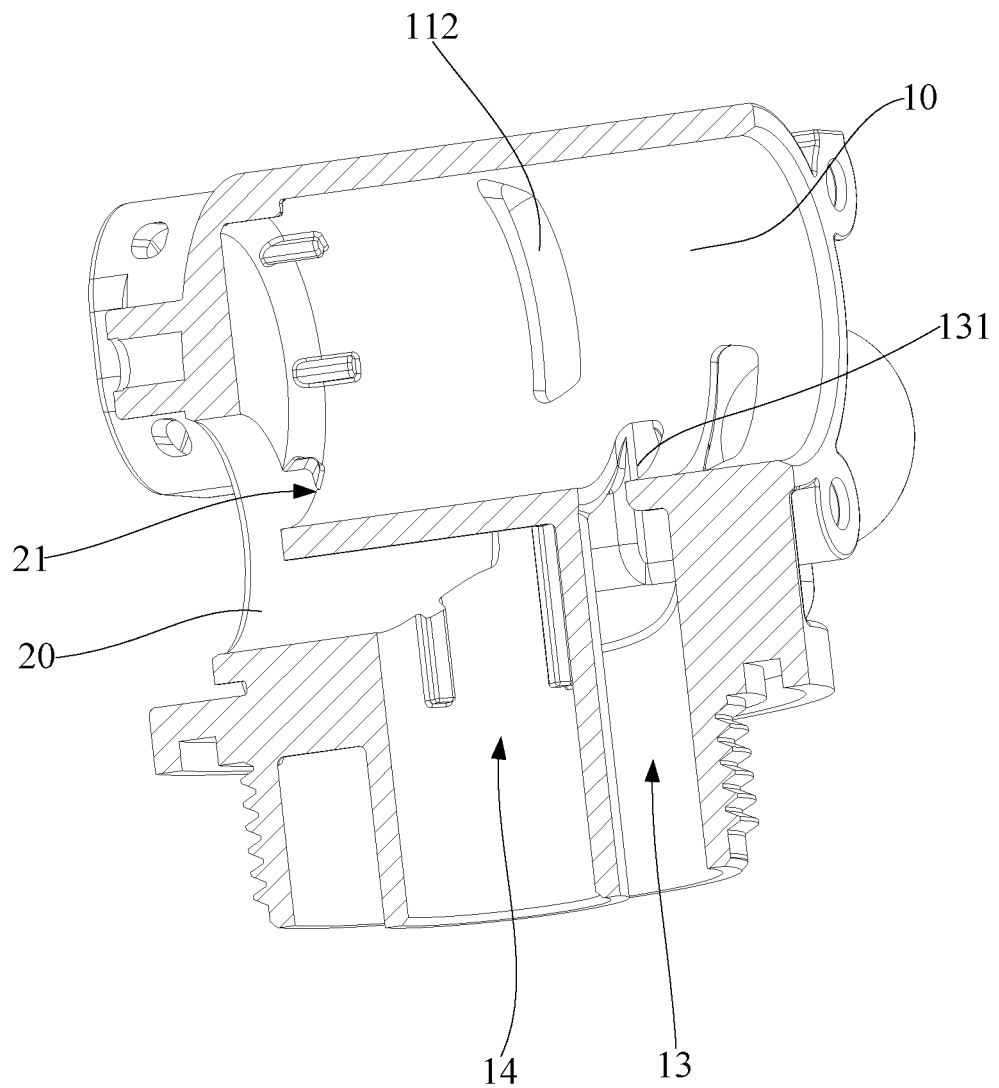
FIG. 29 is a cross-sectional view taken along line VII-VII of FIG. 26.
Figure 30:
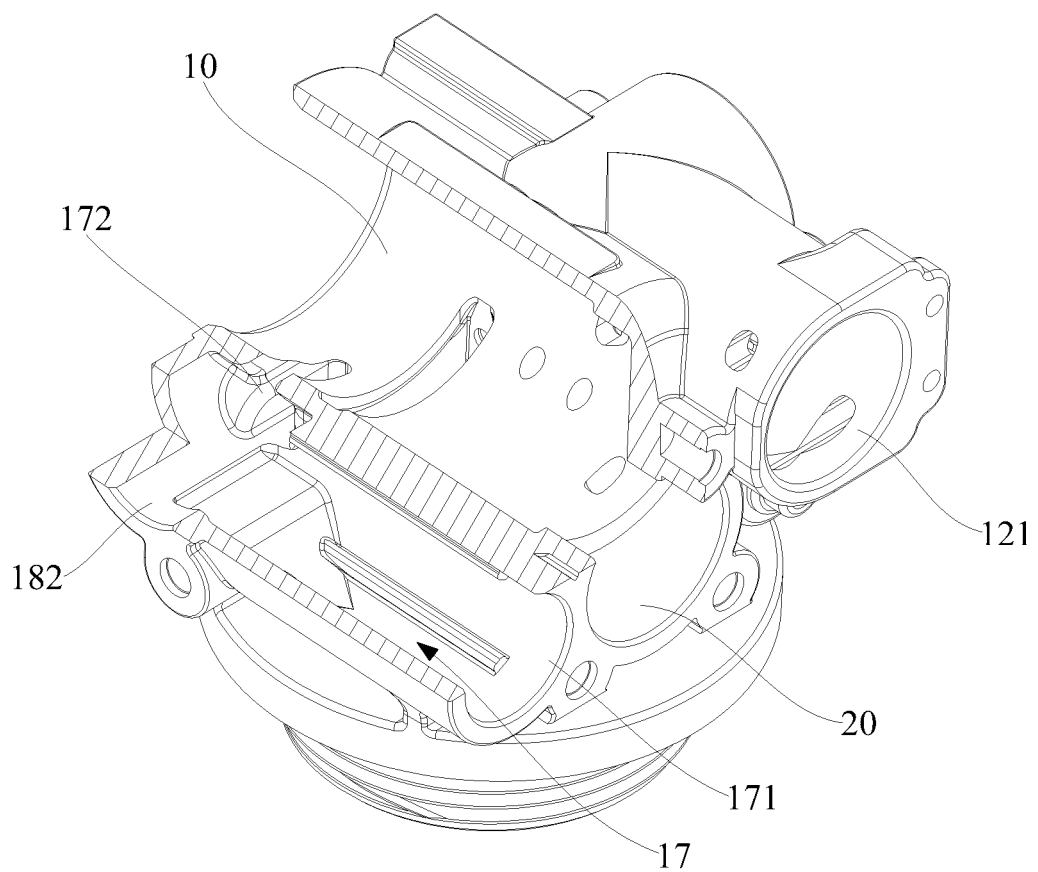
FIG. 30 is a cross-sectional view taken along line VIII-VIII of FIG. 26.
Figure 31:
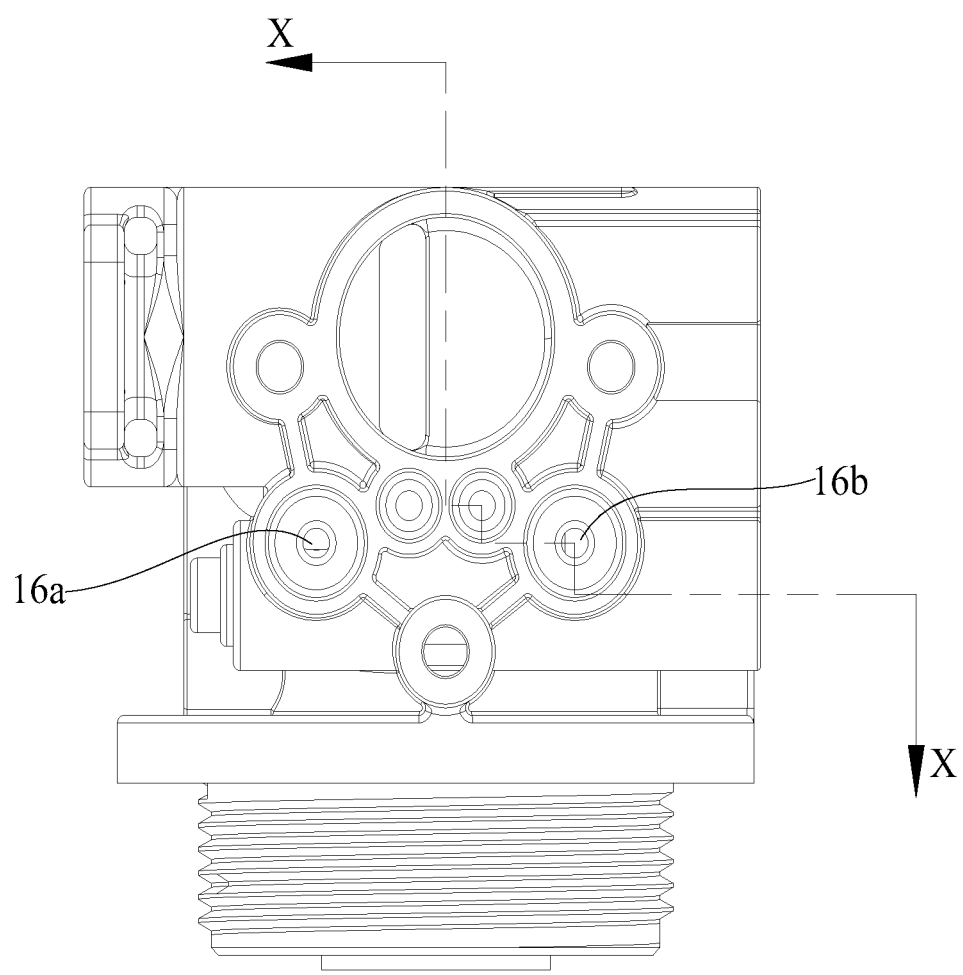
FIG. 31 is a right side view of the valve body of FIG. 25.
Figure 32:
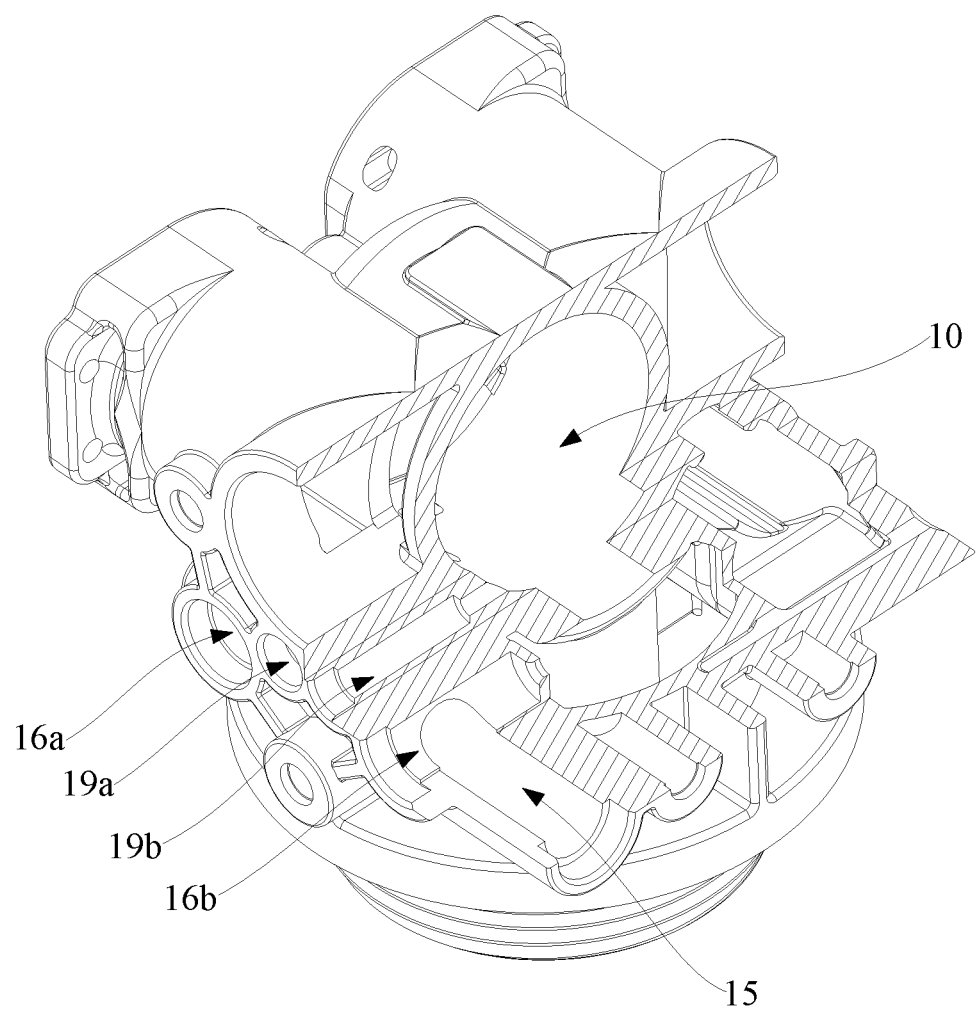
FIG. 32 is a cross-sectional view taken along line X-X of FIG. 31.
Figure 33:
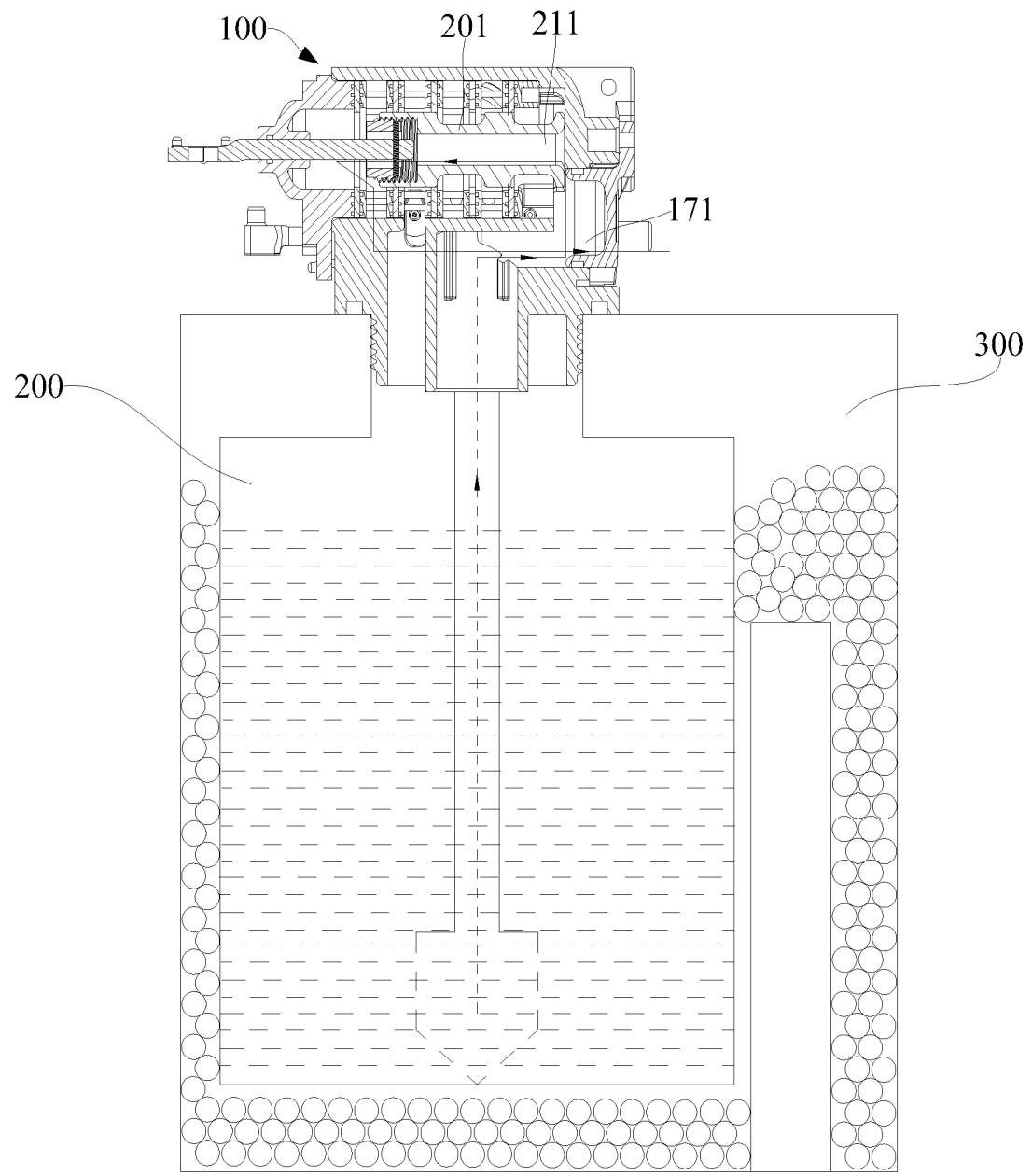
FIG. 33 is a schematic view of a wastewater discharge water path of the water softener in a saline solution front washing state.
Figure 34:
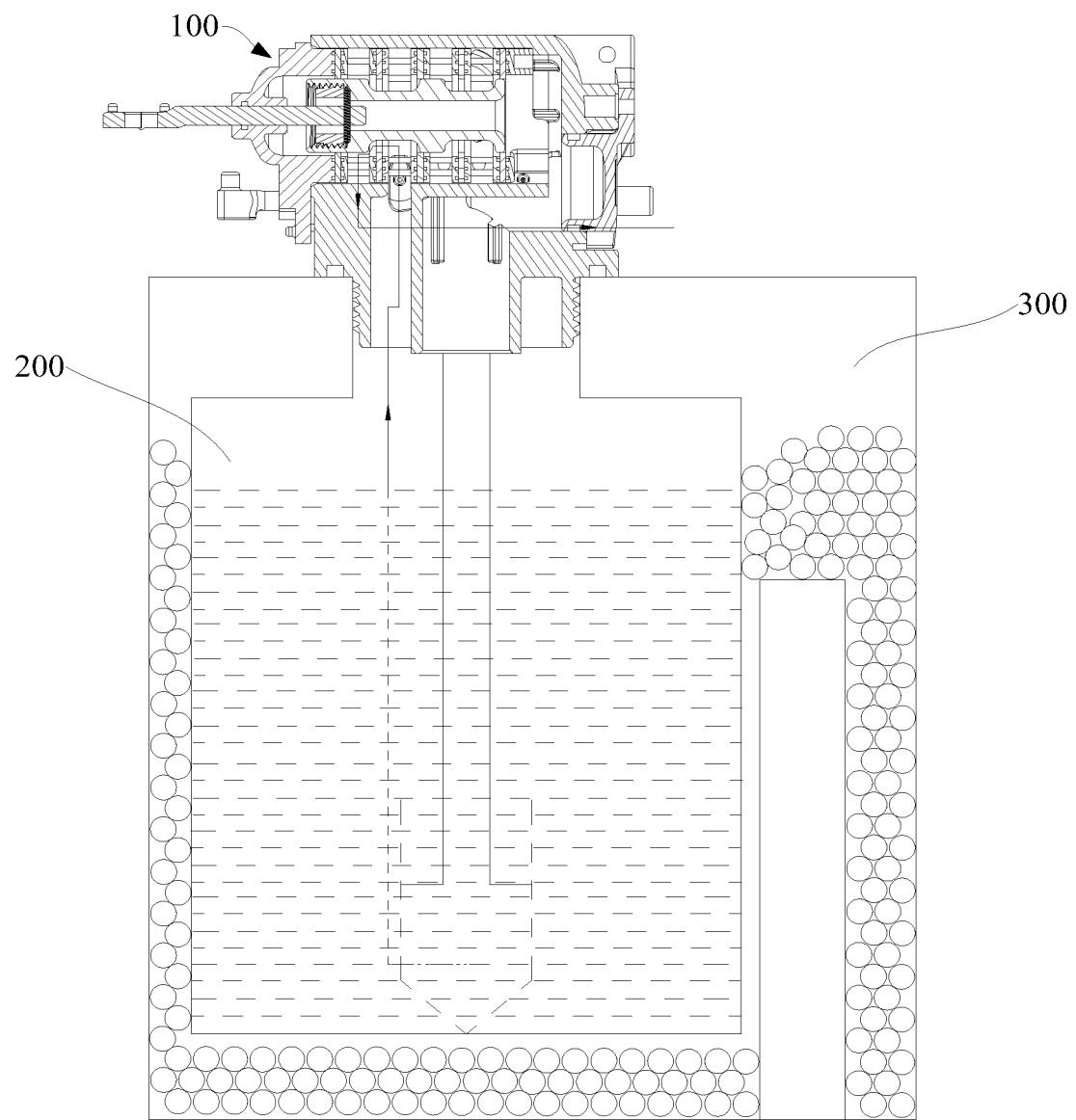
FIG. 34 is a schematic view of a wastewater discharge water path of the water softener in a saline solution back washing state.
Figure 35:
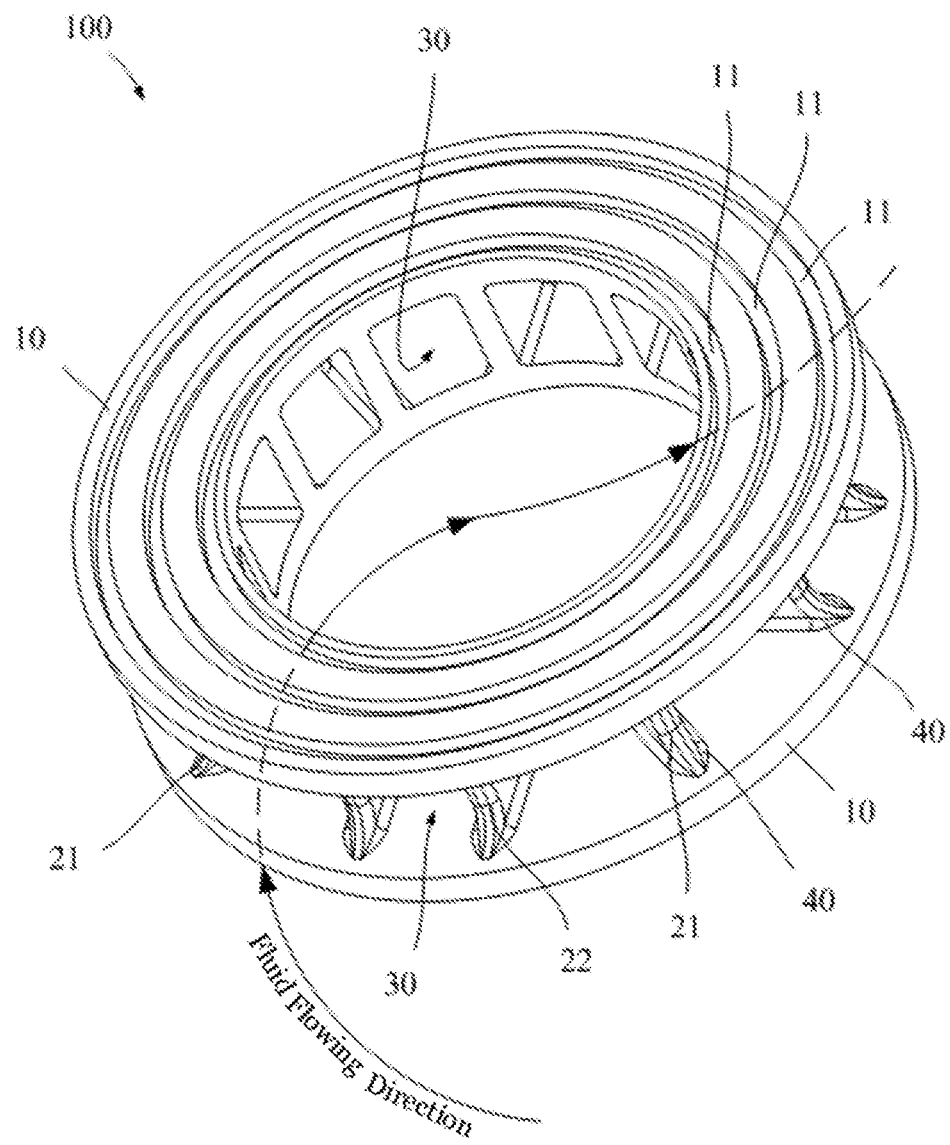
FIG. 35 is schematic view of an embodiment of a grid in accordance with the present application.
Figure 36:
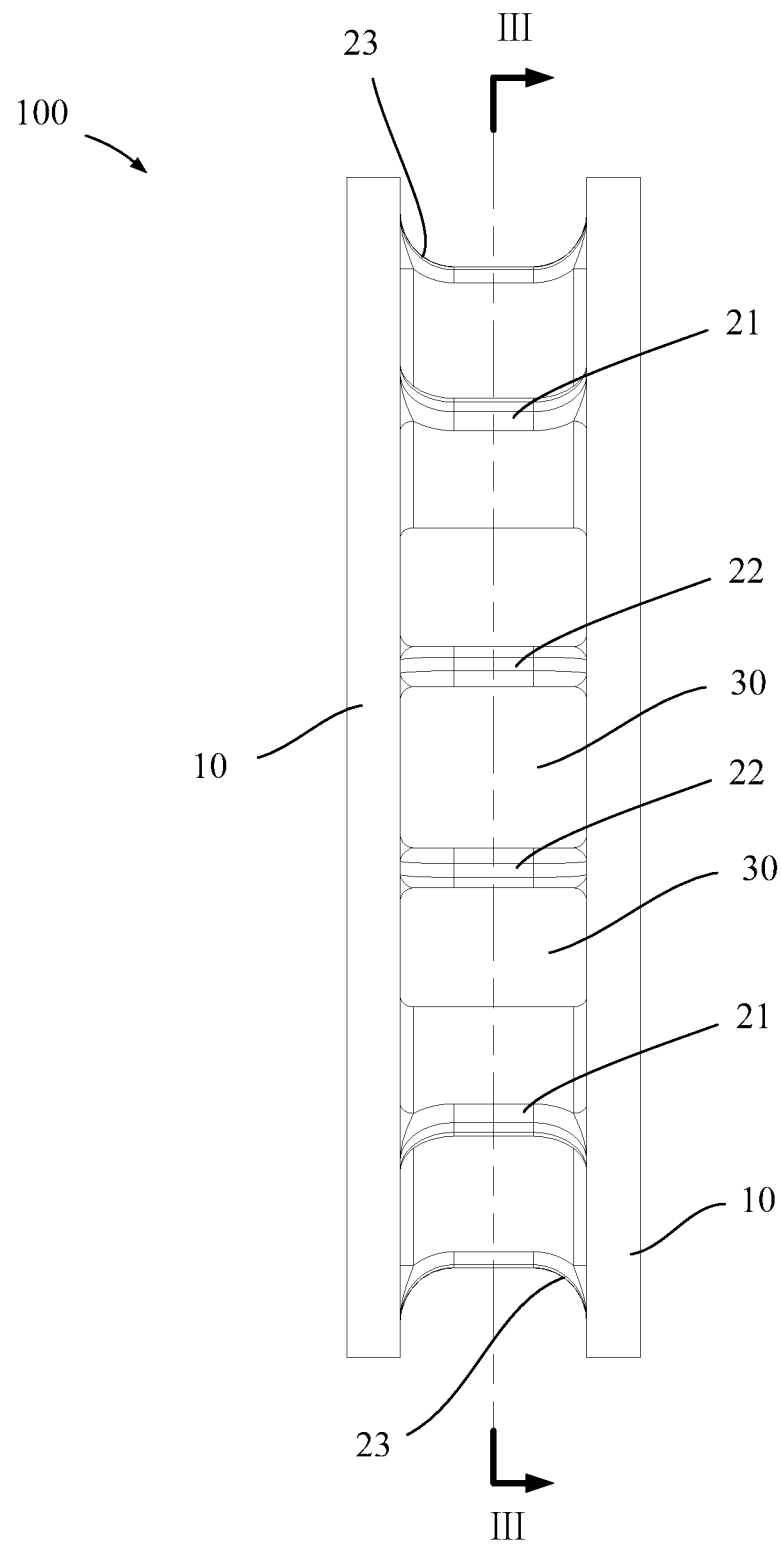
FIG. 36 is a side elevational view of the grid of FIG. 35.
Figure 37:
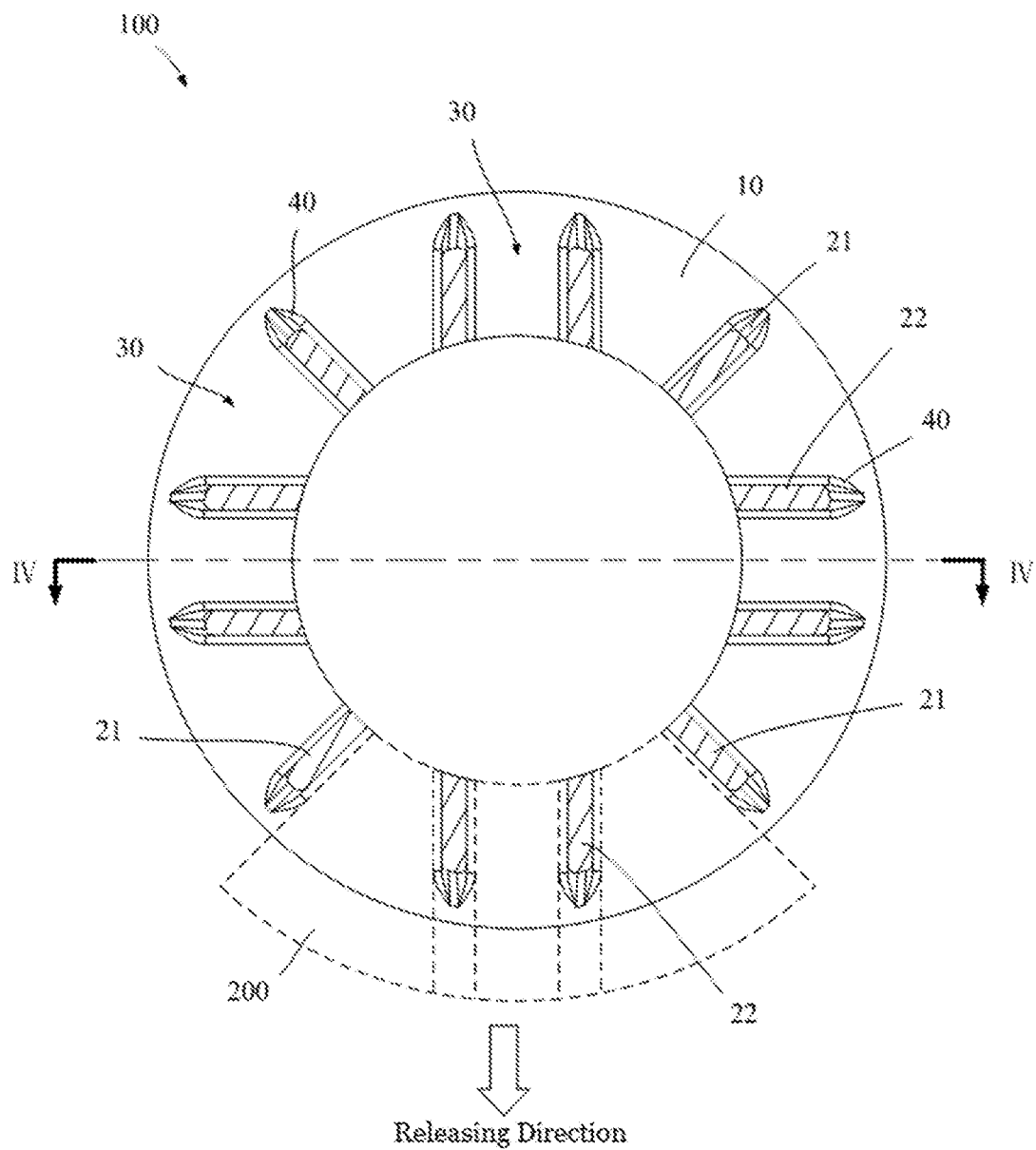
FIG. 37 is a cross-sectional view of the grid of the present application taken along line III-III of FIG. 36.
Figure 38:
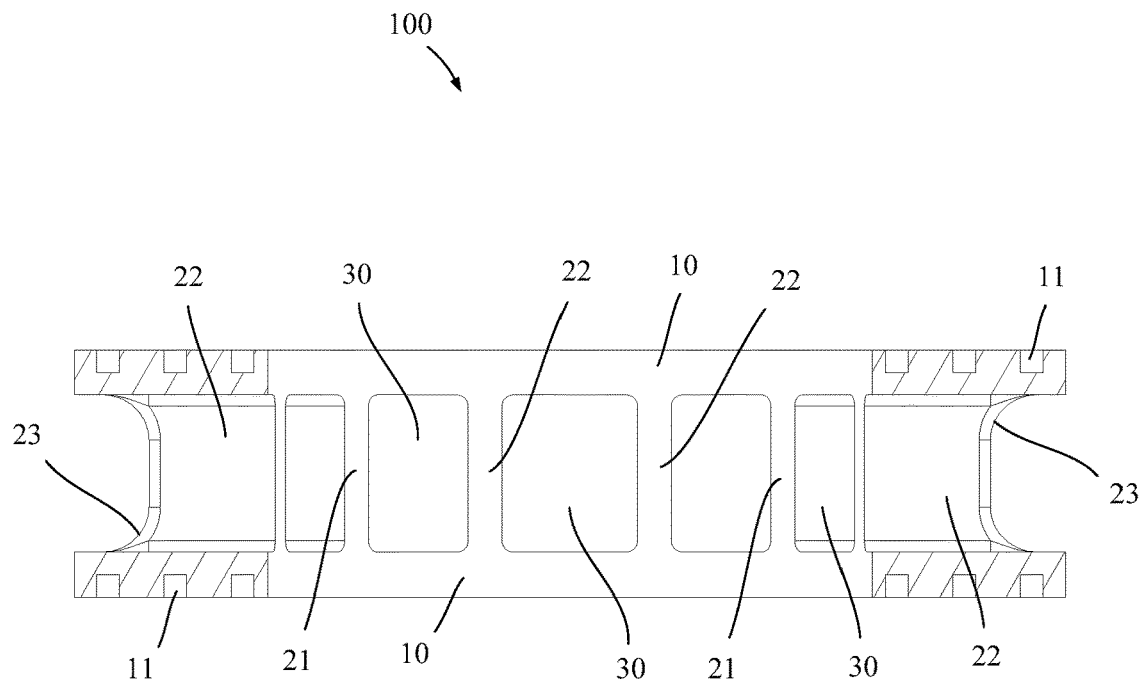
FIG. 38 is a cross-sectional view of the grid of the present application taken along line IV-IV of FIG. 37.
Figure 39:
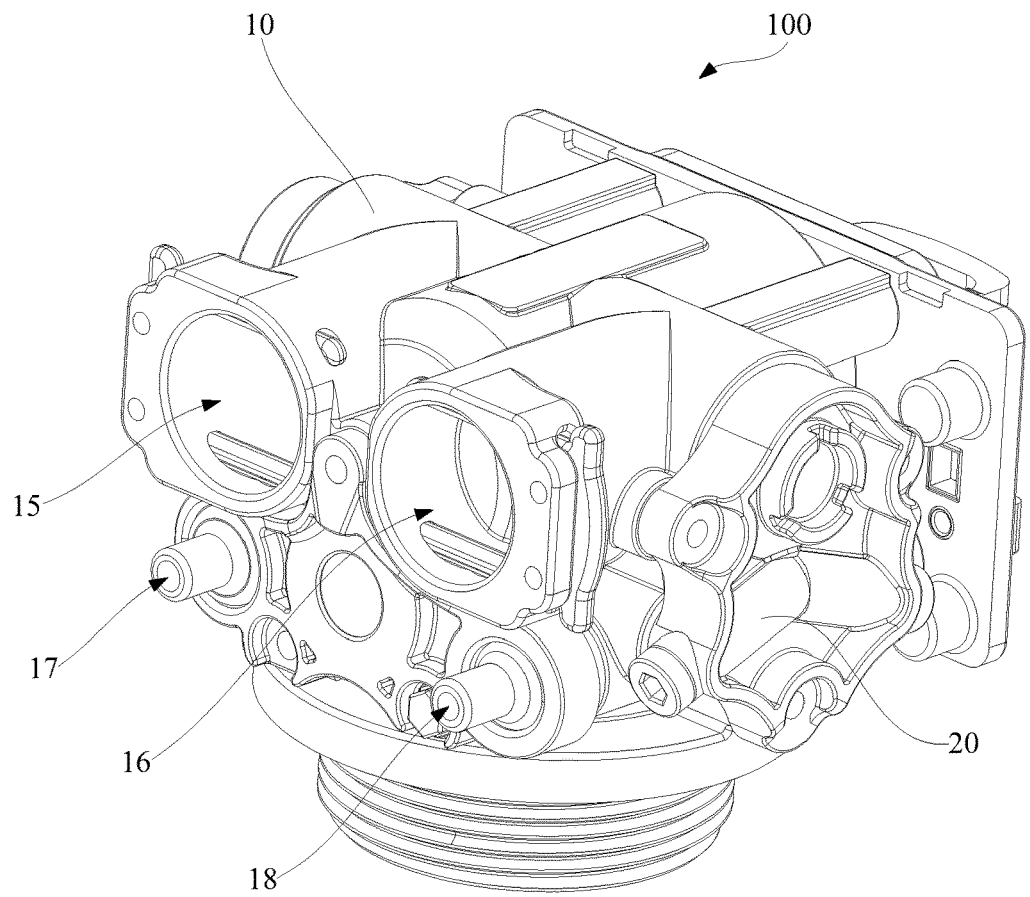
FIG. 39 is schematic view of an embodiment of a water softener valve in accordance with the present application.
Figure 40:
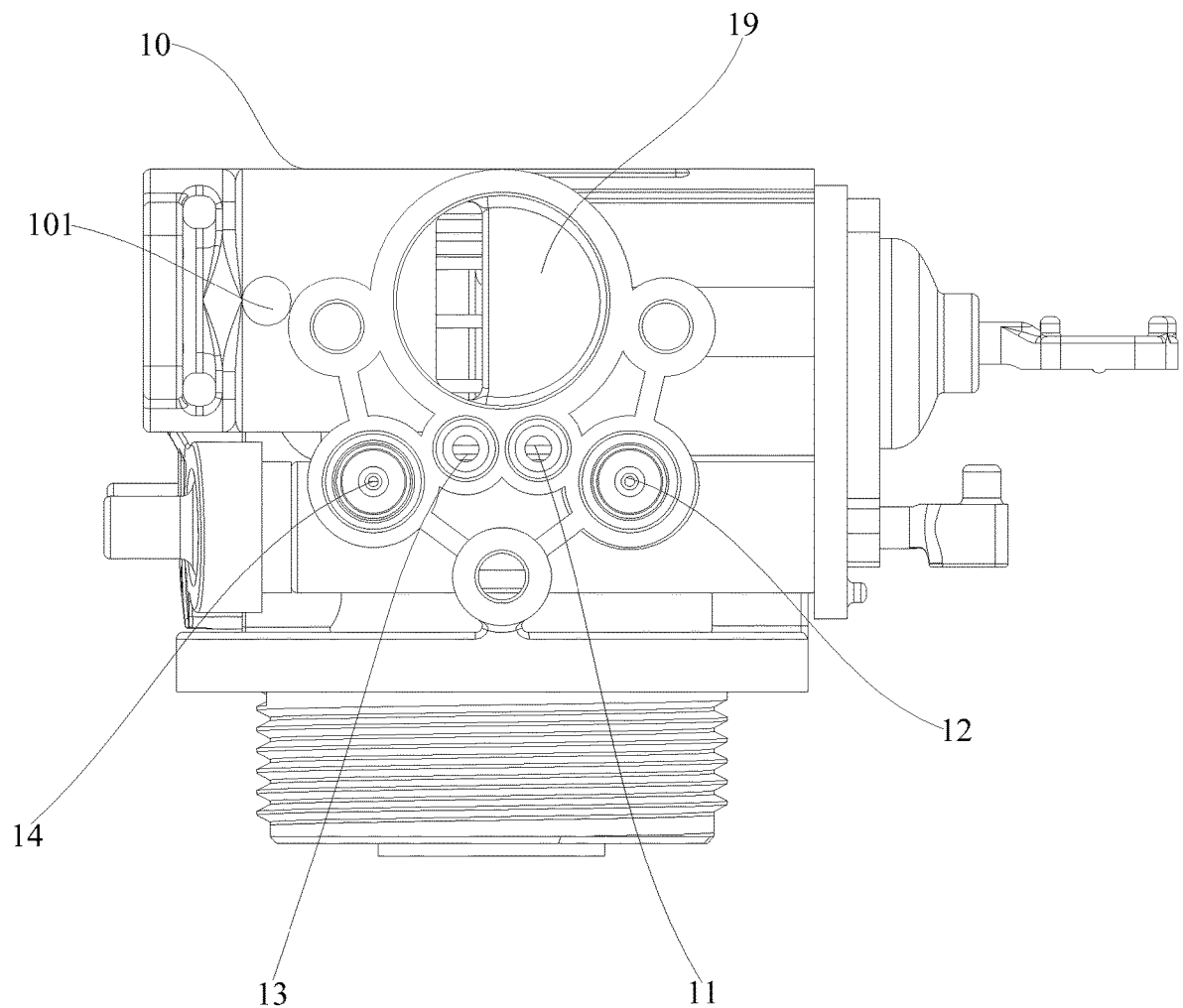
FIG. 40 is a side elevational view of the valve body of the water softener valve of FIG. 39.
Figure 41:
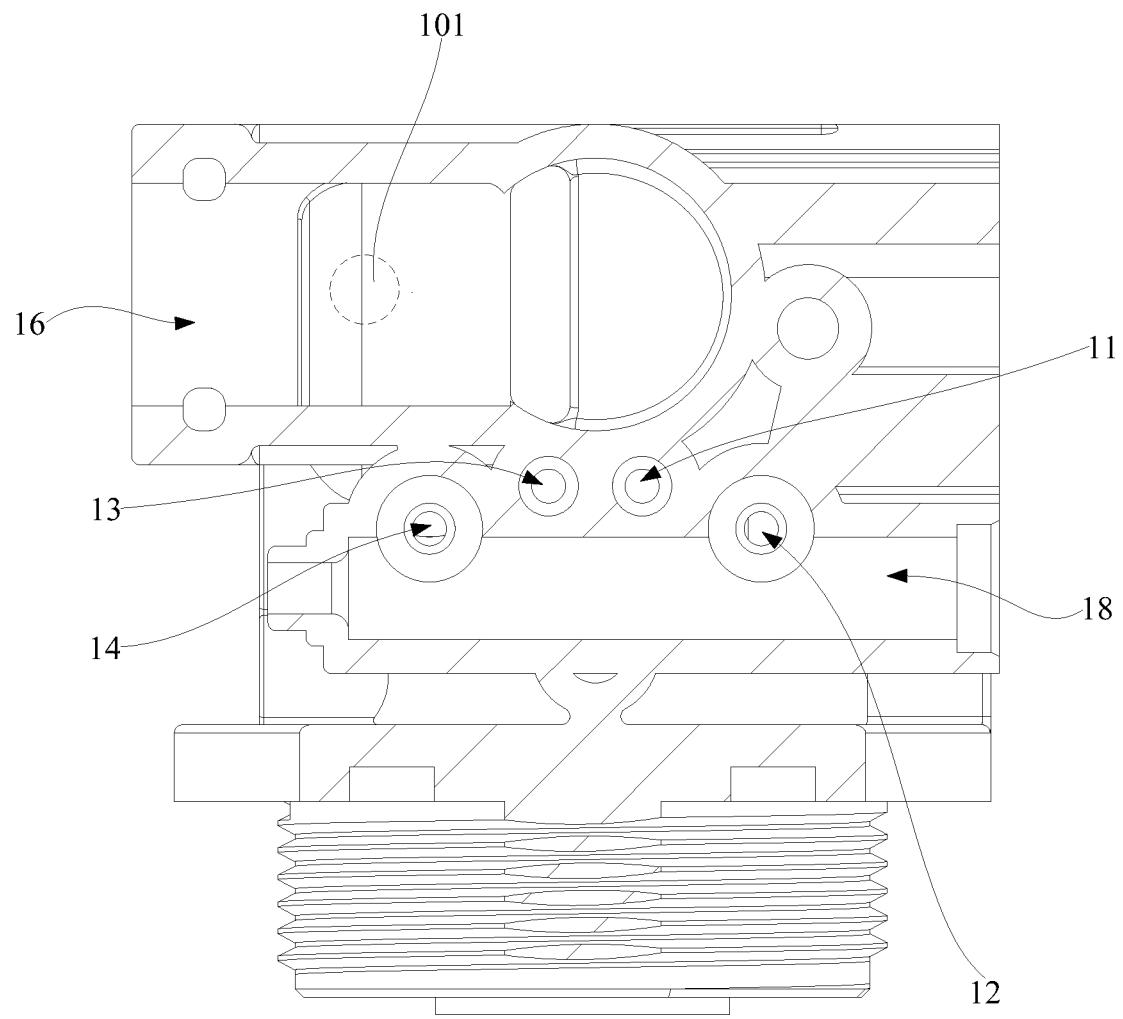
FIG. 41 is a schematic cross-sectional view illustrating the inside of the valve body of FIG. 40.
Figure 42:
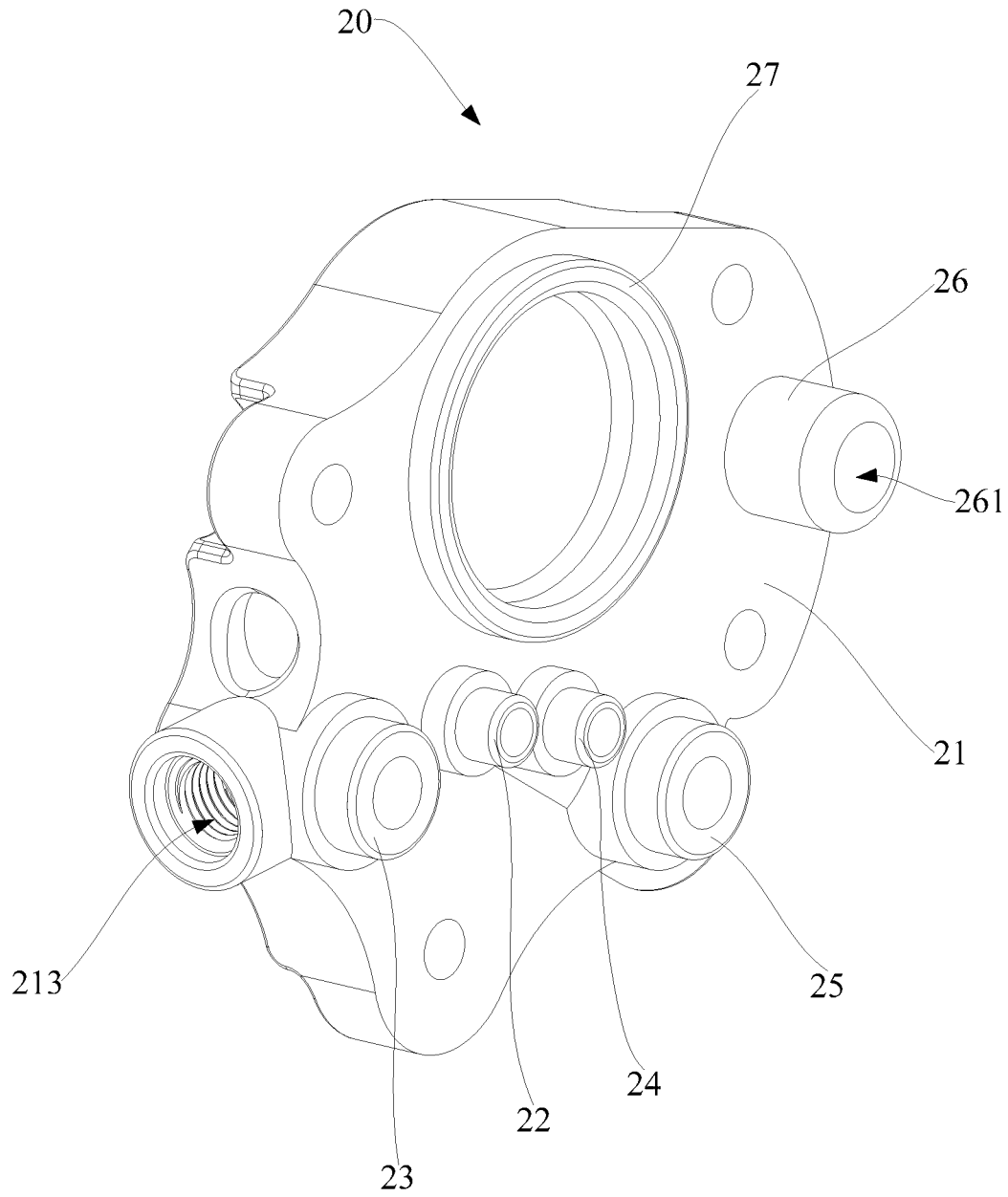
FIG. 42 is schematic view of an embodiment of an end cap in accordance with the present application.
Figure 43:
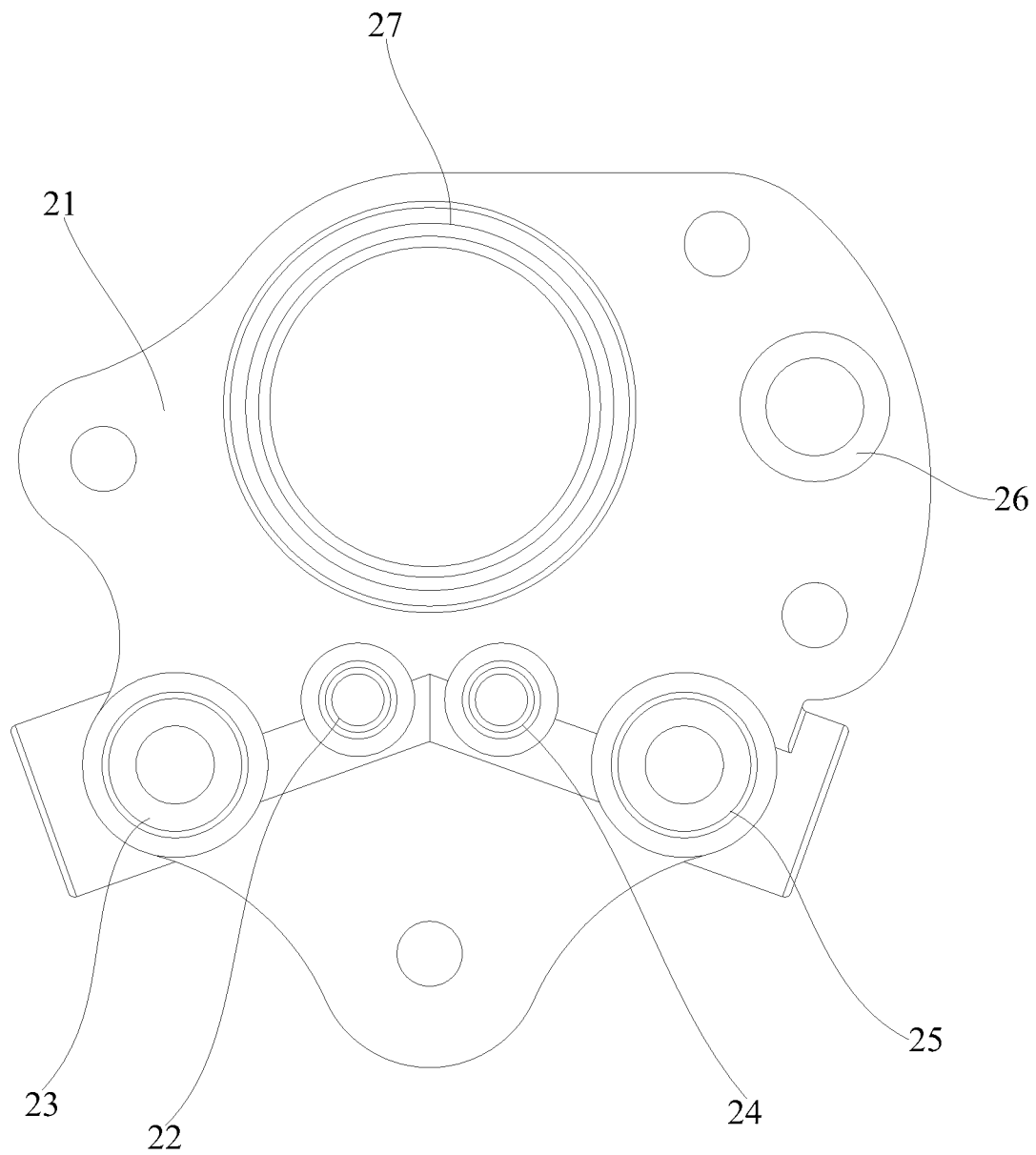
FIG. 43 is a front elevational view of the end cap of FIG. 42.
Figure 44:
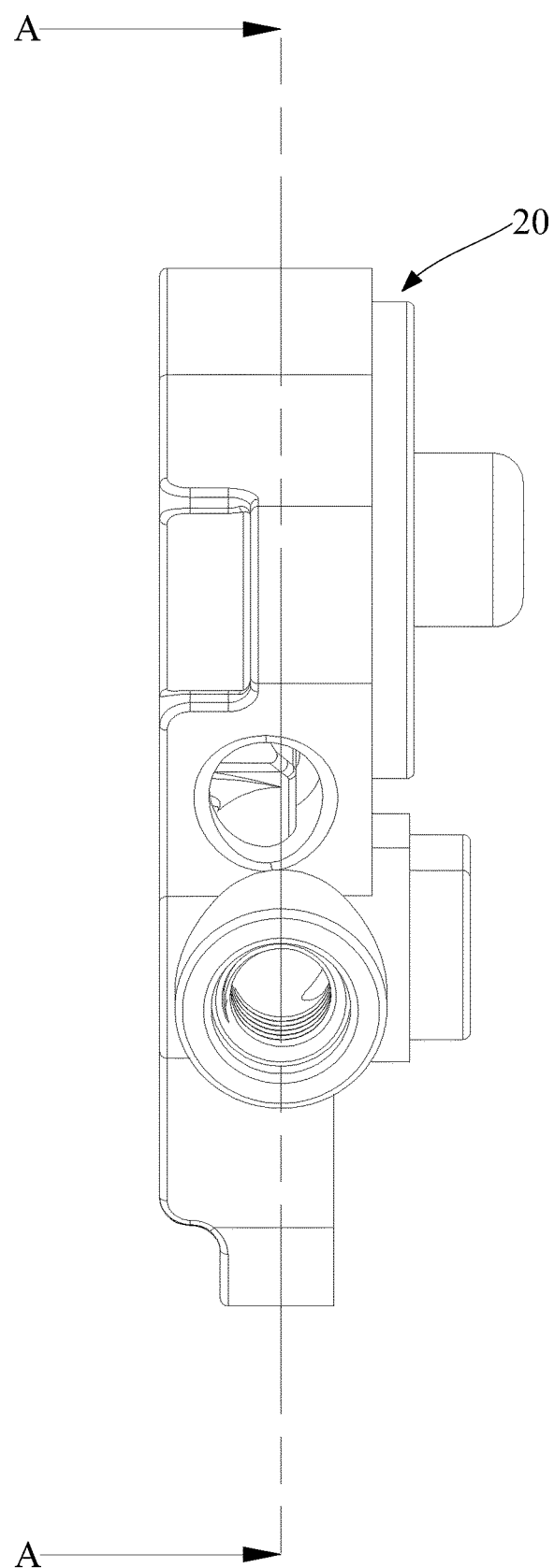
FIG. 44 is a side elevational view of the end cap of FIG. 42.
Figure 45:
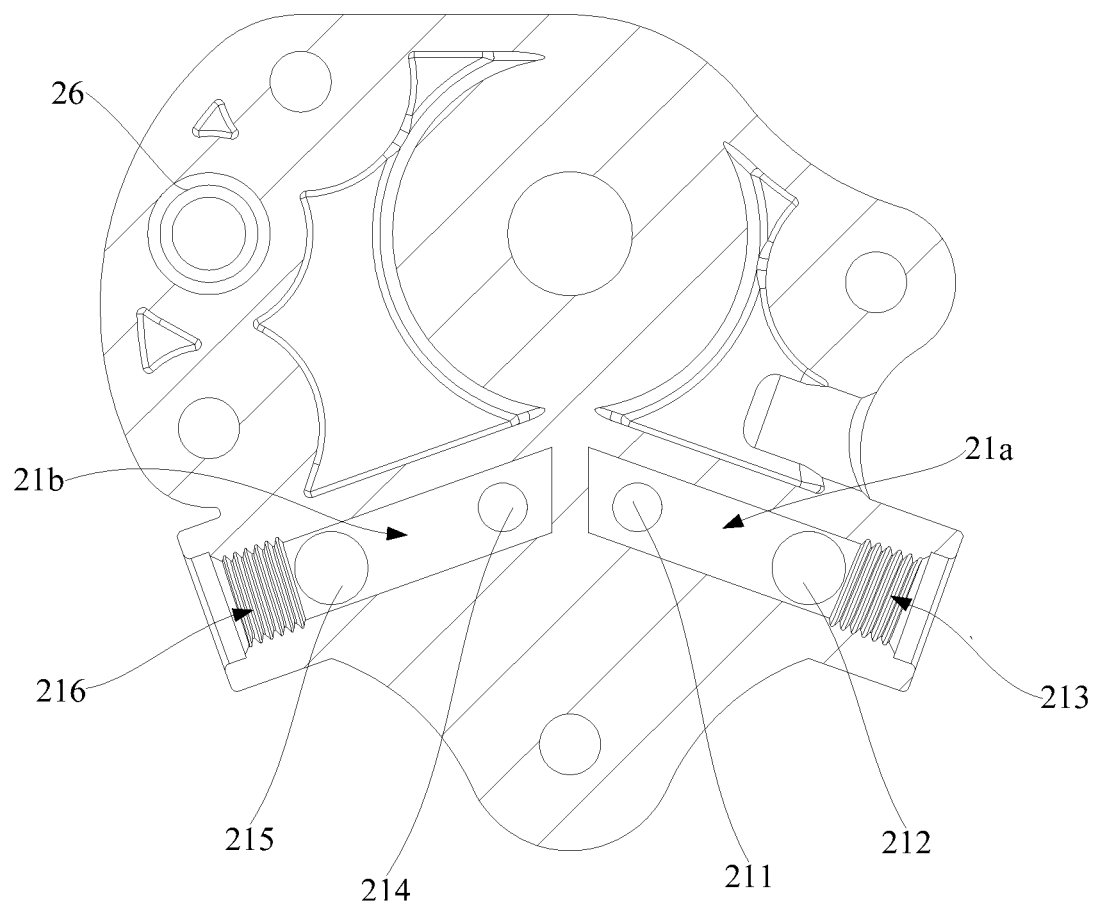
FIG. 45 is a cross-sectional view of the end cap of FIG. 44 taken along plane A-A.
Figure 46:
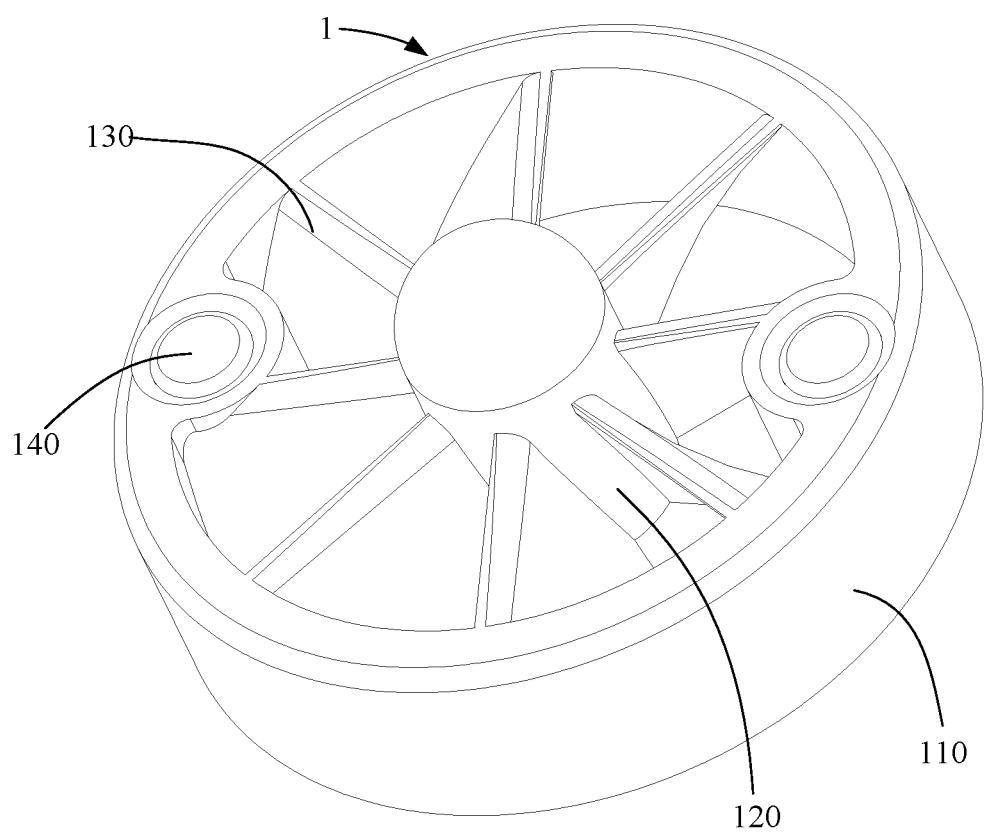
FIG. 46 is a schematic view of an embodiment of an impeller of a flow meter in accordance with the present application.
Figure 47:
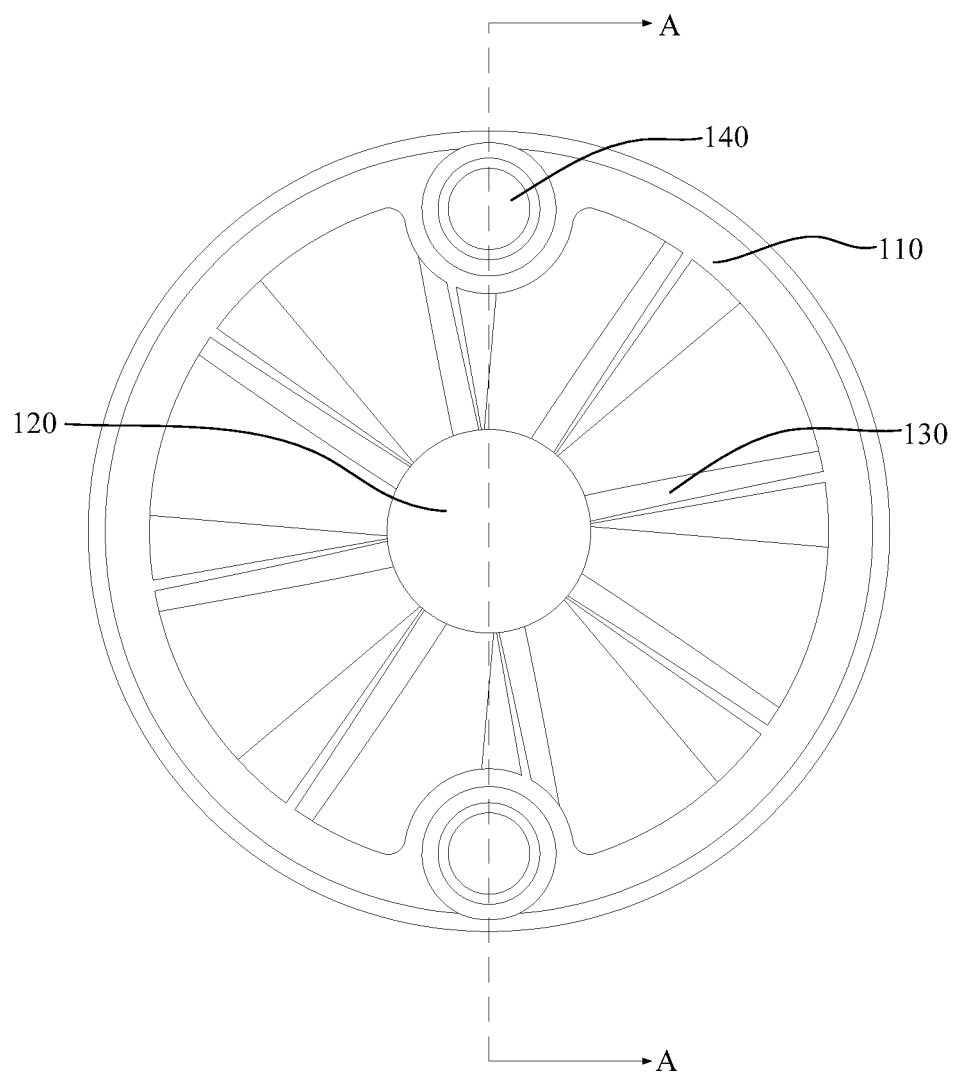
FIG. 47 is a schematic view of the impeller of FIG. 46 taken from another perspective.
Figure 48:
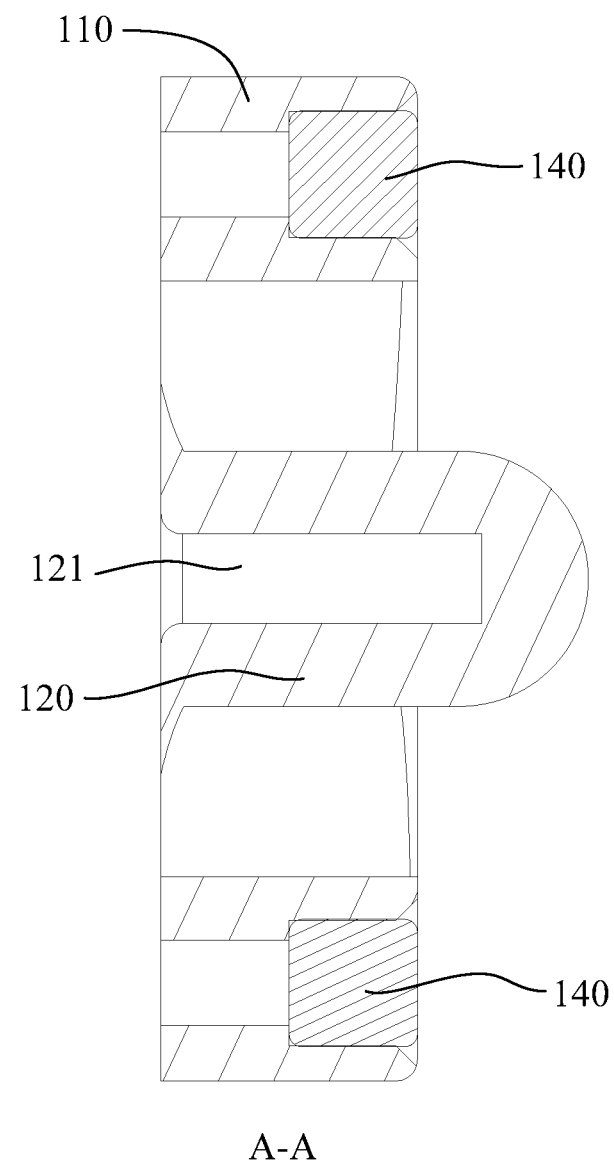
FIG. 48 is a cross-sectional view of the impeller of FIG. 47 taken along line A-A.
Figure 49:
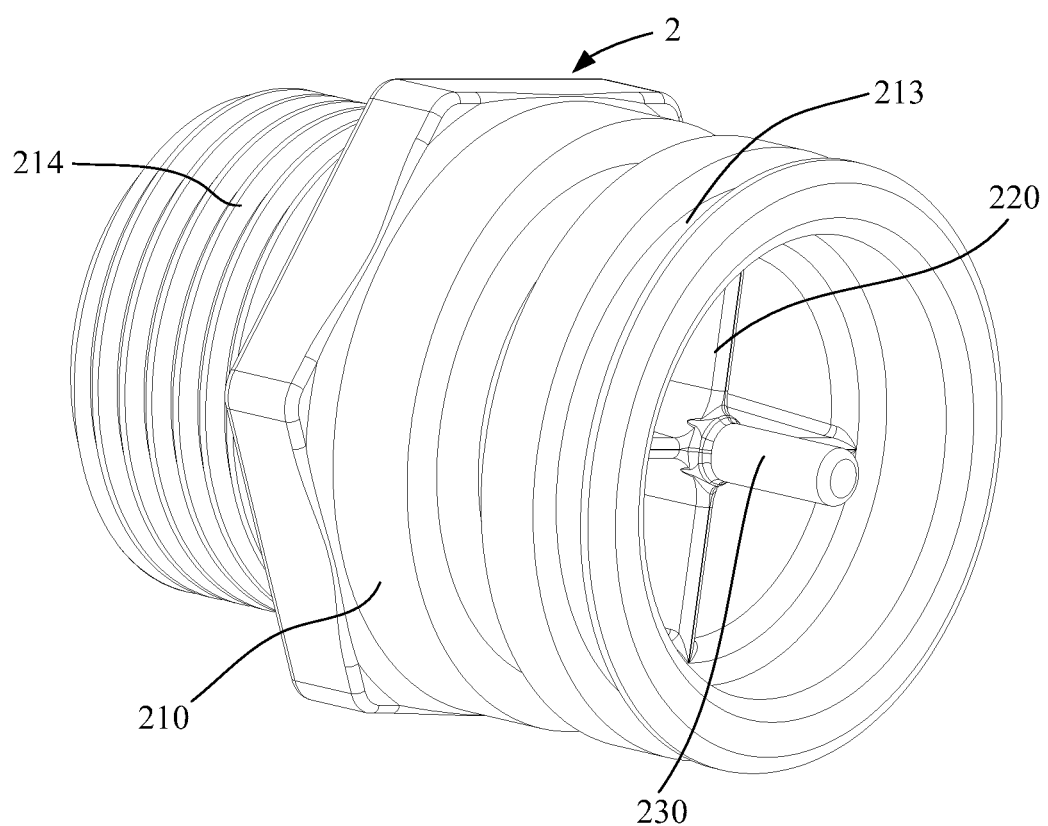
FIG. 49 is a schematic view of an embodiment of an impeller mounting head of a flow meter in accordance with the present application.
Figure 50:
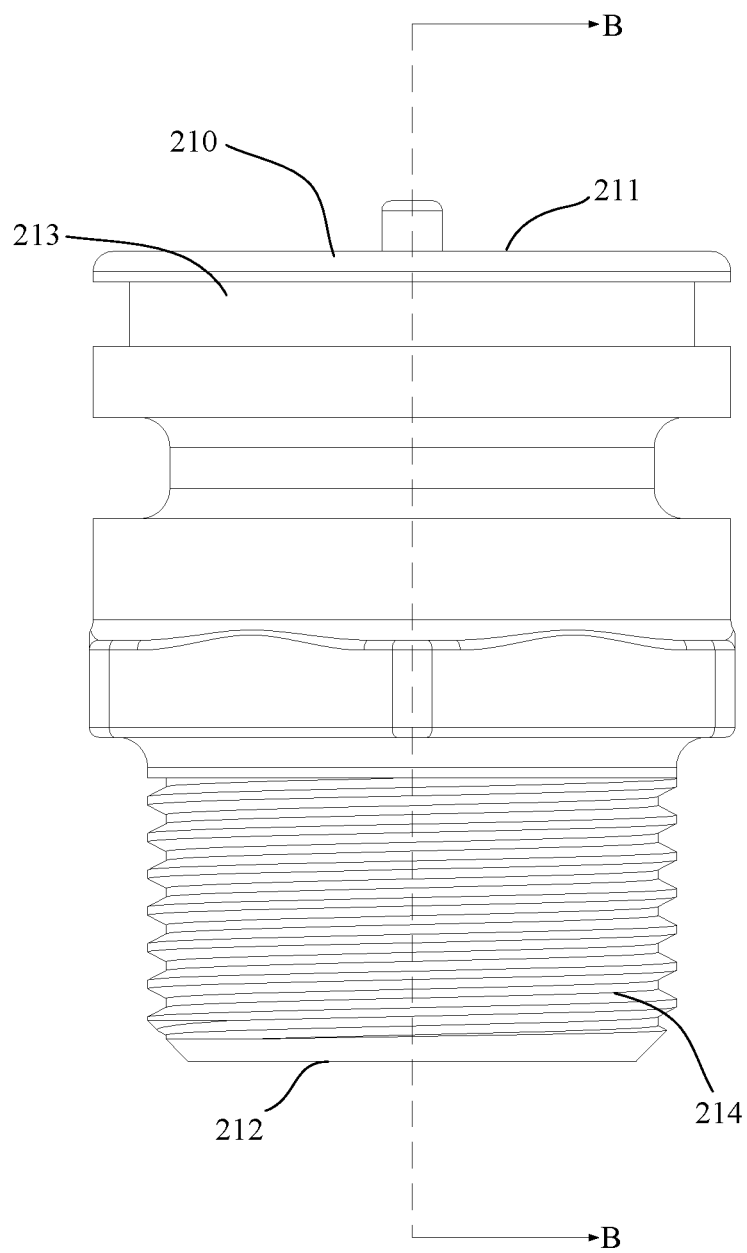
FIG. 50 is a schematic view of the impeller mounting head of FIG. 49 taken from another perspective.
Figure 51:
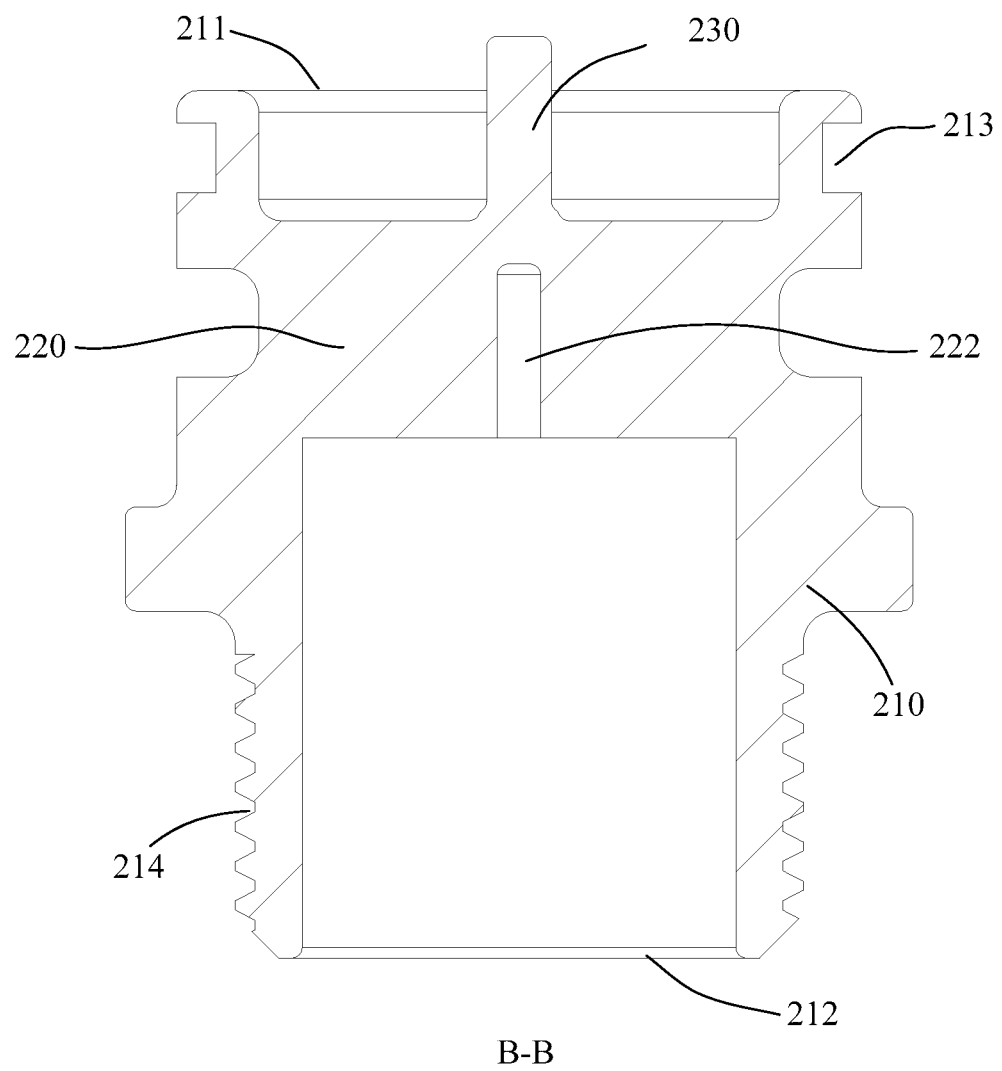
FIG. 51 is a cross-sectional view of the impeller mounting head of FIG. 50 taken along line B-B.
Figure 52:
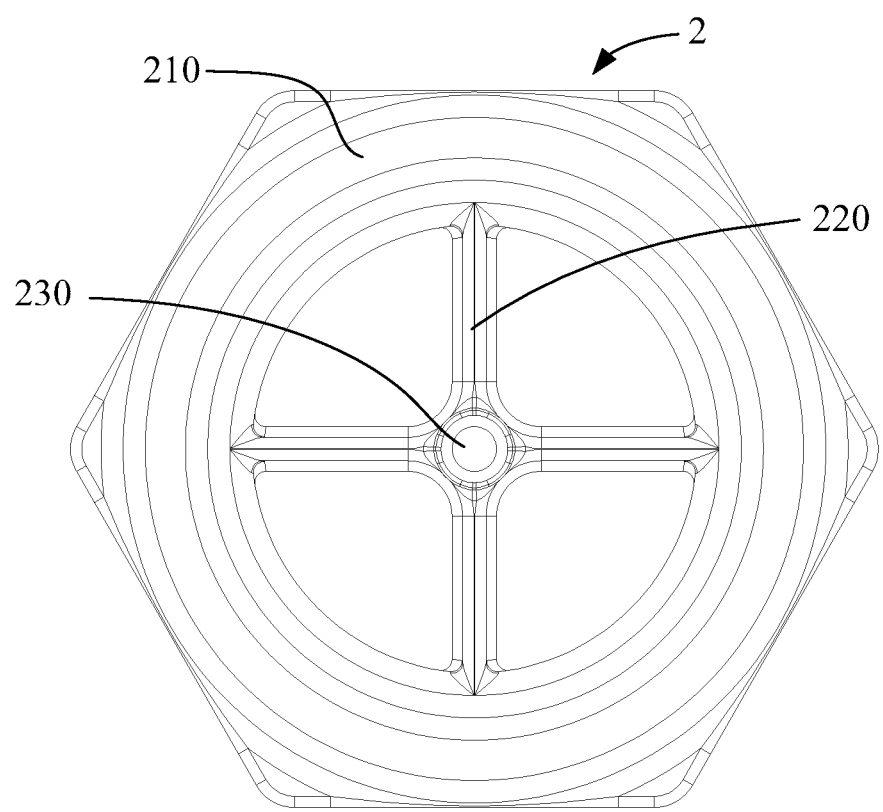
FIG. 52 is a schematic view of the impeller mounting head of FIG. 49 taken from yet another perspective.
Figure 53:
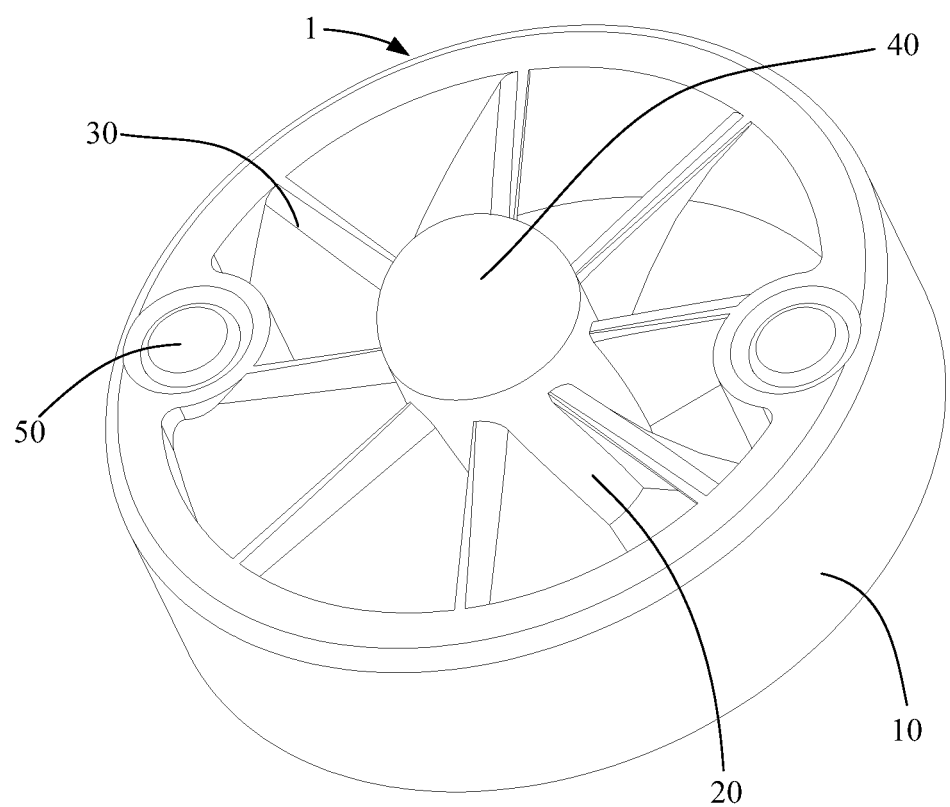
FIG. 53 is a schematic view of an embodiment of an impeller in accordance with the present application.
Figure 54:
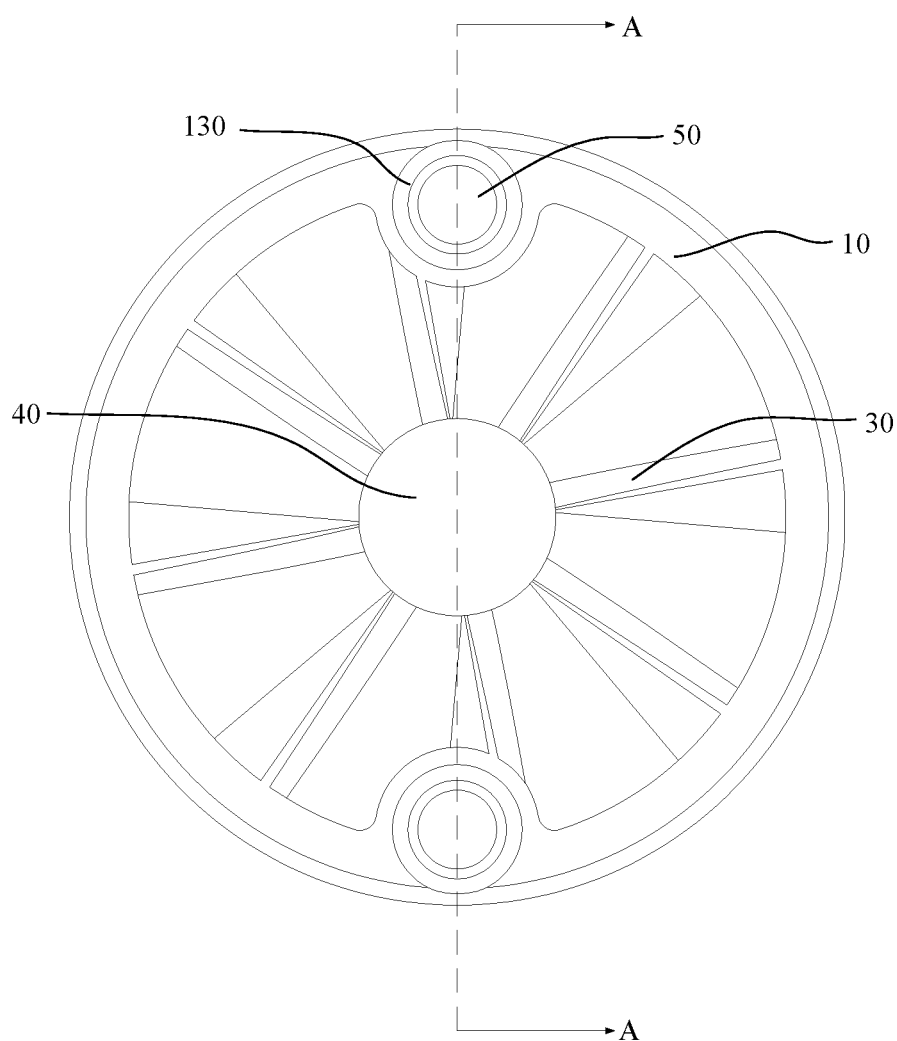
FIG. 54 is a schematic view of the impeller of FIG. 53 taken from another perspective.
Figure 55:
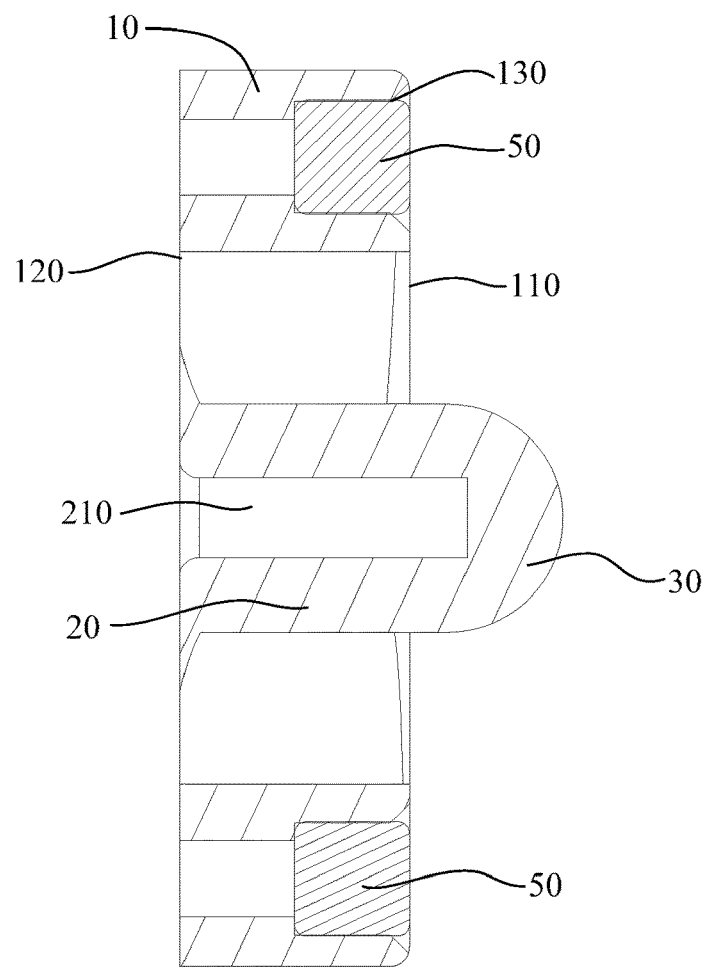
FIG. 55 is a cross-sectional view of the impeller of FIG. 54 taken along line A-A.
Figure 56:
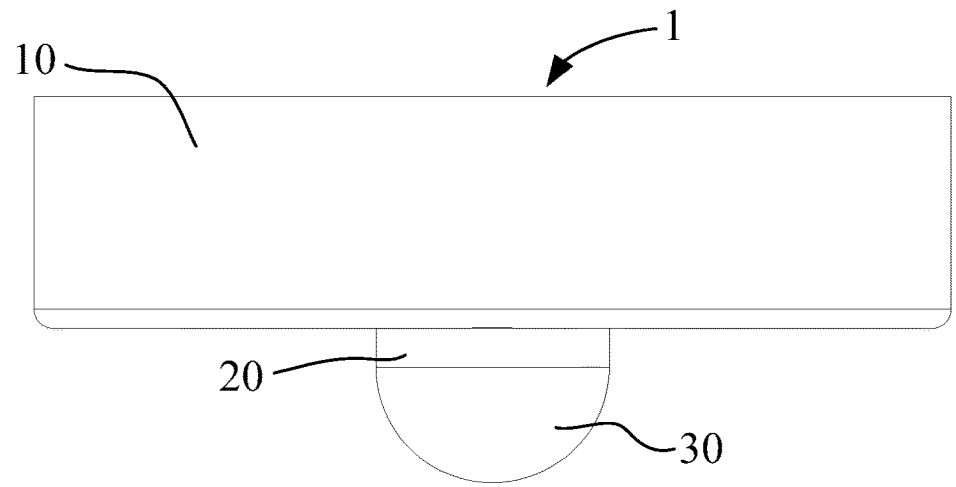
FIG. 56 is a schematic view of the impeller of FIG. 53 taken from yet another perspective.
Figure 57:
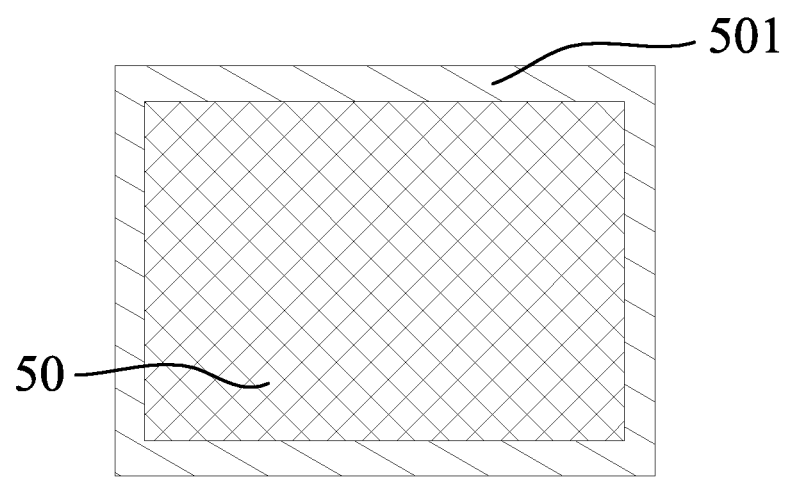
FIG. 57 is a schematic view illustrating the magnetic member and the anti-degaussing coating of the impeller of FIG. 53 in an exemplary embodiment.

Referring to FIG. 6, FIG. 7 and FIG. 12, the valve body 10 further includes a softening inlet passage 16 and a softening outlet passage 17 communicating with the valve chamber 11. The water inlet passage 12 communicates with the softening inlet passage 16, and the water outlet passage 13 communicates with the softening outlet passage 17. The ion exchange tank 200 includes a tank body 201 and a center tube 202 disposed in the tank body 201. An ion exchange chamber 203 is formed between the center tube 202 and the inner wall of the tank body 201. The softening inlet passage 16 is in communication with the ion exchange chamber 203, and the softening outlet passage 17 is in communication with the center tube 202.

In this embodiment, in the softened water production process, water flows into the valve chamber 11 from the water inlet passage 12, and is then guided by the valve chamber 11 to the water softening passage. Further the water enters the ion exchange chamber 203 for softening treatment. The softened water is then transported by the center tube 202 to the softening outlet passage 17 and finally discharged by the water outlet passage 13 for use or storage by the user. By integrally providing the softening inlet passage 16 and the softening outlet passage 17 in the valve body 10, the need for external piping is eliminated, and water leakage of the water softener valve 100 can be effectively prevented.

The valve body 10 further includes a mounting head 18 disposed on one side of the valve chamber 11 in a third orientation. The mounting head 18 is detachably fixed to the ion exchange tank 200. The softening inlet passage 16 and the softening outlet passage 17 are defined within the mounting head 18. The first orientation, the second orientation, and the third orientation are perpendicular to one another.

In this embodiment, the mounting head 18 can be detachably mounted on the ion exchange tank 200 by means of a threaded connection, a snap fit connection, or the like to facilitate the disassembly and maintenance of the water softener valve 100. By providing the mounting head 18, on the one hand, it is made convenient to mount the water softener valve 100 on the ion exchange tank 200, and on the other hand, the softening inlet passage 16 and the softening outlet passage 17 can be defined in the mounting head 18, so that both the external structure and the internal space of the mounting head 18 are effectively utilized. This makes the structure of the valve body 10 more compact, where the third orientation coincides with the up-down orientation.

Referring to FIG. 7, in one embodiment, the mounting head 18 includes a first annular cylinder 181 and a second annular cylinder 182 that extend in the third orientation. The first annular cylinder 181 is disposed to surround the outside of the second annular cylinder 182 and is detachably connected to the ion exchange tank 200. The softening inlet passage 16 is created between the first annular cylinder 181 and the second annular cylinder 182. The softening outlet passage 17 is defined in the inner cavity of the second annular cylinder 182. Because the softening inlet passage 16 and the softening outlet passage 17 are defined by the annular structure of the first annular cylinder 181 and the second annular cylinder 182, the internal space of the mounting head 18 is sensibly utilized. Typically, the outer peripheral wall of the first annular cylinder 181 is threaded to facilitate the threaded connection with the tanking mouth of the ion exchange tank 200.

The valve body 10 is provided with a third auxiliary hole 19 in an end surface where the water inlet 121 and the water outlet 131 are located. The third auxiliary hole 19 extends in the first orientation to communicate with the softening outlet passage 17. An inner wall surface of the third auxiliary hole 19 is provided with a third communication hole 191 communicating with the valve chamber 11.

In this embodiment, setting the third auxiliary hole 19 can accommodate to the drafting process in injection molding thereby enabling the molding of the third communication hole 191. In order to make the front end of the valve body 10 more compact, typically the third auxiliary hole 19 is provided on the side of the water inlet 121 and the water outlet 131 close to the mounting head 18 in the third orientation.

In order to further facilitate the drafting process of the mounting head 18 in the injection molding, the softening inlet passage 16 extends through the valve chamber 11 in the third orientation, so that the softening inlet passage 16 and the valve chamber 11 can be made to pass straight through there between without a bypass corner.

Referring to FIGS. 8 to 12, the water softener valve 100 has a softened water producing position, and the valve core assembly 20 includes a piston 21 and a groove defining assembly 22 sleeved around the piston 21. In the softened water producing position, the piston 21 cooperates with the groove defining assembly 22 to define a first connecting passage that communicates the water inlet passage 12 and the softening inlet passage 16, and a second connecting passage that communicates the softening outlet passage 17 and the water outlet passage 13.

In this embodiment, the piston 21 and the groove defining assembly 22 cooperates with each other to communicate or block the various passages to achieve various operating modes of the water softener. Furthermore, the groove defining assembly 22 and the valve body 10 can be separately arranged and separately manufactured, so that the internal structure of the valve chamber 11 can be more compact, and the manufacturing difficulty can be effectively reduced. There are a plurality of kinds of cooperation between the piston 21 and the groove defining assembly 22. For example, by means of rotational fit or reciprocal motion, the communication or disconnection of the various connecting passages can be achieved. As illustrated in FIG. 12, in the softened water production condition, the raw water enters the ion exchange chamber 203 via the water inlet passage 12, the first connecting passage and the softening inlet passage 16 in succession for softening treatment. Then the softened water flows out through the center tube 202, the softening outlet passage 17, the second connecting passage, and the water outlet passage 13 in sequence. Similarly, the piston 21 and the groove defining assembly 22 can also cooperate with each other to realize operating modes such as saline solution forward washing, saline solution back washing and so on, which however will not be described in detail herein.

Typically, the piston 21 extends in the first orientation, and is reciprocally movable in the first orientation to slidably engage the groove defining assembly 22.

Figure 10:
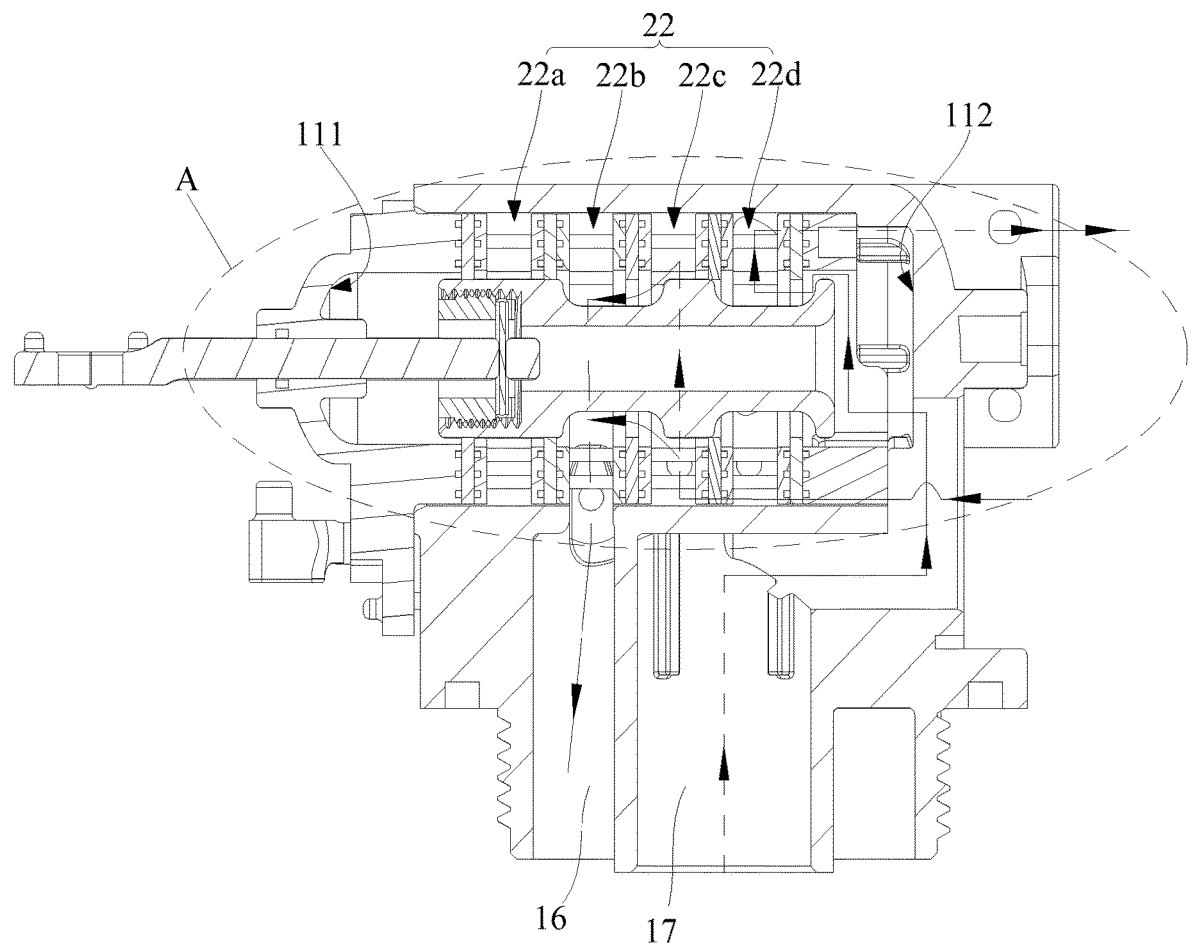
FIG. 10 is a cross-sectional view taken along line X-X of FIG. 8.
Figure 11:
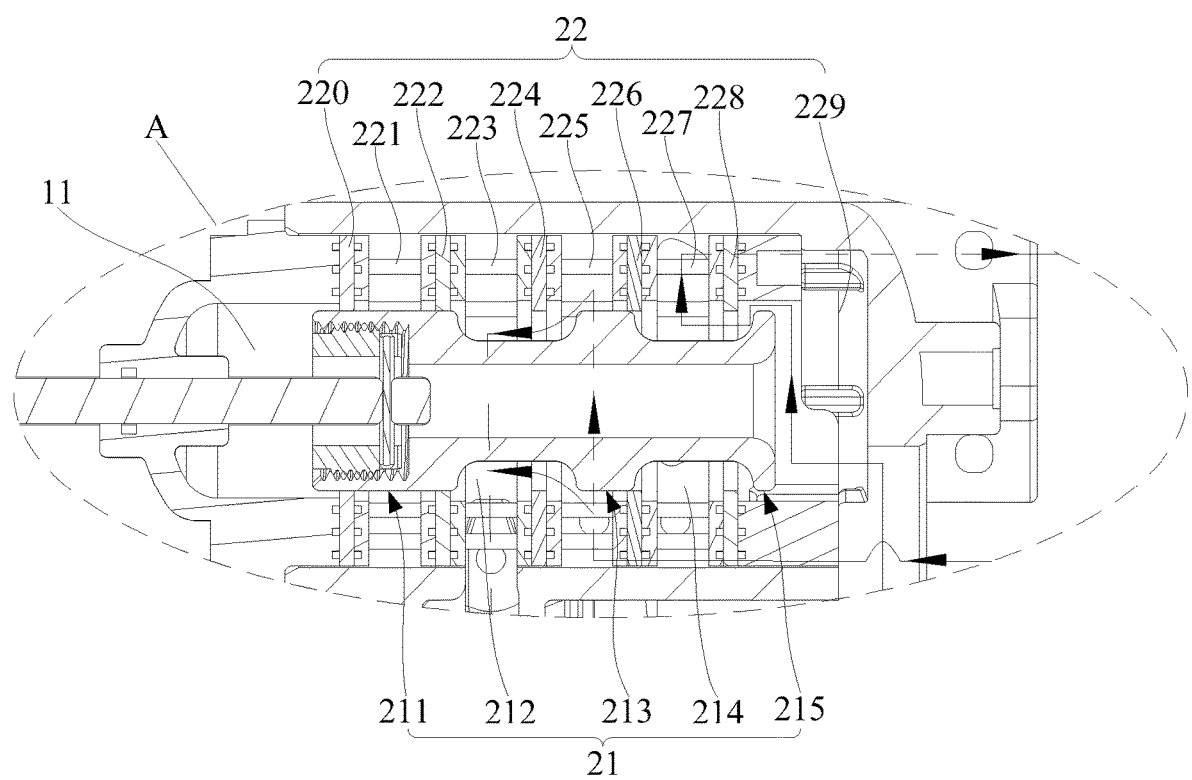
FIG. 11 is a partial enlargement view of portion A shown in FIG. 10.

Referring to FIG. 10 and FIG. 11 together, in one embodiment, the valve chamber 11 has a third end surface 111 and a fourth end surface 112 which are oppositely disposed along the first orientation. The push rod of the piston 21 passes through the third end surface 111 in the first orientation. The fourth end surface 112 is located at the end of the valve chamber 11 near the water inlet 121.

A circumferential surface of the piston 21 is sequentially provided with a first sealing surface 21, a first annular groove, a second sealing surface, a second annular groove and a third sealing surface in the direction towards the fourth end surface.

The groove defining assembly 22 includes a first water permeable grid 22a, a second water permeable grid 22b, a third water permeable grid 22c, and a fourth water permeable grid 22d that are annular in shape and that are sequentially disposed in the direction towards the fourth end surface 112. The first water permeable grid 22a, the second water permeable grid 22b, the third water permeable grid 22c, and the fourth water permeable grid 23d are sealed relative to one another at a circumferential surface of the valve chamber 11 along an axial direction of the valve core, and they are also fixedly mated with the circumferential surface of the valve chamber 11.

The water inlet passage 12 communicates with the valve chamber 11 at the third water permeable grid 22c. The softening inlet passage 16 communicates with the valve chamber 11 at the second water permeable grid 22b. The water outlet passage 13 communicates with the valve chamber 11 at the fourth water permeable grid 22d.

In the softened water producing position, the first sealing surface 211 seals the first water permeable grid 22a, and the first annular groove 212 communicates with the second water permeable grid 22b and the third water permeable grid to form the first connecting passage. The second sealing surface 213 seals and abuts against an edge of the third water permeable grid adjacent to the fourth end surface 112, and the second annular groove 214 communicates with the fourth water permeable grid 22d to form the second connecting passage.

In this embodiment, the groove defining assembly 22 is comprised of a plurality of water-permeable grids spaced apart and sealed from each other. Specifically, the groove defining assembly 22 includes a first sealing ring 220, a first grid 221, a second sealing ring 222, a second grid 223, a third sealing ring 224, a third grid 225, a fourth sealing ring 226, a fourth grid 227, and a fifth sealing ring 228, which are sequentially disposed in a direction towards the fourth end surface 112. The first sealing ring 220, the first grid 221, and the second sealing ring 222 together encloses the first water-permeable grid 22a. The second sealing ring 222, the second grid 223, and the third sealing ring 224 together encloses the second water-permeable grid 22b. The third sealing ring 224, the third grid 225, and the fourth sealing ring 226 encloses with each other to form the third water-permeable grid 22c. The fourth sealing ring 226, the fourth grid 227, and the fifth sealing ring 228 encloses the fourth water-permeable grid 22d. Because the groove defining assembly 22 is comprised of a plurality of sealing rings and grids that are alternately arranged so as to form a plurality of water-permeable grids having similar structures, this can simplify the manufacturing process and reduce the manufacturing cost in one embodiment.

The first sealing ring 220, the second sealing ring 222, the third sealing ring 224, the fourth sealing ring 226, and the fifth sealing ring 228 can adopt the same structure. Similarly, the first grid 221, the second grid 223, the third grid 225, and the fourth grid 227 can also adopt the same structure. This can reduce production costs and reduce the kinds of components of the water softener valve 100 in one embodiment.

The groove defining assembly 22 further includes an annular profiled grid 229, which is disposed between the fifth sealing ring 228 and the fourth end surface 112. The profiled grid 229 is also provided with a through-water groove outlet corresponding to the softening outlet passage 17. The profiled grid 229 can secure the position of the components of the groove defining assembly 22 that are located between the profiled grid 229 and the third end surface 111.

The present application further proposes a water softener. Referring now to FIGS. 13 to 22, hereinafter the structure of the water softener and of its water softener valve will be described in greater detail.

The present application proposes a water softener valve 100.

In various embodiments of the present application, the water softener valve 100 includes a valve body 1 and a valve core assembly 2. The valve body 1 includes a valve chamber 10 and a salt suction passage 11, as well as a water inlet passage 12, a softening inlet passage, a softening outlet passage, and a wastewater passage that communicate with the valve chamber 10. The valve chamber 10, the salt suction passage 11 and the water inlet passage 12 all extend in a first orientation, and the water inlet passage 12 and the salt suction passage 11 are both located at the periphery of the valve chamber 10 and disposed adjacent to the valve chamber 10. The water inlet passage 12 and the salt suction passage 11 define a water inlet 121 and a salt suction port 111 respectively at a same end of the valve body 1 in the first orientation. The valve body 1 further includes a jet passage communicating with the valve chamber 10. The jet passage extends in a second orientation, and the salt suction passage 11 communicates with a jet port of the jet passage. The first orientation and the second orientation are perpendicular to each other.

In this embodiment, the valve body 1 may be constituted by a plurality of components that are fastened by bolts and sealed with a sealing ring or the like on the mating surface. In order to adapt to mass production, each component can be injection molded in one piece. In addition, the valve body 1 can also be constituted by a plurality of components that are connected together by ultrasonic welding, so as to create the relatively complicated valve chamber 10 and various channel structures. Furthermore, the valve body 1 can also be produced using the emerging 3D printing technology to accommodate small batch models.

The water inlet passage 12 is configured to introduce water into the valve chamber 10. The valve core assembly 2 is configured to guide the water entering the valve chamber 10 to the corresponding passage or communication hole to realize various operating modes such as saline solution forward washing, saline solution back washing, water injection, softening treatment and so on. It will be understood that the valve core assembly 2 includes at least one movable member that can be adapted to communicate with different passages by means of rotation or translation motion, examples of which however are not to be detailed herein. The action of the movable member of the valve core assembly 2 can be achieved either manually or automatically. The water outlet passage is configured to discharge the softened water out from the valve chamber 10. The salt suction passage 11 is configured to suck in saline solution from a saline solution tank of the water softener, or to discharge the water from the valve chamber 10 and inject it into the saline solution tank of the water softener under the allocation of the valve core assembly 2. The jet port of the jet passage communicates with the salt suction passage 11 to introduce the saline solution in the salt suction passage 11 into the valve chamber 10. The softening inlet passage is configured to introduce raw water into the ion exchange tank of the water softener under the softening treatment mode. The softening outlet passage is configured to output the softened soft water.

The water inlet 121 and the salt suction port 111 may be disposed at any end of the valve body 1. In order to accommodate the installation of the water softener valve 100 to the ion exchange tank of the water softener, in this embodiment the first orientation coincides with the front-rear orientation, the second orientation coincides with the left-right orientation, and the water inlet 121 and salt suction port 111 are provided at the front end of the valve body 1.

The water softener 100 of the present application optimizes the layout of the water inlet passage 12, the salt suction passage 11, and the jet passage. The valve chamber 10, the water inlet passage 12 and the salt suction passage 11 all extend in a first orientation, and the water inlet passage 12 and salt suction passage 11 are both located at a periphery of the valve chamber 10 and are disposed adjacent to the valve chamber 10. The water inlet passage 12 and the salt suction passage 11 respectively define a water inlet 121 and a salt suction port at a same end of the valve body 1 along the first orientation. The jet passage extends in the second orientation and communicates with the salt suction passage 11. Thereby, the inlet waterway and the salt suction waterway of the water softener valve 100 are arranged in a uniform orientation, and the raw water and saline solution can be introduced from the same end of the valve body 1, enabling the internal ducts and external ports of the valve body 1 to be arranged more neatly and the structure of the entire water softener valve 100 to be more compact, which in turn makes the overall size of the water softener smaller.

In one embodiment, the water inlet passage 12 is disposed on one side of the valve chamber 10 in the second orientation. A first auxiliary hole 14 is defined on a side of the valve body 1 adjacent to the water inlet passage 12 in the second orientation, and the first auxiliary hole 14 communicates with the water inlet passage 12. The inner wall surface of the water inlet passage 12 opposite to the first auxiliary hole 14 is provided with a first communication hole 122 communicating with the valve chamber 10. In this embodiment, setting the first auxiliary hole 14 can accommodate to the drafting process in injection molding thereby enabling the molding of the first communication hole 122. Typically, the first communication hole 122 has a strip shape that extends in the circumferential direction of the inner wall surface of the valve chamber 10.

In order to control the opening and closing of the salt suction passage 11, the water softener valve 100 further includes a piston 21 arranged in the salt suction passage 11. The piston 21 extends in the first orientation and passes through the wall surface of the salt suction passage 11 away from the salt suction port 111. This can facilitate the connection to a drive assembly or make it convenient for a user to manually operate, thereby allowing the piston 21 to reciprocate in the first orientation to open or close the salt suction port 111.

The valve body 1 further includes a forward washing passage 15a communicating with the valve chamber 10. The jet passage includes a forward washing jet passage 13a connected to the forward washing passage 15a. The jet port of the forward washing jet passage 13a communicates with the salt suction passage 11. The water softener valve 100 has a saline solution forward washing state. In the saline solution forward washing state, the water inlet passage 12, the forward washing passage 15a, the forward washing jet passage 13a, and the softening inlet passage are in communication in succession. The softening outlet passage is in communication with the wastewater passage.

In this embodiment, by providing the forward washing passage 15a and the forward washing jet passage 13a, in the saline solution forward washing state, raw water sequentially passes through the water inlet passage 12 and the forward washing passage 15a to enter the forward washing jet passage 13a, while saline solution enters the forward washing jet passage 13a from the salt suction passage 11. Then the mixed water flows through the forward washing jet passage 13a to enter the softening inlet passage, and then passes through the softening inlet passage to flush the ion exchange filter material in the ion exchange tank from top to bottom to displace the calcium ions and magnesium ions in the ion exchange filter material. The wastewater containing calcium ions and magnesium ions is then sequentially discharged through the softening outlet passage and the wastewater passage to fulfill the purpose of saline solution forward washing.

The valve body 1 further includes a back washing passage 15b communicating with the valve chamber 10. The jet passage further includes a back washing jet passage 13b connected to the back washing passage 15b. The jet port of the back washing jet passage 13b communicates with the salt suction passage 11. The water softener valve 100 further has a saline solution back washing state. In the saline solution back washing state, the water inlet passage 12, the back washing passage 15b, the back washing jet passage 13b, and the softening outlet passage are communicated in succession. The softening inlet passage is in communication with the wastewater passage.

In this embodiment, by providing the back washing passage 15b and the back washing jet passage 13b, in the saline solution back washing state, raw water sequentially passes through the water inlet passage 12 and the back washing passage 15b to enter the back washing jet passage 13b, while saline solution enters the back washing jet passage 13b from the salt suction passage 11. Then the mixed water flows through the back washing jet passage 13b to enter the softening outlet passage, and then passes through the softening outlet passage to flush the ion exchange filter material in the ion exchange tank from bottom to top to displace the calcium ions and magnesium ions in the ion exchange filter material. The wastewater containing calcium ions and magnesium ions is then sequentially discharged through the softening inlet passage and the wastewater passage to fulfill the purpose of saline solution back washing.

In one embodiment, the water softener valve 100 further includes a switching unit 3, in order to facilitate the user to select the saline solution forward washing or the saline solution back washing according to the needs. The switching unit 3 is configured to communicate the forward washing passage 15a with the forward washing jet passage 13a in the saline solution forward washing state, and to communicate the back washing passage 15b with the back washing jet passage 13b in the saline solution backwashing state.

In this embodiment, through the cooperation of the switching unit 3 and the valve core assembly 2, the corresponding saline solution forward washing and saline solution back washing operating modes are achieved. The switching unit 3 and the valve core assembly 2 are in a cooperative relationship, and both of them can operate at the same time, or they can also operate one after the other. For example, the valve core assembly 2 can be adjusted before adjusting the switching unit 3, namely no requirements are placed on the times when their actions are performed. Likewise, the switching unit 3 can be implemented either manually or automatically.

Typically, the forward washing passage 15a and the forward washing jet passage 13a are connected by a first bypass channel, and the back washing passage 15b and the back washing jet passage 13b are connected by a second bypass channel. The switching unit 3 is configured to communicate the forward washing jet passage 13a with the first bypass channel when the valve core assembly 2 is in the forward washing position, and configured to communicate the back washing jet passage 13b with the second bypass channel when the valve core assembly 2 is in the back washing position.

The forward washing passage 15a, the back washing passage 15b, the forward washing jet passage 13a, and the back washing jet passage 13b all extend in the second orientation, and are all located on the same side of the valve chamber 10 and disposed adjacent to each other. In this embodiment, the forward washing passage 15a, the back washing passage 15b, the forward washing jet passage 13a, and the back washing jet passage 13b all extend in the same orientation, so that the internal ducts of the valve body 1 are more neatly arranged and the structure is more compact.

In the first orientation, the axis of the forward washing passage 15a and the axis of the back washing passage 15b are both located between the axis of the forward washing jet passage 13a and the axis of the back washing jet passage 13b, and the axis of the forward washing passage 15a is located between the axes of the forward washing jet passage 13a and the back washing passage 15b. In this embodiment, by appropriately setting the positions of the forward washing passage 15a, the back washing passage 15b, the forward washing jet passage 13a, and the back washing jet passage 13b, the following benefits are provided: 1. The forward washing jet passage 13a and the back washing jet passage 13b can be appropriately spaced in distance to accommodate to the large flux structure of the softening inlet passage and the softening outlet passage; 2. The forward washing passage 15a and the back washing passage 15b can be conveniently connected to the water inlet passage 12 at adjacent positions; 3. The forward washing passage 15a can be conveniently connected to the forward washing jet passage 13a, and the back washing passage 15b can be conveniently connected to the back washing jet passage 13b.

In the third orientation, the axis of the forward washing passage 15a is staggered from that of the forward washing jet passage 13a, and the axis of the back washing passage 15b is staggered from that of the back washing jet passage 13b. The first orientation, the second orientation, and the third orientation are perpendicular to one another. In this embodiment, by offsetting the forward washing passage 15a from the forward washing jet passage 13a, and the back washing passage 15b from the back washing jet passage 13b in the third orientation, the space of the valve body 1 in the third orientation can be effectively utilized, so that the pipelines can be arranged in a more reasonable manner, so as to prevent the pipelines from being arranged side by side leading to a relatively wide overall width of the valve body 1, where the third orientation coincides with the up-down orientation. Typically, in the first orientation, the forward washing passage 15*a* and the back washing passage 15*b* are arranged side by side, while the forward washing jet passage 13*a* and the back washing jet passage 13*b* are also arranged side by side, so as to make the pipeline arrangement tidier.

The present application further proposes a water softener comprising an ion exchange tank, a salt tank, and a water softener valve 100. For the specific structure of the water softener valve 100, referring to the foregoing embodiments. Since the water softener adopts all the technical solutions of all the foregoing embodiments, it has at least all the beneficial effects brought by the technical solutions of the foregoing embodiments; however, these beneficial effects will not be detailed one by one herein. The ion exchange tank comprises a tank body and a center tube disposed in the tank body, and an ion exchange chamber is formed between the center tube and the inner wall of the tank body. The softening inlet passage communicates with the ion exchange chamber, the softening outlet passage communicates with the center tube, and the salt suction passage 11 communicates with a salt box.

In this embodiment, in order to increase the integrity and make the corresponding structure more compact, the tank body is placed inside salt box. An ion exchange filter material is arranged in the ion exchange tank, the ion exchange filter material being a water softening resin. A salt valve assembly and salt particles are placed in the salt box. In the water injection operating mode, the raw water enters the valve chamber 10 from the water inlet passage 12 and is then drained into the salt suction passage 11, and then enters the salt box via the salt suction passage 11, thereby achieving the purpose of injecting water into the salt box.

The present application further proposes a water softener. Referring now to FIGS. 23 to 34, hereinafter the structure of the water softener and of its water softener valve will be described in greater detail.

The present application proposes a water softener valve 100.

In various embodiments of the present application, the water softener valve 100 includes a valve body 1 and a valve core assembly 2. The valve body 1 includes a valve chamber 10, as well as a water inlet passage 11, a water outlet passage 12, a softening inlet passage 13, a softening outlet passage 14, a salt suction passage 15, a jet passage, and a wastewater passage 17 that are in communication with the valve chamber 10. The valve chamber 10, the water inlet passage 11, the water outlet passage 12, and the wastewater passage 17 all extend in a first orientation, and the water inlet passage 11, the water outlet passage 12, and the wastewater passage 17 are all located in a periphery of the valve core assembly 10 and disposed adjacent to the valve chamber 10. The water inlet passage 11, the water outlet passage 12, and the wastewater passage 17 respectively define a water inlet 111, a water outlet 121, and a wastewater port 171 at a same end of the valve body 1 in the first orientation. The water inlet 111 and the water outlet 121 are respectively located on opposite sides of the valve chamber 10 in a second orientation. The wastewater port 171 is located at one side of the water inlet 111 or the water outlet 121 in a third orientation. The first orientation, the second orientation, and the third orientation are perpendicular to one another.

In this embodiment, the valve body 1 may be constituted by a plurality of components that are fastened by bolts and sealed with a sealing ring or the like on the mating surface. In order to adapt to mass production, each component can be injection molded in one piece. In addition, the valve body 1 can also be constituted by a plurality of components that are connected together by ultrasonic welding, so as to create the relatively complicated valve chamber 10 and various channel structures. Furthermore, the valve body 1 can also be produced using the emerging 3D printing technology to accommodate small batch models.

The water inlet passage 11 is configured to introduce water into the valve chamber 10. The valve core assembly 2 is configured to guide the water entering the valve chamber 10 to the corresponding passage or communication hole to realize various operating modes such as saline solution forward washing, saline solution back washing, water injection, softening treatment and so on. It will be understood that the valve core assembly 2 includes at least one movable member that can be adapted to communicate with different passages by means of rotation or translation motion, examples of which however are not to be detailed herein. The action of the movable member of the valve core assembly 2 can be achieved either manually or automatically. The water outlet passage 12 is configured to discharge the softened water out from the valve chamber 10. The salt suction passage 15 is configured to suck in saline solution from a saline solution box 300 of the water softener, or to discharge the water from the valve chamber 10 and inject it into the saline solution box 300 of the water softener under the allocation of the valve core assembly 2. The jet port of the jet passage communicates with the salt suction passage 15 to introduce the saline solution in the salt suction passage 15 into the valve chamber 10. The softening inlet passage 13 is configured to introduce raw water into the ion exchange tank 200 of the water softener under the softening treatment mode. The softening outlet passage 14 is configured to output the softened soft water. The wastewater passage 17 is configured to drain wastewater generated by saline solution forward washing and saline solution backwashing from the valve chamber 10.

The water inlet 111, the water outlet 121, and the wastewater port 171 may be provided at any end of the valve body 1. In order to accommodate the installation of the water softener valve 100 to the ion exchange tank 200 of the water softener, in this embodiment the first orientation coincides with the front-rear orientation, the second orientation coincides with the left-right orientation, and the third orientation coincides with the up-down orientation. The water inlet 111, the water outlet 121, and the wastewater port 171 are provided at the front end of the valve body 1. The wastewater port 171 may be provided on the upper side or the lower side of the water inlet 111 or the water outlet 121.

By optimizing the pipeline structure, the water softener valve 100 of the present application sets the water inlet passage 11, the water outlet passage 12, and the wastewater passage 17 to extend in parallel in the same orientation, and further arrange the water inlet 111, the water outlet 121, and the wastewater port 171 on the same end surface of the valve body 1. Thus, the arrangement of the inner pipelines and the external ports of the valve body 1 is made more neat and regular to facilitate the connection of the water softener valve 100 to external pipes. In addition, the water inlet passage 11, the water outlet passage 12, and the wastewater passage 17 are all located at the periphery of the valve chamber 10 and are disposed adjacent to the valve chamber 10. The water inlet 111 and the water outlet 121 are respectively located on opposite sides of the valve chamber 10. The wastewater port 171 is located at one side of the water inlet 111 or the water outlet 121 in the third orientation. In this way, the arrangement of various passages and ports along the width and the height orientations of the valve body 1 is made more reasonable and the structure is made more compact, so that the overall size of the water softener valve 100 can be made smaller, reducing the overall size of the water softener.

In one embodiment, the valve body 1 has a first end surface 18 in the second orientation, and the water inlet passage 11 and the wastewater passage 17 are both disposed adjacent to the first end surface 18. The first end surface 18 is provided with a first auxiliary hole 181 and a second auxiliary hole 182. The first auxiliary hole 181 communicates with the water inlet passage 11, and the inner wall surface of the water inlet passage 11 opposite to the first auxiliary hole 181 is provided with a first communication hole 112 communicating with the valve chamber 10. The second auxiliary hole 182 communicates the wastewater passage 17, and the inner wall surface of the wastewater passage 17 opposite to the second auxiliary hole 182 is provided with a second communication hole 172 that communicates with the valve chamber 10.

In this embodiment, the water inlet passage 11 and the wastewater passage 17 are disposed adjacent both to the first end surface 18 and to the valve chamber 10, so that the internal structure of the valve body 1 is more compact. Typically, when the valve chamber 10 is cylindrical in shape, the cross section of the water inlet passage 11 and the wastewater passage 17 is irregular in shape. Setting the first auxiliary hole 181 can accommodate to the drafting process in injection molding thereby enabling the molding of the first communication hole 112. Likewise, setting the second auxiliary hole 182 can accommodate to the drafting process in injection molding thereby enabling the molding of the second communication hole 172.

In order to more effectively utilize the internal space of the valve body 1 to make the internal passage arrangement of the valve body 1 more compact, the axis of the water inlet passage 11 and the axis of the wastewater passage 17 are typically staggered in the second orientation.

In order to make better use of the space at the first end surface 18 of the valve body 1, the axis of the first auxiliary hole 181 and the axis of the second auxiliary hole 182 are staggered both in the first orientation and in the third orientation. Furthermore, in the first orientation, the second auxiliary hole 182 is located on a side of the first auxiliary hole 181 away from the water inlet 111.

In one embodiment, the salt suction passage 15 is in communication with the jet port of the jet passage, and the water softener valve 100 has a saline solution forward washing state and a saline solution back washing state. In the saline solution forward washing state, the water inlet passage 11, the jet passage, and the softening inlet passage 13 are sequentially communicated, while the softening outlet passage 14 is in communication with the wastewater passage 17. In the saline solution backing washing state, the water inlet passage 11, the jet passage, and the softening outlet passage 14 are sequentially communicated, while the softening inlet passage 13 communicates with the wastewater passage 17.

In this embodiment, the water softener valve 100 has a saline solution forward washing state and a saline solution back washing state to meet different usage needs. More particularly, in the saline solution forward washing state, raw water passes through the water inlet passage 11 to enter the jet passage, while saline solution enters the jet passage from the salt suction passage 15. Then the mixed water flows through the jet passage to enter the softening inlet passage 13, and then passes through the softening inlet passage 13 to flush the ion exchange filter material in the ion exchange tank 200 from top to bottom to displace the calcium ions and magnesium ions in the ion exchange filter material. The wastewater containing calcium ions and magnesium ions is then sequentially discharged through the softening outlet passage 14 and the wastewater passage 17 to fulfill the purpose of saline solution forward washing. In the saline solution back washing state, raw water passes through the water inlet passage 11 to enter the jet passage, while saline solution enters the jet passage from the salt suction passage 15. Then the mixed water flows through the jet passage to enter the softening outlet passage 14, and then passes through the softening outlet passage 14 to flush the ion exchange filter material in the ion exchange tank 200 from bottom to top to displace the calcium ions and magnesium ions in the ion exchange filter material. The wastewater containing calcium ions and magnesium ions is then sequentially discharged through the softening inlet passage 13 and the wastewater passage 17 to fulfill the purpose of saline solution back washing.

In one embodiment, the jet passage includes a forward washing jet passage 16a and a back washing jet passage 16b. The valve body 1 includes a forward washing passage 19a and a back washing passage 19b. The forward washing jet passage 16a, the back washing jet passage 16b, the forward washing passage 19a, and the back washing passage 19b all extend in the second orientation. The salt suction passage 15 extends in the first orientation and communicates with the jet ports of the forward washing jet passage 16a and the back washing jet passage 16b. In saline solution forward washing state, the water inlet passage 11, the forward washing passage 19a, the forward washing jet passage 16a, and the softening inlet passage 13 are sequentially communicated, while the softening outlet passage 14 is in communication with the wastewater passage 17. In the saline solution back washing state, the water inlet passage 11, the back washing passage 19b, the back washing jet passage 16b, and the softening outlet passage 14 are sequentially communicated, while the softening inlet passage 13 communicates with the wastewater passage 17.

In this embodiment, by dividing the jet passage into the forward washing jet passage 16a and the back washing jet passage 16b and simultaneously providing the forward washing passage 19a and the back washing passage 19b, the saline solution forward washing and the saline solution back washing operating modes of the water softener can be achieved through the switching of the communication states between the various passages. At the same time, the forward washing passage 19a, the back washing passage 19b, the forward washing jet passage 16a, and the back washing jet passage 16b all extend in parallel in the second orientation, so as to be able to simultaneously connect with the salt suction passage 15 which extends in the first orientation. Thus, the arrangement of the passages is more reasonable and the structure is more regular and neat.

In order to facilitate the user to select the saline solution forward washing or the saline solution back washing according to the needs, the water softener valve 100 further includes a switching unit. The switching unit is configured to communicate the forward washing passage 19a with the forward washing jet passage 16a in the saline solution forward washing state, and configured to communicate the back washing passage 19b with the back washing jet passage 16b in the saline solution backwashing state.

The softening outlet passage 14 extends in the third orientation. The valve body 1 is provided with a third auxiliary hole 20 in an end surface where the water inlet 111 and the water outlet 121 are located. The third auxiliary hole 20 extends in the first orientation to communicate with the softening outlet passage 14. An inner wall surface of the third auxiliary hole 20 is provided with a third communication hole 21 communicating with the valve chamber 10.

In this embodiment, setting the third auxiliary hole 20 can accommodate to the drafting process in injection molding thereby enabling the molding of the third communication hole 21. Typically, the third auxiliary hole 20 is disposed on the front end surface of the valve body 1 and is located on one side of the water inlet 111 and the water outlet 121 in the third orientation, so that the ports at the front end surface of the valve body 1 is arranged more compact.

The softening inlet passage 13 extends in the third orientation and defines a fourth communication hole 131 communicating with the valve chamber 10. The fourth communication hole 131 is located at a side of the third communication hole 21 away from the third auxiliary hole 20 in the first orientation. In this embodiment, the softening inlet passage 13 extends through the valve chamber 10 in the third orientation defining the fourth communication hole 131, which is advantageous for the drafting process in injection molding.

In one embodiment, the valve core assembly 2 includes a piston 201 and a groove defining assembly 202 sleeved around the periphery of the piston 201. The piston 201 has a cylindrical shape and extends in the first orientation, and is reciprocally movable in the first direction to be slidably engaged with the groove defining assembly 202.

In the saline solution forward washing state, the piston 201 and the groove defining assembly 202 define a first connecting passage and a second connecting passage. The softening outlet passage 14 and the wastewater passage 17 are communicated in series via the first connecting channel, the inner cavity 211 of the piston 201, and the second connecting passage in succession.

In the saline solution back washing state, the piston 201 and the groove defining assembly 202 define a third connecting passage, and the softening inlet passage 13 is in communication with the wastewater channel 17 via the third connecting passage.

In this embodiment, the piston 201 and the groove defining assembly 202 cooperates with each other to communicate or block the various passages to achieve various operating modes of the water softener. Furthermore, the groove defining assembly 202 and the valve body 1 can be separately arranged and separately manufactured, so that the internal structure of the valve chamber 10 can be more compact, and the manufacturing difficulty can be effectively reduced. There are a plurality of kinds of cooperation between the piston 201 and the groove defining assembly 202. For example, by means of rotational fit or reciprocal motion, the communication or disconnection of the various connecting passages can be achieved. In this embodiment, the piston 201 typically extends in the first orientation and is reciprocally movable in the first orientation to be slidably engaged with the groove defining assembly 202. Thus, the structure is simple hence convenient for manufacturing. When the water softener is in the saline solution forward washing state, the produced wastewater is discharged to the wastewater passage 17 via the softening outlet passage 14, the first connecting passage, the inner cavity 211 of the piston 201, and the second connecting passage in succession. When the water softener is in the saline solution back washing state, the produced wastewater is discharged to the wastewater passage 17 via the softening inlet passage 13 and the third connecting passage in succession.

The present application further proposes a water softener comprising an ion exchange tank 200, a salt tank 300, and a water softener valve 100. For the specific structure of the water softener valve 100, referring to the foregoing embodiments. Since the water softener adopts all the technical solutions of all the foregoing embodiments, it has at least all the beneficial effects brought by the technical solutions of the foregoing embodiments; however, these beneficial effects will not be detailed one by one herein.

The present application further proposes a water softener. Referring now to FIGS. 35 to 38, hereinafter the structure of the water softener and of its water softener valve will be described in greater detail.

The present application proposes a grid.

The grid of the present application can be used for water softener valves, or other multi-waterway control valves.

In one embodiment of the present application, the grid 100 includes two annular bodies 10 that are oppositely disposed and spaced apart from each other, and a plurality of support ribs disposed between the two annular bodies 10. The plurality of the support ribs are arranged along the circumferential direction of the annular bodies 10, and are integrally injection molded with the two annular bodies 10. A fluid passage 30 is defined between two adjacent support ribs.

The support ribs include a plurality of first support ribs 21 and second support rib 22, where a plurality of second support ribs 22 are disposed between at least one group of adjacent two of the first support ribs 21. The plurality of second support ribs 22 are spaced apart from each other and arranged in parallel, and any one of the first support ribs 21 extends obliquely from the inner side to the outside toward the side away from the adjacent second support rib 22.

It can be understood that by providing a plurality of second connecting ribs parallel to each other between the adjacent two first support ribs 21, the releasing direction of the mold 200 disposed between the two first support ribs 21 and the extending direction of the second connecting ribs provided between the two first support ribs 21 can be set to be identical. Therefore, the problem that the existing grid 100 is inconvenient to be demolded during injection molding can be solved, so that one-mode-multi-cavity can be realized, thereby not only improving the production efficiency of the grid 100, but also reducing the production cost and simplifying the structure of the mold 200 thus making the mold 200 simple in structure. For these two first support ribs 21, any one of the first support ribs 21 extends obliquely from the inner side to the outer side towards the side away from the adjacent second support rib 22; that is, any of the first support ribs 21 and the second support rib 22 adjacent thereto are flared from the inside to the outside, so that the mold 200 can be separated from the adjacent two first support ribs 21 during demolding, which means the demolding will not be affected.

Therefore, the grid 100 of the present application can solve the problem that the existing grid 100 is inconvenient to be demolded during injection molding. Furthermore, one-mold-multi-cavity can also be realized. Thus, not only the production efficiency of the grid 100 can be improved, but the production cost can be reduced; and at the same time, the structure of the mold 200 can be simplified, so that the mold 200 has a simple structure.

In this embodiment, an exemplary solution is as follows: a plurality of second support ribs 22 are disposed between any two adjacent first support ribs 21, where the plurality of second support ribs 22 are spaced apart from each other and arranged parallel, and any of the first support ribs 21 extends obliquely outward from the inner side towards the side away from the adjacent second support rib 22. In this way, the production efficiency of the grid 100 can be greatly improved.

Any of the first support ribs 21 extends in the radial direction of the annular bodies 10. It can be understood that by extending the first support ribs 21 in the radial direction of the annular bodies 10, not only the arrangement of the first support ribs 21 is made more reasonable, but also the shape of the mold 200 can be standardized, thereby facilitating the processing of the mold 200.

The extending direction of the second support ribs 22 is parallel to the extending direction of the center line of the angle between the adjacent two first support ribs 21. It can be understood that, through the above-mentioned structural arrangement, not only the arrangement of the fluid passages 30 can be made more reasonable, but also the creation of the inner mold cavity in the mold 200 can be facilitated, thereby facilitating the processing of the mold 200.

The plurality of first support ribs 21 are spaced apart from each other and uniformly distributed along the circumferential direction of the annular bodies 10. In this way, the symmetry of the grid 100 can be improved, thereby improving the versatility of the mold 200 so that the molds 200 having the same specification can be used to manufacture the grid 100, further reducing the production costs.

Specifically, the number of the second support ribs between different adjacent first support ribs 21 is the same.

The plurality of second support ribs 22 located between any two adjacent first support ribs 21 are spaced apart and evenly arranged. That is to say, for the plurality of second support ribs 22 located between any two adjacent first support ribs 21, the spacing between adjacent two second support ribs 22 is equal. As such, the arrangement of the fluid passages 30 can be made more reasonable.

In specific embodiments, the number of the first support ribs 21 is typically 3-5. It can be understood that if the number of the first support ribs 21 is too small, it is not only disadvantageous to the arrangement of the fluid passages 30, but also is not suitable for demolding during the production of the grid 100. Otherwise if the first support ribs 21 are excessive in number, then the number of the molds 200 would be too large during the production of the grid 100, which may complicate the demolding. Therefore, in this embodiment as illustrated in FIGS. 1 to 4, the number of the first support ribs 21 is more exemplarily four.

In specific embodiments, the number of the second support ribs 22 between any two adjacent first support ribs 21 is typically 2 to 4. It can be understood that if the number of the second support ribs 22 is too small, the fluid passages 30 would be too narrow, which is disadvantageous to the passage of the liquid flow. Otherwise if the number of the second support ribs 22 is excessive, the fluid passages 30 would be made too wide, so that the effect of the grid 100 would be unsatisfactory.

In particular, it should be noted that the numbers of the first support ribs 21 and the second support ribs 22 are also limited by the size of the grid 100, and those skilled in the art can select different combinations according to actual needs.

An outer surface of one end of the support rib away from a central axis of the annular bodies 10 is configured as a concave curved surface 23. Specifically, the outer surfaces of the ends of the first support rib 21 and the second support rib 22 away from the central axis of the annular bodies 10 are each configured as a concave curved surface 23.

It can be understood that the working process of the grid 100 is roughly as follows. The fluid flows into the inside of the annular bodies 10 through the fluid passages 30 on the side of the grid 100, and then flows out through the fluid passages 30 on the other side of the grid 100. By configuring the outer surface of the end of each of the support ribs away from the one end of the central axis of the annular bodies 10 as a concave curved surface 23, the grid 100 of the present application can not only increase the contact area of the fluid with the grid 100 during contact thus attenuating the impact of the fluid on the grid 100, but can enhance the guiding and directing effect on the fluid. Furthermore, the above arrangement is also advantageous for demolding when performing injection molding.

Reinforcing ribs 40 are arranged at positions where the support ribs are in contact with either of the annular bodies 10. Thus, the connection strength between the support ribs and the annular bodies 10 can be enhanced, thereby improving the structural strength of the grid 100 and increasing the service life of the grid 100.

One side of each of the annular body 10 opposite to the other annular body 10 is provided with an annular sealing ring groove 11.

It will be appreciated that for water softener valves or other multi-waterway control valves, a plurality of grids 100 are typically required for use in combination, where adjacent two grids 100 are typically connected by a seal member, which may be implemented as a sealing gasket. By providing the sealing ring grooves 11 on the end surfaces of the annular bodies 10, the grid 100 of the present application can be adapted and fitted to the sealing annular protrusion on the surface of the sealing gasket, thereby enhancing the connection sealing effect between the grid 100 and the sealing gasket, which improves the use effect of the water softener valve and the water softener.

There may be a plurality of the sealing ring grooves 11, which are arranged at radial intervals of the annular bodies 10.

In this way, a plurality of sealing ring protrusions may be correspondingly arranged on the surface of the sealing gasket to be connected to the plurality of sealing ring grooves 11. Thereby, the connection tightness between the grid 100 and the sealing gasket can be enhanced in one embodiment.

In this embodiment, the number of the sealing ring grooves 11 is typically 2 to 4. It can be understood that if the number of the sealing ring grooves 11 is too large, the structural strength of the annular bodies 10 would be greatly reduced, thereby increasing the risk of damage of the grid 100. Furthermore, the yield of the grid 100 would also be affected during injection molding.

The present application further proposes a water softener valve that includes:

a valve body, having a valve chamber; and a valve core assembly, disposed within the valve chamber, the valve core assembly including a valve core, a seal member, and a grid as described above. For the specific structure of the rid, referring to the foregoing embodiments. Since the water softener valve of the present application adopts all the technical solutions of all the foregoing embodiments, it has at least all the beneficial effects brought by the technical solutions of the foregoing embodiments; however, these beneficial effects will not be detailed one by one herein.

Specifically, the seal member is disposed between two adjacent grids, and different waterways are formed between the grid and the seal member with respect to the valve body.

The valve core is placed and passes through the center of the grid, and the switching of the waterways of the water softener valve is realized by the movement of the valve core.

The present application further proposes a water softener that includes the water softener valve as described above. For the specific structure of the water softener valve, referring to the foregoing embodiments. Since the water softener of the present application adopts all the technical solutions of all the foregoing embodiments, it has at least all the beneficial effects brought by the technical solutions of the foregoing embodiments; however, these beneficial effects will not be detailed one by one herein.

The present application further proposes a water softener. Referring now to FIGS. 39 to 45, hereinafter the structure of the water softener and of its water softener valve will be described in greater detail.

The present application further proposes an end cap used for a water softener valve.

In various embodiments of the present application, the water softener valve 100 includes a valve body 10, an end cap 20, and a valve core assembly (not shown). The valve body 10 includes a valve chamber, and a water inlet passage 15, a water outlet passage 16, a softening inlet passage, a softening outlet passage, a wastewater passage 17, and a salt suction passage 18 that communicate with the valve chamber. The valve body 10 further includes a forward washing water passage 11, a forward wash jet passage 12, a back washing inlet passage 13, and a back washing jet passage 14. The valve core assembly is movably arranged in the valve chamber to switch between various water passages in the valve body 10, thereby realizing various operating odes such as softening treatment, saline solution washing, water injection and so on. The end cap 20 includes a cap body 21. At least one bypass passage is defined in the cap body 21, and is configured to communicate the forward washing water inlet passage 11 with the forward washing jet passage 12 of the valve body 10, or configured to communicate the back washing water inlet passage 13 and the back washing jet passage 14 of the valve body 10.

The water inlet passage 15 is configured to introduce water into the valve chamber. The water outlet passage 16 is configured for discharging the softened water from the valve chamber. The salt suction passage 18 is configured for sucking in saline solution from the saline solution box of the water softener or injecting water into the saline solution box of the water softener. The softening inlet passage is configured to introduce raw water into the ion exchange tank of the water softener during the softening process. The softening outlet passage is configured to output the softened soft water.

It can be understood that the water passages inside the valve body 10 are usually complicated, so that in order to facilitate the demolding process during injection molding, the surface of the valve body 10 is usually provided with an auxiliary hole. The end cap 20 is capped to the surface of the valve body 10 to seal the auxiliary hole. In this embodiment, the end cap 20 can be used for sealing the auxiliary hole on the one hand. On the other hand, at least one bypass passage is defined inside the end cap 20, and the bypass passage can be used to communicate the forward washing water inlet passage 11 with the forward washing jet passage 12 or to communicate the back washing water inlet passage 13 with the back washing jet passage 14. In this way, by providing a part of the water passage structure in the end cap 20, the water passage structure inside the valve body 10 can be effectively simplified, and the manufacturing difficulty of the mold of the valve body 10 can be reduced to a certain extent, thereby reducing the production cost.

It should be noted that the bypass passage can be integrally formed in the end cap 20 by, for example, a core forming or a drilling process. Alternatively, the end cap 20 can be divided into two parts, and the bypass passage can be formed by assembling the two parts. In practical applications, in order to simplify the manufacturing process, it is exemplary to integrally form the bypass passage in the end cap 20.

In order to further simplify the structure of the valve body 10, it is exemplary to integrate as many water passage structures as possible in the end cap 20 to reduce the difficulty in mold manufacturing of the valve body 10. Specifically, referring to FIG. 7, in one embodiment, two bypass passage are provided, including a first bypass passage 21a and a second bypass passage 21b. The first bypass passage 21a is configured to communicate the forward washing water inlet passage 11 with the forward washing jet passage 12 of the valve body 10. The second bypass passage 21b is configured for communicating the back washing water inlet passage 13 with the back washing jet passage 14 of the valve body 10.

The cap body 21 is provided with a first connecting pipe 22 and a second connecting pipe 23 respectively communicating with the first bypass passage 21a. The first connecting pipe 22 is configured to communicate with the forward washing water inlet passage 11 of the valve body 10. The second connecting pipe 23 is configured to communicate with the forward washing jet passage 12 of the valve body 10. The cap body 21 is further provided with a third connecting pipe 24 and a fourth connecting pipe 25 respectively communicating with the second bypass passage 21b. The third connecting pipe 24 is configured to communicate with the back washing water inlet passage 13 of the valve body 10. The fourth connecting pipe 25 is configured for communicating with the back washing jet passage 14 of the valve body 10.

Specifically, the forward washing water inlet passage 11, the forward washing jet passage 12, the back washing water inlet passage 13, and the back washing jet passage 14 respectively define a first port, a second port, a third port, and a fourth port on the same end surface of the valve body 10. The first connecting pipe 22 on the cap 21 is inserted into the first port to communicate with the water inlet passage 1511. The second connecting pipe 23 is inserted into the second port to communicate with the forward washing jet passage 12. The third connecting pipe 24 is inserted into the third port to communicate with the back washing water inlet passage 13. The fourth connecting pipe 25 is inserted into the fourth port to communicate with the back washing jet passage 14. In this way, by the mating engagement of the various connecting pipes with the corresponding ports, the cooperation of the cap body 21 and the valve body 10 is tighter, which is more advantageous for the communications of the water passages.

The circumferential surface of the first connecting pipe 22 is provided with a first flange, the circumferential surface of the second connecting pipe 23 is provided with a second flange, the circumferential surface of the third connecting pipe 24 is provided with a third flange, and the circumferential surface of the fourth connecting pipe 25 is provided with a fourth flange. The first flange abuts on the end surface of the first port, the second flange abuts on the end surface of the second port, the third flange abuts on the end surface of the third port, and the fourth flange abuts on the end surface of the fourth port. In this way, the sealing performance between the various connecting pipes and the corresponding ports is further improved to avoid water leakage.

The end cap 20 further includes a switching unit. The switching unit is configured to open the first bypass passage 21a while blocking the second bypass passage 21b when the water softener valve 100 is in the saline solution forward washing state. The switching unit is further configured to block the first bypass passage 21a while opening the second bypass passage 21b when the water softener valve 100 is in the saline solution back washing state.

By providing the switching unit in the end cap 20, free switching between the saline solution forward washing and the saline solution back washing can be achieved. The switching unit can be implemented in multiple ways; it can be automatically switched, or can be manually switched. Through the cooperation of the switching unit and the valve core assembly, the corresponding saline solution forward washing water path and the back washing water path are realized.

More particularly, in the saline solution forward washing state, the first bypass passage 21a is opened while the second bypass passage 21b is blocked off. The raw water sequentially passes through the water inlet passage 15 and the forward washing water inlet passage 11 to enter the forward washing jet passage 12, while saline solution enters the forward washing jet passage 12 from the salt suction passage 18. Then the mixed water flows through the forward washing jet passage 12 to enter the softening inlet passage, and then passes through the softening inlet passage to flush the ion exchange filter material in the ion exchange tank from top to bottom to displace the calcium ions and magnesium ions in the ion exchange filter material. The wastewater containing calcium ions and magnesium ions is then sequentially discharged through the softening outlet passage and the wastewater passage 17 to fulfill the purpose of saline solution forward washing.

In the saline solution back washing state, raw water sequentially passes through the water inlet passage 15 and the back washing water inlet passage 13 to enter the back washing jet passage 14, while saline solution enters the back washing jet passage 14 from the salt suction passage 18. Then the mixed water flows through the back washing jet passage 14 to enter the softening outlet passage, and then passes through the softening outlet passage to flush the ion exchange filter material in the ion exchange tank from bottom to top to displace the calcium ions and magnesium ions in the ion exchange filter material. The wastewater containing calcium ions and magnesium ions is then sequentially discharged through the softening inlet passage and the wastewater passage 17 to fulfill the purpose of saline solution back washing.

The inner wall surface of the first bypass passage 21a is provided with a first connecting hole 211 communicating with the first connecting pipe 22, and a second connecting hole 212 communicating with the second connecting pipe 23. The first bypass passage 21a defines a first plug hole 213 on the outer side of the cap 21. The inner wall surface of the second bypass passage 21b is provided with a third connecting hole 214 communicating with the third connecting pipe 24, and a fourth connecting hole 215 communicating with the fourth connecting pipe 25. The second bypass passage 21b defines a second plug hole 216 on the outer side of the cap 21.

The switching unit includes a long plug head and a short plug head.

When the water softener valve 100 is in the saline solution forward washing state, the long plug head is used to seal the second plug hole 216 and block the third connecting hole 214 and/or the fourth connecting hole 215, while the short plug head is used to seal the first plug hole 213.

Otherwise when the water softener valve 100 is in the saline solution back washing state, the long plug head is used to seal the first plug hole 213 and block the first connecting hole 211 and/or the second connecting hole 212, while the short plug head is used to seal the second plug hole 216.

In this embodiment, the switching unit implements the switching between the forward and back washing by manual means. Specifically, in the saline solution forward washing state, the long plug head is typically used to seal the second plug hole 216 and block the third connecting hole 214 and the fourth connecting hole 215, so as to prevent the water inlet passage 15 from being dampened by water through the back washing passage. The short plug head only seals the first plug hole 213. In the saline solution back washing state, the long plug head typically seals the first plug hole 213 and blocks the first connecting hole 211 and the second connecting hole 212, while the short plug head only seals the second plug hole 216. By setting two kinds of plug heads with different lengths, the corresponding plug heads can be inserted into the corresponding plug holes according to different requirements, thus realizing the switching between the forward washing and the back washing, which is simple in structure and convenient in operation.

The long plug head and/or the short plug head are threaded connection with the cap 21. Specifically, in this embodiment, the long plug head and the cap body 21 are threaded-connected together, so that the assembly between the long plug head and the cap body 21 is more firm and reliable. Thus, the long plug head can be prevented from detaching from the cap body 21 under the pressure of the water flow which would otherwise affect the normal use of the water softener valve 100. Similarly, the short plug head and the cap body 21 are also connected by a threaded connection, which can also effectively improve the assembly stability between the short plug head and the cap body 21.

In the related art, a flow meter is generally disposed in the valve body 10 to detect the flow of water in the valve body 10. Typically, the flow meter includes an impeller, a signal generating component and a sensor disposed on the impeller. More particularly, the impeller rotates under the action of the water flow, and the signal generating component generates a signal as the impeller rotates. Thus, the sensor can detect the rotational speed of the impeller according to the received signal, and then the corresponding water flow can be obtained. The signal generating component can generate a magnetic field change signal, and accordingly the sensor can be a magnetic sensor (such as a Hall sensor). Alternatively, the signal generating component can generate a water pressure change signal, and accordingly the sensor can be a pressure sensor. The sensor of an existing flow meter is typically connected to the impeller, thereby limiting the structure of the impeller.

In order to solve the above problem, in one embodiment, the cap body 21 is further provided with a mounting seat 26. The mounting seat 26 is configured to mount a sensor that detects the flow of water in the valve body 10. It can be understood that, in order to achieve a better detection effect, a detection hole 101 can be defined in the valve body 10 adjacent to the impeller, and so the sensor can detect the signal generated by the rotation of the impeller from the detection hole 101. In this embodiment, the sensor is separately mounted on the cap 21 to separate the sensor from the impeller so that the structure of the impeller is not limited.

The mounting seat 26 has a columnar shape, and a cavity 261 is formed therein for receiving the sensor. The side of the mounting seat 26 facing away from the cap body 21 is opened. The mounting seat 26 is configured to extend into the water outlet passage 16 of the valve body 10 to detect the flow rate of the water discharged from the valve body 10.

In this embodiment, the flow meter is mainly used to detect the flow rate of the water discharged from the water outlet passage 16. The valve body 10 is provided with a detection hole 101 communicating with the water outlet passage 16. The mounting seat 26 is arranged in a columnar shape and can extend from the detection hole 101 into the water outlet passage 16. The impeller is disposed in the water outlet passage 16 at a position adjacent to the detection hole 101. A magnetic member is disposed on the impeller, and a sensor (such as a Hall sensor) is disposed in the inner cavity of the mounting seat 26. As such, the water flow can be detected by the cooperation of the impeller, the magnetic member, and the sensor. By providing the mounting seat 26 on the cap body 21, it is possible to mount a small and compact flow sensor and the mounting seat 26 can be inserted into the valve body 10, so that the detection position can be easily adjusted to achieve the optimum flow detection effect.

The water inlet passage 15 and the water outlet passage 16 of the water softener valve 100 extend in parallel in the same orientation, and respectively define a water inlet and a water outlet at the same side of the valve body 10. The valve body 10 is further provided with a flow guiding hole 19 communicating with the valve chamber and the water outlet passage 16 of the valve body 10. The cap body 21 covers the flow guiding hole 19 to direct the water flow within the valve chamber toward the water outlet.

Specifically, the valve chamber, the water inlet passage 15, the water outlet passage 16, the wastewater passage 17, and the salt suction passage 18 all extend in the first orientation (for example, a front-rear orientation). The water inlet passage 15, the water outlet passage 16, the wastewater passage 17, and the salt suction passage 18 respectively define a water inlet, a water outlet, a wastewater port, and a salt suction port on the same side surface of the valve body 10. The forward washing water inlet passage 11, the forward washing jet passage 12, the back washing water inlet passage 13, and the back washing jet passage 14 all extend in a second orientation (for example, the left and right orientation). The valve body 10 is provided with a flow guiding hole 19 on the same side of the external port of the forward washing water inlet passage 11. The flow guiding hole 19 extends in the second orientation and communicates with both the valve chamber and the water outlet passage 16. Thus, the release of the valve body 10 is facilitated by the provision of the flow guiding hole 19, and the end cap 20 is provided for water-sealing the flow guiding hole 19, and meanwhile the water flow in the valve chamber can also be guided to the water outlet.

In this embodiment, the pipeline structures in the valve body 10 are neatly aligned, and the arrangement of the external port is more regular, enabling the internal ducts and external ports of the valve body 1 to be arranged more neatly and the structure of the entire water softener valve 100 to be more compact, which in turn makes the overall size of the water softener smaller. Furthermore, the water outlet and the water inlet of the water softener valve 100 are located on the same side of the valve body 10, which is convenient for the whole machine to be installed, thereby maximizing the compactness of the structure, minimizing the size and optimizing the pipelining.

The cap body 21 is provided with a sealing flange 27 adapted to the flow guiding hole 19. The sealing flange 27 is inserted into the flow guiding hole 19 and is in sealing engagement with the guiding hole 19. In this embodiment, by providing the sealing flange 27 on the cap body 21, the sealing flange 27 is inserted into the flow guiding hole 19 during assembly, so that the cap body 21 and the valve body 10 are closely fitted, and the operation process is simple. At the same time, it can also ensure better sealing performance between the cap body 21 and the flow guiding hole 19 to avoid water leakage.

The present application further proposes a water softener comprising an ion exchange tank, a salt tank, and a water softener valve 100. For the specific structure of the water softener valve 100, referring to the foregoing embodiments. Since the water softener adopts all the technical solutions of all the foregoing embodiments, it has at least all the beneficial effects brought by the technical solutions of the foregoing embodiments; however, these beneficial effects will not be detailed one by one herein. The ion exchange tank comprises a tank body and a center tube disposed in the tank body, and an ion exchange chamber is formed between the center tube and the inner wall of the tank body. The softening inlet passage communicates with the ion exchange chamber, the softening outlet passage communicates with the center tube, and the salt suction passage communicates with a salt box.

The present application further proposes a water softener. Referring now to FIGS. 46 to 52, hereinafter the structure of the water softener and of its water softener valve will be described in greater detail.

The present application proposes an impeller mounting joint which can be used for a flow meter, where the flow meter can be used as one of the important components of a water softener valve and can be used for metering flow.

In one embodiment of the present application, the impeller mounting joint 2 includes:

a base pipe 210 having a guiding plate 220 extending radially in the chamber of the base pipe 210; and a pivot 230 disposed at one end of the guiding plate 220 in the axial direction of the base pipe 210, and extending along the axial direction of the base pipe 210.

Specifically, the flow meter includes an impeller mounting joint 2 and an impeller 1. The impeller 1 is rotatably installed in the impeller mounting joint 2, and when water flows through the impeller mounting joint 2, water flows through the impeller 1 and can drive the impeller 1 to rotate. The flow rate of the impeller mounting joint 2 can be calculated by measuring the rotation of the impeller 1. The amount of rotation (angular displacement, number of revolutions, etc.) of the impeller 1 can be measured by installing a detection device such as a rotary encoder, a photoelectric sensor, or a Hall sensor or the like. The impeller 1 includes a support frame 110, a connecting portion 120, a blade 130, and a flow guiding portion 221. The support frame 110 is configured as a cylindrical shape. The connecting portion 120 is located at the center of the support frame 110, and the connecting portion 120 is provided with a shaft hole 121 coaxially disposed with the axis of the support frame 110, so that the rotational stability of the impeller 1 can be ensured. The support frame 110 has opposite ends, that is, a water inlet end and a water outlet end. The water enters from the inlet end and then flows out from the outlet end. During the water flowing process, the water stream can drive the blades 130 thereby rotating the entire impeller 1. The blade 130 is typically provided in plurality, and the plurality of blades 130 are evenly arranged in the axial direction of the support frame 110. In order to allow the impeller 1 to rotate better under the drive of the water flow, the plurality of blades 130 are twisted in the same direction toward the side of the water inlet end of the support frame 110. In order to facilitate the production of the impeller 1, the impeller 1 is preferably an injection molded part, and the support frame 110, the connecting portion 120, the blade 130, and the flow guiding portion 221 are typically integrally molded.

In this embodiment, the detection of the amount of rotation of the impeller 1 is typically achieved by the Hall Effect principle. The impeller 1 is provided with a magnetic member 140, and a Hall detecting element is disposed in the impeller mounting joint 2. Thus, the water flow drives the impeller 1 to rotate, and the magnetic member 140 also rotates along with the impeller 1. An electrical signal pulse can be generated each time the magnetic member 140 passes the Hall detecting element, thereby the amount of water flow passing through the flow meter can be measured by counting the electrical signal pulses in a known manner by conventional circuitry. The magnetic member 140 can be a permanent magnet. For example, the magnetic member 140 can be made of a material such as a ferrite permanent magnet, rare earth permanent magnet (rare earth cobalt, neodymium iron boron, etc.), aluminum nickel cobalt, iron chromium cobalt, aluminum iron, and the like. The Hall detecting element may be a detecting element such as a reed switch.

It is worth noting that, in order to ensure that the magnetic member 140 can rotate along with the impeller 1 while facilitating the detection of the magnetic member 140 by the Hall detecting element, the geometric center of the magnetic member 140 can be spaced apart from the axis of the shaft hole 121; that is, the geometric center of the magnetic member 140 is not on the axis of rotation of the impeller 1. The magnetic member 140 can be disposed at a plurality of positions on the impeller 1, and may be disposed, for example, on the support frame 110, the blade 130, or the connecting portion 120.

The specific structure of the impeller mounting joint 2 is described in detail below.

The impeller mounting joint 2 includes a base pipe 210, a guiding plate 220, and a pivot 230. The guiding plate 220 is disposed in the chamber of the base pipe 210, and extends in the radial direction of the base pipe 210. By providing the guiding plate 220, the chamber of the base pipe 210 can be divided into a plurality of water flow passages. The guiding plate 220 has a certain length along the axial direction of the base pipe 210 to ensure that the formed water flow passage has a certain length. The pivot 230 is located at one end of the guiding plate 220 in the axial direction of the base pipe 210, and extends in the axial direction of the base pipe 210. The pivot 230 can be pivotally engaged with the shaft hole 121 of the impeller 1. Thus, when the impeller 1 is mounted on the pivot 230, the water flow can be facilitated to actively act on the blade 130 of the impeller 1 to facilitate the rotation of the impeller 1.

It can be understood that when the water flows through the base pipe 210, the water flow needs to pass through the impeller 1, and at this time, the water flow exerts a force on the impeller 1 to drive the impeller 1 to rotate. When the water flows through the impeller 1, the original flow direction of the water flow is disturbed by the impeller 1, and the water flow may be disordered before or after flowing into the impeller 1. In this embodiment, by providing the guiding plate 220, the water flows through the plurality of water flow passages, and the flow direction of the water flow can be subjected to a certain "alignment" effect, thereby avoiding the occurrence of water flow disorder and avoiding the defect of the sudden change of the water pressure at the joint of the base pipe 210; that is, avoiding the "water hammer effect" that may occur at the joint of the base pipe 210. In addition, for the base pipe 210, the water flow direction may flow in the direction from the guiding plate 220 to the pivot 230, or may flow in the direction from the pivot 230 to the guiding plate 220. That is, the water flow may first pass through the guiding plate 220, and then flow to the impeller 1 after the flow is straightened or aligned; or the water flow may first pass through the impeller 1 and then flow towards 220 to then straighten or align the water flow flowing out of the impeller 1.

In this embodiment, the water flow typically first passes through the impeller 1 and then flows to the flow plate 220 to further straighten or align the water flow flowing out of the impeller 1. Thereby, it is ensured that water flow disturbance will not occur after the water flow passes through the impeller 1, avoiding the occurrence of a sudden change of water pressure in the subsequent water path, and improving the sealing effect of the joints between the base pipe 210 and other components.

In order to ensure the "alignment" effect of the guiding plate 220 on the water flow, in this embodiment the guiding plate 220 is provided at a plurality of intervals along the circumferential direction of the base pipe 210. The plurality of guiding plates 220 are typically evenly distributed along the circumferential direction of the base pipe 210 to ensure uniform flow in each of the water flow passages so that the water flow can pass through the base pipe 210 uniformly.

The end of the guiding plate 220 provided with the pivot 230 is further provided with a flow guiding portion 221. The side of the flow guiding portion 221 facing away from the guiding plate 220 is tapered. In this way, the resistance of the guiding plate 220 to the water flow can be reduced by providing the flow guiding portion 221, and at the same time, the water flow can be easily guided into the water flow passages on both sides of the guiding plate 220.

The above-mentioned flow guiding portion 221 can be implemented by various structures. For example, in one embodiment, one end of the guiding plate 220 provided with the pivot 230 is configured as a sharp angle to form the flow guiding portion 221. In another embodiment, one end of the guiding plate 220 provided with the pivot 230 is smoothly transitioned to form the flow guiding portion 221.

In this embodiment, in order to facilitate the manufacture of the impeller mounting joint 2, the impeller mounting joint 2 is an injection molded part. The base pipe 210, the guiding plate 220 and the pivot 230 are typically integrally molded.

Since the impeller mounting joint 2 is an injection molded part, due to the limitation of the existing injection molding process, the position of the pivot 230 is difficult to be injection molded in the injection molding process. In this embodiment, one end of the guiding plate 220 facing away from the pivot 230 is provided with a rubber reducing hole 222, and the axis of the rubber reducing hole 222 is coaxially disposed with the pivot 230. By providing the rubber reducing hole 222, the injection molding compound can be easily moved to the position of the pivot 230, thereby facilitating the injection molding of the pivot 230.

The base pipe 210 has opposite first and second ends 212 and 212. The pivot 230 is disposed at one end of the guiding plate 220 toward the first end 211. The outer peripheral surface of the first end 211 is provided with a sealing ring groove 213 for mounting a seal ring. Thus, by providing the sealing ring groove 213, the base pipe 210 can be easily sealingly connected to other components, thereby improving the connection sealing property of the first end 211 of the base pipe 210.

In addition, in this embodiment, the outer peripheral surface of the second end 212 of the base pipe 210 is provided with a thread, and the second end 212 of the base pipe 210 can be sealed and connected with other components through a threaded sealing connection, thereby ensuring the connection sealing performance of the second end 212 of the base pipe 210. In other embodiments, the threads on the base pipe 210 may certainly also be disposed on the inner circumferential surface of the second end 212.

The present application further proposes a flow meter including an impeller and an impeller mounting joint. For the specific structure of the impeller mounting joint, referring to the foregoing embodiments. Since the present flow meter adopts all the technical solutions of all the foregoing embodiments, it has at least all the beneficial effects brought by the technical solutions of the foregoing embodiments; however, these beneficial effects will not be detailed one by one herein. The impeller is rotatably mounted on the pivot of the impeller mounting joint.

The present application further proposes a water softener that includes water softener valve, the water softener valve including a flow meter. For the specific structure of the flow meter, referring to the foregoing embodiments. Since the water softener adopts all the technical solutions of all the foregoing embodiments, it has at least all the beneficial effects brought by the technical solutions of the foregoing embodiments; however, these beneficial effects will not be detailed one by one herein.

The present application further proposes a water softener. Referring now to FIGS. 53 to 57, hereinafter the structure of the water softener and of its water softener valve will be described in greater detail.

The present application proposes an impeller which can be used for a flow meter, where the flow meter can be used as one of the important components of a water softener valve and can be used for metering flow.

In one embodiment of the present application, the impeller 1 includes:

a support frame 10, which has oppositely disposed water inlet end 110 and water outlet end 120;

a connecting portion 20, which is located in the support frame 10, and is provided with a shaft hole 210 extending from the water outlet end 120 toward the water inlet end 110;

a blade 30, which has one end connected to an outer peripheral surface of the connecting portion 20 and the other end connected to an inner peripheral surface of the support frame 10; and a flow guiding portion 40, which is disposed at one end of the connecting portion 20 facing the water inlet end 110, where the side of the guiding portion 40 facing away from the connecting portion 20 is tapered.

Specifically, the flow meter typically has a water flow passage, and a rotating shaft and an impeller 1 are disposed in the water flow passage thereof, where the rotating shaft has the same orientation as the water flow passage, and the impeller 1 is rotatably mounted on the rotating shaft. When water flows through the water flow passage, the water flow passes through the impeller 1 and thus can drive the impeller 1 to rotate.

Thus, the amount of flow rate of the water flow passage can be calculated by measuring the rotation of the impeller 1. The amount of rotation (angular displacement, number of revolutions, etc.) of the impeller 1 can be measured by a detection device such as a rotary encoder, a photoelectric sensor, or a Hall sensor or the like.

In order to reduce the resistance of the water flow to the impeller 1 when passing through the impeller 1, in this embodiment the structure of the impeller 1 described above is optimized and improved. The improved impeller 1 includes a support frame 10, a connecting portion 20, a blade 30, and a flow guiding portion 40. The support frame 10 is configured as a cylindrical shape. The connecting portion 20 is located at the center of the support frame 10, and the connecting portion 20 is provided with a shaft hole 121 coaxially disposed with the axis of the support frame 10, so that the rotational stability of the impeller 1 can be ensured. The support frame 10 has opposite ends, that is, a water inlet end 110 and a water outlet end 120. The water enters from the inlet end 110 and then flows out from the outlet end 120. During the water flowing process, the water stream can drive the blades 30 thereby rotating the entire impeller 1. The blade 30 is typically provided in plurality, and the plurality of blades 30 are evenly arranged in the axial direction of the support frame 10. In order to allow the impeller 1 to rotate better under the drive of the water flow, the plurality of blades 30 are twisted in the same direction toward the side of the water inlet end 110 of the support frame 10.

When the water flow drives the impeller 1 to rotate, the water flow exerts a force on the blade 30, and part of the water flow flows along the blade 30 in the radial direction. This will cause that not all the water flow would act on the impeller 1, which is not conducive to the rotation of the impeller 1. By providing the support frame 10, the water flow can be effectively prevented from flowing radially outward along the blade 30, which can effectively ensure that the water flow entering the water inlet end 110 exerts a force on the blade 30, thereby facilitating the impeller 1 to rotate under the action of the water flow.

It should be noted that, in order to facilitate the flow of water to the blade 30 and reduce the resistance of the impeller 1 to the water flow, in the embodiment, the impeller 1 is further provided with a flow guiding portion 40. The flow guiding portion 40 is located at one end of the connecting portion 20 facing the water inlet end 110, and the side of the flow guiding portion 40 facing away from the connecting portion 20 is tapered. Thus, when the water flow flows to the water inlet end 110, the water flow would first flow through the flow guiding portion 40 to be guided and diverted, so that the water flow would be guided towards the position of the blade 30, Further, the water flow is facilitated to exert a force on the blade 30, and the water flow is prevented from being disturbed when passing through the impeller 1, which is more favorable for the rotation of the impeller 1, effectively ensuring the metering accuracy of the flow meter.

In order to facilitate the production of the impeller 1, in this embodiment the impeller 1 is typically an injection molded part, and the support frame 10, the connecting portion 20, the blade 30, and the flow guiding portion 40 are typically integrally molded.

In one embodiment, in order to ensure that the flow guiding portion 40 can exert a diverting and a guiding effect on the water flow, in this embodiment the flow guiding portion 40 at least partially protrudes from the water inlet end 110 of the support frame 10. In this case, the flow guiding portion 40 protrudes from the water inlet end 110 of the support frame 10, so that before the water flow enters the support frame 10, the water flow can be guided and diverted in advance and so the water flow is directed to the position of the blade 30, thereby facilitating the water flow to exert a force on the blade 30.

The above-mentioned flow guiding portion 40 can have a variety of shapes. For example, the flow guiding portion 40 is typically semi-spherical or tapered in shape to facilitate forming a flow guiding surface on the surface of the flow guiding portion 40, reducing the flow resistance of the flow guiding portion 40 to the water flow, and facilitating the guidance and diversion of the water flow.

In this embodiment, the detection of the amount of rotation of the impeller 1 is typically achieved by the Hall Effect principle. The impeller 1 is provided with a magnetic member 50, and a Hall detecting element is disposed in the water flow passage of the flow meter. Thus, the water flow drives the impeller 1 to rotate, and the magnetic member 50 also rotates along with the impeller 1. An electrical signal pulse can be generated each time the magnetic member 50 passes the Hall detecting element, thereby the amount of water flow passing through the flow meter can be measured by counting the electrical signal pulses in a known manner by conventional circuitry. The magnetic member 50 can be a permanent magnet. For example, the magnetic member 50 can be made of a material such as a ferrite permanent magnet, rare earth permanent magnet (rare earth cobalt, neodymium iron boron, etc.), aluminum nickel cobalt, iron chromium cobalt, aluminum iron, and the like. The Hall detecting element may be a detecting element such as a reed switch.

It is worth noting that, in order to ensure that the magnetic member 50 can rotate along with the impeller 1 while facilitating the detection of the magnetic member 50 by the Hall detecting element, the geometric center of the magnetic member 50 can be spaced apart from the axis of the shaft hole 210; that is, the geometric center of the magnetic member 50 is not on the axis of rotation of the impeller 1. The magnetic member 50 can be disposed at a plurality of positions on the impeller 1, and may be disposed, for example, on the support frame 10, the blade 30, or the connecting portion 20.

In one embodiment, in this embodiment, the magnetic member 50 is detachably mounted on the support frame 10. The magnetic member 50 can be embedded on the support frame 10 by an interference fit or fixed to the support frame 10 by a snap fit structure. Of course, in other embodiments, the magnetic member 50 can be directly injection molded into the support frame 10, or the magnetic member 50 can be fixed to the support frame 10 by means of gluing.

In order to improve the measurement accuracy of the flow meter, in this embodiment a plurality of magnetic members 50 are disposed at intervals along the circumferential direction of the support frame 10. In this case, a plurality of Hall detection elements are correspondingly disposed in the water flow passage of the flow meter. Thus, when the impeller 1 makes one rotation, a plurality of electrical signal pulses can be generated, thereby improving the measurement accuracy of the amount of rotation of the impeller 1, so as to improve the measurement accuracy of the flow meter.

It should be noted that the plurality of magnetic members 50 are typically evenly distributed along the circumferential direction of the support frame 10, thereby further making the overall mass distribution of the impeller 1 more uniform, facilitating the rotational stability of the impeller 1.

In this embodiment, the water inlet end 110 of the support frame 10 is provided with a mounting hole 130 extending along the axial direction thereof, and the magnetic member 50 is mounted on the mounting hole 130. The end of the mounting hole 130 facing the water inlet end 110 is flared, thereby facilitating the mounting of the magnetic member 50 in the mounting hole 130. The magnetic member 50 can be embedded in the mounting hole 130 by an interference fit.

Because the magnetic member 50 has a possibility of magnetic reduction or degaussing under the scouring of the water flow for a long term, in order to ensure the magnetic performance of the magnetic member 50, in this embodiment at least one side of the hole wall of the magnetic member 50 facing away from the mounting hole 130 is provided with an anti-demagnetization coating 501. For example, a side of the magnetic member 50 facing the water inlet end 110 is provided with an anti-demagnetization coating 501. Of course, in an exemplary embodiment, the anti-demagnetization coating 501 can also be disposed on the entire outer surface of the magnetic member 50, thereby providing full protection to the magnetic member 50. The anti-demagnetization coating 501 can be made of Teflon (polytetrafluoroethylene, PTFE) or a coating made of other anti-degaussing materials.

In addition, a rotating shaft is arranged in the water flow passage of the flow meter. In order to facilitate the better mounting of the impeller 1 on the rotating shaft, a certain engaging depth should be maintained between the rotating shaft and the shaft hole 210. In this embodiment, typically one end of the connecting portion 20 facing the water inlet end 110 protrudes from the water inlet end 110 such that the hole depth of the shaft hole 210 is greater than the axial length of the support frame 10. Alternatively, the shaft hole 210 extends to the inside of the flow guiding portion 40 such that the hole depth of the shaft hole 210 is greater than the axial length of the support frame 10. In this way, the impeller 1 can be more reliably mounted on the rotating shaft, thereby improving the rotational stability of the impeller 1.

The present application further proposes a water flow passage and an impeller. For the specific structure of the impeller, referring to the foregoing embodiments. Since the present flow meter adopts all the technical solutions of all the foregoing embodiments, it has at least all the beneficial effects brought by the technical solutions of the foregoing embodiments; however, these beneficial effects will not be detailed one by one herein. The water flow passage is provided with a rotating shaft extending along the flow direction thereof, and the impeller is pivotally connected with the rotating shaft such that the water flow of the water flow passage drives the impeller to rotate.

The present application further proposes a water softener that includes water softener valve, the water softener valve including a flow meter. For the specific structure of the flow meter, referring to the foregoing embodiments. Since the water softener adopts all the technical solutions of all the foregoing embodiments, it has at least all the beneficial effects brought by the technical solutions of the foregoing embodiments; however, these beneficial effects will not be detailed one by one herein.

The foregoing description merely portrays some illustrative embodiments according to the present application and therefore is not intended to limit the patentable scope of the present application. Any equivalent structural transformations that are made taking advantage of the specification and accompanying drawings of the present application and any direct or indirect applications thereof in other related technical fields shall all fall in the scope of protection of the present application.

What is claimed is:

1. A water softener, comprising a water softener valve and an ion exchange tank, the water softener valve comprising a valve body and a valve core assembly, the valve body comprising:

a valve chamber, and a water inlet passage, a salt suction passage, a softening inlet passage, a softening outlet passage, a wastewater passage, a jet passage, and a water outlet passage that are in communication with the valve chamber; wherein:

the valve chamber, the water inlet passage, the salt suction passage, and the water outlet passage all extend in a first orientation, the jet passage extends in a second orientation and communicates with the salt suction passage with a jet port, the second orientation and the first orientation are perpendicular to each other, the water inlet passage and the water outlet passage are both located at a periphery of the valve chamber and are disposed on opposite two sides of the valve chamber in the second orientation, the water inlet passage and the water outlet passage respectively define a water inlet and a water outlet at a same end of the valve body in the first orientation, the salt suction passage is located at a periphery of the valve chamber and is disposed adjacent to the valve chamber, and the salt suction passage defines a salt suction port at a same end of the valve body as the water inlet in the first orientation.

2. The water softener according to claim 1, wherein the water inlet passage communicates with the softening inlet passage, and the water outlet passage communicates with the softening outlet passage; and the ion exchange tank comprises a tank body and a center tube disposed in the tank body, an ion exchange chamber is defined between the center tube and an inner wall of the tank body, the softening inlet passage communicates with the ion exchange chamber, and the softening outlet passage communicates with the center tube.

3. The water softener according to claim 2, wherein the valve body further comprises a mounting head arranged on one side of the valve chamber in a third orientation, the mounting head is detachably fixed to the ion exchange tank, the softening inlet passage and the softening outlet passage are defined within the mounting head, and the first orientation, the second orientation, and the third orientation are perpendicular to each other.

4. The water softener according to claim 3, wherein the mounting head comprises a first annular cylinder and a second annular cylinder that extend in the third orientation, the first annular cylinder is arranged to surround the outside of the second annular cylinder and is detachably connected to the ion exchange tank, the first annular cylinder and the second annular cylinder cooperatively define the softening inlet passage therebetween, and an inner cavity of the second annular cylinder defines the softening outlet passage.

5. The water softener according to claim 4, wherein the softening inlet passage extends in the third orientation to communicate with the valve chamber.

6. The water softener according to claim 1, wherein the water softener valve has a softened water producing position, the valve core assembly comprises a piston and a groove defining assembly sleeved around the piston; and at the softened water producing position, the piston cooperates with the groove defining assembly to define a first connecting passage that communicates the water inlet passage with the softening inlet passage, and a second connecting passage that communicates the softening outlet passage with the water outlet passage.

7. The water softener according to claim 1, wherein the water inlet passage is disposed on one side of the valve chamber in the second orientation; a side of the valve body adjacent to the water inlet passage in the second orientation is defined with a first auxiliary hole, the first auxiliary hole communicates with the water inlet passage; and an inner wall surface of the water inlet passage opposite to the first auxiliary hole is defined with a first communication hole that communicates with the valve chamber.

8. The water softener according to claim 1, wherein the water softener valve further comprises a piston disposed in the salt suction passage, the piston extends at the first orientation and passes through a wall of the salt suction passage away from the salt suction port, and the piston moves back and forth along the first orientation to open or close the salt suction port.

9. The water softener according to claim 1, wherein the valve body further comprises a forward washing passage communicating with the valve chamber, the jet passage further comprises a forward washing jet passage communicating with the forward washing passage, a jet port of the forward washing jet passage communicates with the salt suction passage; and the water softener valve comprises a saline solution forward washing state, in which the water inlet passage, the forward washing passage, the forward washing jet passage, and the softening inlet passage are communicated in series, while the softening outlet passage is communicated with the wastewater passage.

10. The water softener according to claim 1, wherein the wastewater passage extends in the first orientation, and is located at the periphery of the valve chamber and is arranged adjacent to the valve chamber; the wastewater passage defines wastewater port at a same end of the valve body as the water inlet in the first orientation; the water inlet and the water outlet are respectively located at opposite two sides of the valve chamber in the second orientation, the wastewater port is located at one side of the water inlet or the water outlet in a third orientation; and the first orientation, the second orientation, and the third orientation are perpendicular to each other.

11. The water softener according to claim 10, wherein the valve body has a first end surface in the second orientation, the water inlet passage and the wastewater passage are disposed adjacent to the first end surface, and the first end surface is defined with a first auxiliary hole and a second auxiliary hole;

the first auxiliary hole communicates with the water inlet passage, and an inner wall surface of the water inlet passage opposite to the first auxiliary hole is defined with a first communication hole communicating with the valve chamber; and the second auxiliary hole communicates with the wastewater passage, and an inner wall surface of the wastewater passage opposite to the second auxiliary hole is defined with a second communication hole communicating with the valve chamber.

12. The water softener according to claim 10, wherein the salt suction passage communicates with the jet port of the jet passage, and the water softener valve comprises a saline solution forward washing state and a saline solution backing washing state; in the saline solution forward washing state, the water inlet passage, the jet passage, and the softening inlet passage are communicated in series, and the softening outlet passage is communicated with the wastewater passage; and in the saline solution back washing state, the water inlet passage, the jet passage, and the softening outlet passage are communicated in series, and the softening inlet passage is communicated with the wastewater passage.

13. The water softener according to claim 1, wherein the valve core assembly further comprises a seal member and a grid; the grid comprises two annular bodies oppositely disposed and spaced apart from each other, and a plurality of support ribs arranged between the two annular bodies; the plurality of support ribs are arranged at intervals along a circumferential direction of the annular bodies, and are integrally injection molded with the two annular bodies; and the support ribs comprises a plurality of first support ribs and second support ribs, a plurality of the second support ribs are arranged between at least one group of two adjacent first support ribs, with the plurality of the second support ribs being spaced apart from each other and arranged in parallel, and any one of the first support ribs extending obliquely outward from the inside toward a side away from an adjacent second support rib.

14. The water softener according to claim 1, wherein the valve body comprises a forward washing water inlet passage, a forward washing jet passage, a back washing water inlet passage, and a back washing jet passage; the water softener valve further comprises an end cap, the end cap comprises a cap body, and at least one bypass passage is defined in the cap body; and the bypass passage is configured to communicate the forward washing water inlet passage with the forward washing jet passage of the valve body, or configured to communicate the back washing water inlet passage with the back washing jet passage of the valve body.

15. The water softener according to claim 14, wherein a first bypass passage is configured to communicate the forward washing water inlet passage with the forward washing jet passage of the valve body, and a second bypass passage is configured to communicate the back washing water inlet passage with the back washing jet passage of the valve body.

16. The water softener according to claim 15, wherein the end cap further comprises a switching unit, the switching unit is configured to open the first bypass passage and block off the second bypass passage when the water softener valve is in a saline solution forward washing state, and is further configured to block off the first bypass passage and open the second bypass passage when the water softener valve is in a saline solution back washing state.

17. The water softener according to claim 1, wherein the water softener valve comprises a flow meter, the flow meter comprises an impeller and an impeller mounting head, the impeller mounting head comprises:
 a base pipe, having a guiding plate extending radially in the chamber of the base pipe; and
 a pivot, disposed on one end of the guiding plate at an axial direction of the base pipe, and extending along the axial direction of the base pipe,
 wherein the impeller is rotatably mounted on the pivot of the impeller mounting head.

18. The water softener according to claim 1, wherein the water softener valve comprises a flow meter, the flow meter comprises a water flow passage and an impeller, a rotating shaft extending along a flow direction of the water flow passage is arranged in the water flow passage, and the impeller is pivotally connected with the rotating shaft to enable the water flow of the water flow passage to drive the impeller to rotate; wherein
 the impeller comprises:
 a support frame, having a water inlet end and a water outlet end that are oppositely disposed;
 a connecting portion, located in the support frame and provided with a shaft hole extending from the water outlet end toward the water inlet end;
 a blade, having one end connected to an outer peripheral surface of the connecting portion and the other end connected to an inner peripheral surface of the support frame; and
 a flow guiding portion, disposed at one end of the connecting portion facing the water inlet end, wherein the side of the flow guiding portion away from the connecting portion is tapered.

19. The water softener according to claim 18, wherein the impeller further comprises a magnetic member that is disposed on the support frame, the blade, or the connecting portion, and a geometric center of the magnetic member is spaced apart from an axis of the shaft hole.

* * * * *